(12) United States Patent
Harrup et al.

(10) Patent No.: US 10,707,531 B1
(45) Date of Patent: *Jul. 7, 2020

(54) ALL-INORGANIC SOLVENTS FOR ELECTROLYTES

(71) Applicants: Mason K. Harrup, Idaho Falls, ID (US); Jay Fraser, San Antonio, TX (US)

(72) Inventors: Mason K. Harrup, Idaho Falls, ID (US); Jay Fraser, San Antonio, TX (US)

(73) Assignee: New Dominion Enterprises Inc., Austin, TX (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/717,474

(22) Filed: Sep. 27, 2017

Related U.S. Application Data

(60) Provisional application No. 62/400,586, filed on Sep. 27, 2016.

(51) Int. Cl.
| | | |
|---|---|---|
| *H01M 10/0569* | (2010.01) | |
| *H01M 10/0525* | (2010.01) | |
| *H01M 10/0568* | (2010.01) | |
| *C07F 9/659* | (2006.01) | |
| *H01M 10/0567* | (2010.01) | |

(52) U.S. Cl.
CPC ........ *H01M 10/0569* (2013.01); *C07F 9/659* (2013.01); *H01M 10/0525* (2013.01); *H01M 10/0567* (2013.01); *H01M 10/0568* (2013.01); *H01M 2300/0037* (2013.01)

(58) Field of Classification Search
CPC ........ H01M 10/0569; H01M 10/0568; H01M 10/0567; H01M 10/0525; H01M 2300/0037; C07F 9/659
See application file for complete search history.

(56) References Cited

U.S. PATENT DOCUMENTS

| | | |
|---|---|---|
| 4,126,483 A | 11/1978 | Donakowski et al. |
| 4,157,941 A | 6/1979 | Donakowski et al. |
| 4,159,229 A | 6/1979 | Donakowski et al. |
| 4,223,080 A | 9/1980 | Auborn |
| 4,248,868 A | 2/1981 | Scartazzini et al. |
| 4,270,957 A | 6/1981 | Donakowski et al. |
| 4,483,908 A | 11/1984 | Zimmerman |
| 4,613,676 A | 9/1986 | Fuhrer et al. |
| 4,719,288 A | 1/1988 | Fuhrer et al. |
| 4,722,877 A | 2/1988 | Sammells |
| 4,727,060 A | 2/1988 | Buhlmayer et al. |

(Continued)

FOREIGN PATENT DOCUMENTS

WO    WO2013032004    3/2013

*Primary Examiner* — Laura Weiner
(74) *Attorney, Agent, or Firm* — Tully Rinckey PLLC; Steven M. Hoffberg

(57) ABSTRACT

An all-inorganic electrolyte formulation for use in a lithium ion battery system comprising at least one of each a phosphoranimine, a phosphazene, a monomeric organophosphate and a supporting lithium salt. The electrolyte preferably has a melting point below 0° C., and a vapor pressure of combustible components at 60.6° C. sufficiently low to not produce a combustible mixture in air, e.g., less than 40 mmHg at 30° C. A solid electrolyte interface layer formed by the electrolyte with an electrode is preferably thermally stable ≥80° C.

10 Claims, 2 Drawing Sheets

(56) References Cited

U.S. PATENT DOCUMENTS

| | | |
|---|---|---|
| 4,772,433 A | 9/1988 | Hesse |
| 4,808,494 A | 2/1989 | Palmer et al. |
| 4,810,599 A | 3/1989 | Kondo et al. |
| 4,828,945 A | 5/1989 | Nagata et al. |
| 4,840,856 A | 6/1989 | Nakacho et al. |
| 4,847,174 A | 7/1989 | Palmer et al. |
| 4,863,817 A | 9/1989 | Ogino et al. |
| 4,863,903 A | 9/1989 | Fuhrer et al. |
| 4,904,553 A | 2/1990 | Nakajima et al. |
| 4,917,976 A | 4/1990 | Wakihara et al. |
| 4,931,591 A | 6/1990 | Buhlmayer et al. |
| 4,939,050 A | 7/1990 | Toyosawa et al. |
| 4,985,317 A | 1/1991 | Adachi et al. |
| 5,041,346 A | 8/1991 | Giles |
| 5,061,581 A | 10/1991 | Narang et al. |
| 5,071,532 A | 12/1991 | Taillet et al. |
| 5,102,751 A | 4/1992 | Narang et al. |
| 5,108,855 A | 4/1992 | Daifuku et al. |
| 5,110,694 A | 5/1992 | Nagasubramanian et al. |
| 5,114,809 A | 5/1992 | Nakacho et al. |
| 5,124,075 A | 6/1992 | Yasuda et al. |
| 5,153,080 A | 10/1992 | Inubushi et al. |
| 5,153,082 A | 10/1992 | Ogino et al. |
| 5,166,009 A | 11/1992 | Abraham et al. |
| 5,176,969 A | 1/1993 | Miyabayashi et al. |
| 5,180,645 A | 1/1993 | More |
| 5,188,783 A | 2/1993 | Pierce |
| 5,190,695 A | 3/1993 | Sotomura |
| 5,196,484 A | 3/1993 | Giles et al. |
| 5,219,679 A | 6/1993 | Abraham et al. |
| 5,229,227 A | 7/1993 | Webber |
| 5,243,004 A | 9/1993 | Funatsu et al. |
| 5,252,413 A | 10/1993 | Alamgir et al. |
| 5,273,840 A | 12/1993 | Dominey |
| 5,273,848 A | 12/1993 | Noguchi et al. |
| 5,294,502 A | 3/1994 | Shackle et al. |
| 5,330,856 A | 7/1994 | Gonzalez |
| 5,337,184 A | 8/1994 | Helms et al. |
| 5,350,646 A | 9/1994 | Armand et al. |
| 5,354,631 A | 10/1994 | Chaloner-Gill et al. |
| 5,358,801 A | 10/1994 | Brodd |
| 5,366,829 A | 11/1994 | Saidi |
| 5,384,213 A | 1/1995 | Olsen |
| 5,393,621 A | 2/1995 | Chaloner-Gill |
| 5,399,447 A | 3/1995 | Chaloner-Gill et al. |
| 5,411,820 A | 5/1995 | Chaloner-Gill |
| 5,414,025 A | 5/1995 | Allcock et al. |
| 5,418,089 A | 5/1995 | Chaloner-Gill et al. |
| 5,419,977 A | 5/1995 | Weiss et al. |
| 5,420,000 A | 5/1995 | Patel et al. |
| 5,421,897 A | 6/1995 | Grawe |
| 5,426,005 A | 6/1995 | Eschbach |
| 5,429,890 A | 7/1995 | Pynenburg et al. |
| 5,432,425 A | 7/1995 | Lundquist et al. |
| 5,436,549 A | 7/1995 | Lundquist et al. |
| 5,443,601 A | 8/1995 | Doeff et al. |
| 5,451,454 A | 9/1995 | Fukahori et al. |
| 5,451,476 A | 9/1995 | Josefowicz |
| 5,453,261 A | 9/1995 | Saidi et al. |
| 5,455,127 A | 10/1995 | Olsen et al. |
| 5,455,999 A | 10/1995 | Weiss et al. |
| 5,474,860 A | 12/1995 | Abraham et al. |
| 5,491,039 A | 2/1996 | Shackle |
| 5,491,040 A | 2/1996 | Chaloner-Gill |
| 5,500,583 A | 3/1996 | Buckley et al. |
| 5,506,073 A | 4/1996 | Angell et al. |
| 5,508,129 A | 4/1996 | Barker |
| 5,508,130 A | 4/1996 | Golovin |
| 5,518,839 A | 5/1996 | Olsen |
| 5,520,850 A | 5/1996 | Chaloner-Gill et al. |
| 5,521,025 A | 5/1996 | Chaloner-Gill |
| 5,523,179 A | 6/1996 | Chu |
| 5,532,077 A | 7/1996 | Chu |
| 5,532,082 A | 7/1996 | Saidi |
| 5,536,599 A | 7/1996 | Alamgir et al. |
| 5,541,020 A | 7/1996 | Golovin et al. |
| 5,542,163 A | 8/1996 | Chang |
| 5,548,055 A | 8/1996 | Narang et al. |
| 5,548,060 A | 8/1996 | Allcock et al. |
| 5,550,454 A | 8/1996 | Buckley |
| 5,561,007 A | 10/1996 | Saidi |
| 5,565,284 A | 10/1996 | Koga et al. |
| 5,567,547 A | 10/1996 | Golovin et al. |
| 5,567,783 A | 10/1996 | Allcock et al. |
| 5,569,560 A | 10/1996 | Olsen et al. |
| 5,569,736 A | 10/1996 | Josowicz et al. |
| 5,573,872 A | 11/1996 | Shackle |
| 5,576,120 A | 11/1996 | Saidi |
| 5,578,399 A | 11/1996 | Olsen |
| 5,580,681 A | 12/1996 | Fleischer |
| 5,580,682 A | 12/1996 | Chaloner-Gill |
| 5,582,623 A | 12/1996 | Chu |
| 5,584,893 A | 12/1996 | Mitchell |
| 5,589,297 A | 12/1996 | Koga et al. |
| 5,591,545 A | 1/1997 | Miyashita et al. |
| 5,595,837 A | 1/1997 | Olsen et al. |
| 5,597,662 A | 1/1997 | Isaacson et al. |
| 5,599,435 A | 2/1997 | Li et al. |
| 5,609,972 A | 3/1997 | Kaschmitter et al. |
| 5,609,974 A | 3/1997 | Sun |
| 5,612,153 A | 3/1997 | Moulton et al. |
| 5,616,152 A | 4/1997 | Velasquez et al. |
| 5,616,437 A | 4/1997 | Gao |
| 5,620,810 A | 4/1997 | Golovin et al. |
| 5,633,098 A | 5/1997 | Narang et al. |
| 5,643,665 A | 7/1997 | Saidi |
| 5,646,815 A | 7/1997 | Owens et al. |
| 5,648,011 A | 7/1997 | Blonsky |
| 5,660,948 A | 8/1997 | Barker |
| 5,670,273 A | 9/1997 | Velasquez et al. |
| 5,672,446 A | 9/1997 | Barker et al. |
| 5,672,465 A | 9/1997 | Patel et al. |
| 5,681,357 A | 10/1997 | Eschbach et al. |
| 5,682,043 A | 10/1997 | Pei et al. |
| 5,685,632 A | 11/1997 | Schaller et al. |
| 5,686,201 A | 11/1997 | Chu |
| 5,688,293 A | 11/1997 | Oliver et al. |
| 5,690,703 A | 11/1997 | Mitchell et al. |
| 5,698,338 A | 12/1997 | Barker et al. |
| 5,700,298 A | 12/1997 | Shi et al. |
| 5,707,760 A | 1/1998 | Stux et al. |
| 5,716,421 A | 2/1998 | Pendalwar et al. |
| 5,725,968 A | 3/1998 | Sato et al. |
| 5,728,489 A | 3/1998 | Gao et al. |
| 5,731,104 A | 3/1998 | Ventura et al. |
| 5,731,105 A | 3/1998 | Fleischer et al. |
| 5,733,681 A | 3/1998 | Li et al. |
| 5,733,683 A | 3/1998 | Searson et al. |
| 5,741,606 A | 4/1998 | Mayer et al. |
| 5,744,264 A | 4/1998 | Barker |
| 5,746,781 A | 5/1998 | Velasquez et al. |
| 5,753,388 A | 5/1998 | Koksbang et al. |
| 5,756,231 A | 5/1998 | Andrei et al. |
| 5,759,215 A | 6/1998 | Masuda |
| 5,772,702 A | 6/1998 | Barker et al. |
| 5,780,182 A | 7/1998 | Barker et al. |
| 5,780,185 A | 7/1998 | Oki et al. |
| 5,783,333 A | 7/1998 | Mayer |
| 5,786,110 A | 7/1998 | Angell et al. |
| 5,789,106 A | 8/1998 | Rosenmeier et al. |
| 5,789,108 A | 8/1998 | Chu |
| 5,789,110 A | 8/1998 | Saidi et al. |
| 5,795,679 A | 8/1998 | Kawakami et al. |
| 5,798,190 A | 8/1998 | Andrei et al. |
| 5,814,420 A | 9/1998 | Chu |
| 5,824,120 A | 10/1998 | Mitchell et al. |
| 5,824,434 A | 10/1998 | Kawakami et al. |
| 5,830,600 A | 11/1998 | Narang et al. |
| 5,834,135 A | 11/1998 | Pendalwar et al. |
| 5,837,015 A | 11/1998 | Venugopal et al. |
| 5,843,592 A | 12/1998 | Barker et al. |
| 5,846,673 A | 12/1998 | Saidi et al. |
| 5,849,025 A | 12/1998 | Owens et al. |
| 5,851,504 A | 12/1998 | Barker et al. |

(56) References Cited

U.S. PATENT DOCUMENTS

| | | |
|---|---|---|
| 5,853,916 A | 12/1998 | Venugopal et al. |
| 5,869,207 A | 2/1999 | Saidi et al. |
| 5,895,412 A | 4/1999 | Tucker |
| 5,895,717 A | 4/1999 | Cao et al. |
| 5,912,093 A | 6/1999 | Wen et al. |
| 5,916,708 A | 6/1999 | Besenhard et al. |
| 5,919,587 A | 7/1999 | Mukherjee et al. |
| 5,949,612 A | 9/1999 | Gudeman et al. |
| 5,962,169 A | 10/1999 | Angell et al. |
| 5,962,170 A | 10/1999 | Mitchell |
| 5,985,487 A | 11/1999 | Chaloner-Gill et al. |
| 5,998,559 A | 12/1999 | Narang et al. |
| 6,007,947 A | 12/1999 | Mayer |
| 6,013,393 A | 1/2000 | Taniuchi et al. |
| 6,015,638 A | 1/2000 | Ventura et al. |
| 6,030,720 A | 2/2000 | Chu et al. |
| 6,045,565 A | 4/2000 | Ellis et al. |
| 6,063,899 A | 5/2000 | Johnson et al. |
| 6,087,426 A | 7/2000 | Helms et al. |
| 6,096,453 A | 8/2000 | Grunwald |
| 6,103,419 A | 8/2000 | Saidi et al. |
| 6,103,426 A | 8/2000 | Narang et al. |
| 6,110,619 A | 8/2000 | Zhang et al. |
| 6,120,940 A | 9/2000 | Poehler et al. |
| 6,146,787 A | 11/2000 | Harrup et al. |
| 6,159,640 A | 12/2000 | Appel et al. |
| 6,168,885 B1 | 1/2001 | Narang et al. |
| 6,170,318 B1 | 1/2001 | Lewis |
| 6,174,623 B1 | 1/2001 | Shackle |
| RE37,076 E | 2/2001 | Barker |
| 6,183,718 B1 | 2/2001 | Barker et al. |
| 6,200,707 B1 | 3/2001 | Takada et al. |
| 6,203,949 B1 | 3/2001 | Ehrlich |
| 6,207,326 B1 | 3/2001 | Kawakami et al. |
| 6,210,831 B1 | 4/2001 | Gorkovenko et al. |
| 6,217,623 B1 | 4/2001 | Reichert et al. |
| 6,223,449 B1 | 5/2001 | Johnson et al. |
| 6,225,009 B1 | 5/2001 | Fleischer et al. |
| 6,238,406 B1 | 5/2001 | Ellis et al. |
| 6,238,821 B1 | 5/2001 | Mukherjee et al. |
| 6,268,558 B1 | 7/2001 | Kubota |
| 6,284,072 B1 | 9/2001 | Ryan et al. |
| 6,287,719 B1 | 9/2001 | Bailey |
| 6,288,187 B1 | 9/2001 | Armand |
| 6,306,546 B1 | 10/2001 | LaFleur et al. |
| 6,312,853 B1 | 11/2001 | Zhang et al. |
| 6,316,141 B1 | 11/2001 | Aurbach et al. |
| 6,316,149 B1 | 11/2001 | Garbe et al. |
| 6,328,770 B1 | 12/2001 | Gozdz |
| 6,337,101 B1 | 1/2002 | Gozdz |
| 6,337,156 B1 | 1/2002 | Narang et al. |
| 6,339,166 B1 | 1/2002 | Allcock et al. |
| 6,340,595 B1 | 1/2002 | Vogels et al. |
| 6,341,057 B1 | 1/2002 | Nissen et al. |
| 6,365,300 B1 | 4/2002 | Ota et al. |
| 6,376,123 B1 | 4/2002 | Chu |
| 6,379,842 B1 | 4/2002 | Mayer |
| 6,379,846 B1 | 4/2002 | Terahara et al. |
| 6,391,492 B1 | 5/2002 | Kawakami et al. |
| 6,395,423 B1 | 5/2002 | Kawakami et al. |
| 6,395,429 B1 | 5/2002 | Kang et al. |
| 6,406,814 B1 | 6/2002 | Gorkovenko et al. |
| 6,413,675 B1 | 7/2002 | Harada et al. |
| 6,413,676 B1 | 7/2002 | Munshi |
| 6,413,776 B1 | 7/2002 | Vogels et al. |
| 6,416,905 B1 | 7/2002 | Bronstert et al. |
| 6,426,397 B1 | 7/2002 | Armand et al. |
| 6,426,863 B1 | 7/2002 | Munshi |
| 6,444,370 B2 | 9/2002 | Barker et al. |
| 6,447,952 B1 | 9/2002 | Spiegel et al. |
| 6,452,089 B1 | 9/2002 | Kubota |
| 6,452,782 B1 | 9/2002 | Otsuki et al. |
| 6,467,156 B1 | 10/2002 | Velasquez et al. |
| 6,469,888 B1 | 10/2002 | Otsuki et al. |
| 6,472,104 B1 | 10/2002 | Ulrich et al. |
| 6,475,679 B1 | 11/2002 | Tsutiya et al. |
| 6,475,680 B1 | 11/2002 | Arai et al. |
| 6,482,545 B1 | 11/2002 | Skotheim et al. |
| 6,482,910 B1 | 11/2002 | Allcock et al. |
| 6,489,064 B2 | 12/2002 | Appel et al. |
| 6,492,449 B2 | 12/2002 | Michot et al. |
| 6,495,287 B1 | 12/2002 | Kolb et al. |
| 6,495,289 B1 | 12/2002 | Kawakami et al. |
| 6,509,122 B1 | 1/2003 | Oyama |
| 6,511,769 B1 | 1/2003 | Jung et al. |
| 6,524,737 B1 | 2/2003 | Tanii et al. |
| 6,537,697 B2 | 3/2003 | Kida et al. |
| 6,541,697 B1 | 4/2003 | Georg et al. |
| 6,544,400 B2 | 4/2003 | Hockaday et al. |
| 6,544,690 B1 | 4/2003 | Harrup et al. |
| 6,555,026 B1 | 4/2003 | Barker et al. |
| 6,558,850 B2 | 5/2003 | Ehrlich |
| 6,579,643 B1 | 6/2003 | Gozdz |
| 6,593,019 B2 | 7/2003 | Armand et al. |
| 6,596,440 B2 | 7/2003 | Gavelin et al. |
| 6,599,664 B2 | 7/2003 | Ehrlich |
| 6,605,237 B2 | 8/2003 | Allcock et al. |
| 6,613,475 B2 | 9/2003 | Fauteux et al. |
| 6,617,078 B1 | 9/2003 | Chia et al. |
| 6,620,308 B2 | 9/2003 | Gilbert |
| 6,620,553 B2 | 9/2003 | Shiga et al. |
| 6,645,675 B1 | 11/2003 | Munshi |
| 6,649,033 B2 | 11/2003 | Yagi et al. |
| 6,664,006 B1 | 12/2003 | Munshi |
| 6,667,106 B1 | 12/2003 | Kii et al. |
| 6,669,961 B2 | 12/2003 | Kim et al. |
| 6,673,273 B2 | 1/2004 | Ba Le et al. |
| 6,677,085 B2 | 1/2004 | Appel et al. |
| 6,682,849 B2 | 1/2004 | Narang et al. |
| 6,699,621 B2 | 3/2004 | Poehler et al. |
| 6,699,623 B1 | 3/2004 | Dai |
| 6,709,785 B2 | 3/2004 | Lee et al. |
| 6,721,168 B2 | 4/2004 | Takeuchi et al. |
| 6,723,349 B1 | 4/2004 | Hill et al. |
| 6,726,733 B2 | 4/2004 | Lee et al. |
| 6,730,435 B1 | 5/2004 | Nakane et al. |
| 6,743,549 B1 | 6/2004 | Doyle et al. |
| 6,746,794 B2 | 6/2004 | Mandal et al. |
| 6,749,617 B1 | 6/2004 | Palasis et al. |
| 6,751,491 B2 | 6/2004 | Lew et al. |
| 6,758,868 B2 | 7/2004 | Munshi |
| 6,759,164 B2 | 7/2004 | Palazzo et al. |
| 6,759,460 B2 | 7/2004 | Kamo et al. |
| 6,783,897 B2 | 8/2004 | Kang et al. |
| 6,790,243 B2 | 9/2004 | Vaidyanathan |
| 6,794,083 B2 | 9/2004 | Schmidt et al. |
| 6,794,086 B2 | 9/2004 | Dai et al. |
| 6,797,019 B2 | 9/2004 | Takeuchi et al. |
| 6,797,750 B2 | 9/2004 | Taniguchi et al. |
| 6,803,151 B2 | 10/2004 | Chen et al. |
| 6,808,804 B2 | 10/2004 | Hotaka et al. |
| 6,815,119 B2 | 11/2004 | Schmidt et al. |
| 6,828,065 B2 | 12/2004 | Munshi |
| 6,833,218 B2 | 12/2004 | Mann |
| 6,841,301 B2 | 1/2005 | Heider et al. |
| 6,858,691 B2 | 2/2005 | Armand et al. |
| 6,869,547 B2 | 3/2005 | Barker et al. |
| 6,878,127 B2 | 4/2005 | Brady et al. |
| 6,878,488 B2 | 4/2005 | Gorkovenko et al. |
| 6,893,462 B2 | 5/2005 | Buskirk et al. |
| 6,893,774 B2 | 5/2005 | Schmidt et al. |
| 6,908,186 B2 | 6/2005 | Zheng et al. |
| 6,924,061 B1 | 8/2005 | Jow et al. |
| 6,936,761 B2 | 8/2005 | Pichler |
| 6,939,647 B1 | 9/2005 | Jow et al. |
| 6,953,466 B2 | 10/2005 | Palasis et al. |
| 6,955,867 B1 | 10/2005 | Otsuki et al. |
| 6,991,876 B2 | 1/2006 | Narang et al. |
| 6,993,846 B2 | 2/2006 | Orloff |
| 7,005,206 B2 | 2/2006 | Lawrence et al. |
| 7,008,564 B2 | 3/2006 | Harrup et al. |
| 7,029,848 B2 | 4/2006 | Vogels et al. |
| 7,052,805 B2 | 5/2006 | Narang et al. |
| 7,060,744 B2 | 6/2006 | Murakami et al. |

(56) References Cited

U.S. PATENT DOCUMENTS

| | | |
|---|---|---|
| 7,067,219 B2 | 6/2006 | Otsuki et al. |
| 7,077,516 B2 | 7/2006 | Chen et al. |
| 7,081,320 B2 | 7/2006 | Kawakami et al. |
| 7,084,290 B2 | 8/2006 | Ignatyev et al. |
| 7,091,266 B2 | 8/2006 | Murakami et al. |
| 7,094,501 B2 | 8/2006 | Blau et al. |
| 7,099,142 B2 | 8/2006 | Otsuki et al. |
| 7,105,254 B2 | 9/2006 | Oyama |
| 7,115,695 B2 | 10/2006 | Okamoto et al. |
| 7,118,694 B2 | 10/2006 | Bronstert et al. |
| 7,129,005 B2 | 10/2006 | Wensley et al. |
| 7,192,564 B2 | 3/2007 | Cardarelli et al. |
| 7,195,840 B2 | 3/2007 | Kaun |
| 7,198,865 B2 | 4/2007 | Sloop |
| 7,198,870 B2 | 4/2007 | Wensley et al. |
| 7,211,351 B2 | 5/2007 | Klaassen |
| 7,226,702 B2 | 6/2007 | Oh et al. |
| 7,229,719 B2 | 6/2007 | Otsuki et al. |
| 7,238,450 B2 | 7/2007 | Howard, Jr. et al. |
| 7,238,451 B2 | 7/2007 | Frech et al. |
| 7,241,530 B2 | 7/2007 | Oogami |
| 7,247,740 B2 | 7/2007 | Schmidt et al. |
| 7,253,017 B1 | 8/2007 | Roscheisen et al. |
| 7,255,965 B2 | 8/2007 | Xu et al. |
| 7,265,379 B2 | 9/2007 | Sandberg et al. |
| 7,267,908 B2 | 9/2007 | Li et al. |
| 7,270,912 B2 | 9/2007 | Oogami |
| 7,271,228 B2 | 9/2007 | Armand et al. |
| 7,273,597 B2 | 9/2007 | Takeuchi et al. |
| 7,282,295 B2 | 10/2007 | Visco et al. |
| 7,282,296 B2 | 10/2007 | Visco et al. |
| 7,282,297 B2 | 10/2007 | Hisamitsu et al. |
| 7,282,302 B2 | 10/2007 | Visco et al. |
| 7,285,362 B2 | 10/2007 | Harrup et al. |
| 7,291,782 B2 | 11/2007 | Sager et al. |
| 7,295,423 B1 | 11/2007 | Mitchell et al. |
| 7,312,023 B2 | 12/2007 | Brady et al. |
| 7,316,855 B2 | 1/2008 | Lawrence et al. |
| 7,342,770 B2 | 3/2008 | Mitchell et al. |
| 7,344,804 B2 | 3/2008 | Klaassen |
| 7,352,558 B2 | 4/2008 | Zhong et al. |
| 7,368,130 B2 | 5/2008 | Kim et al. |
| 7,377,690 B1 | 5/2008 | Diede |
| 7,378,193 B2 | 5/2008 | Kang et al. |
| 7,390,591 B2 | 6/2008 | Visco et al. |
| 7,410,731 B2 | 8/2008 | Yoon et al. |
| 7,429,433 B2 | 9/2008 | Otsuki et al. |
| 7,442,471 B1 | 10/2008 | Jow et al. |
| 7,452,632 B2 | 11/2008 | Lee et al. |
| 7,465,492 B2 | 12/2008 | Gilbert |
| 7,473,491 B1 | 1/2009 | Amine et al. |
| 7,476,468 B1 | 1/2009 | Lam et al. |
| 7,491,458 B2 | 2/2009 | Visco et al. |
| 7,494,745 B2 | 2/2009 | Kim et al. |
| 7,498,102 B2 | 3/2009 | Oh et al. |
| 7,507,687 B2 | 3/2009 | Kodas et al. |
| 7,508,651 B2 | 3/2009 | Mitchell et al. |
| 7,513,910 B2 | 4/2009 | Buskirk et al. |
| 7,514,180 B2 | 4/2009 | Li |
| 7,524,439 B2 | 4/2009 | Otsuki et al. |
| 7,544,445 B2 | 6/2009 | Kinouchi et al. |
| 7,553,584 B2 | 6/2009 | Chiang et al. |
| 7,556,768 B2 | 7/2009 | Brady et al. |
| 7,557,637 B2 | 7/2009 | Sakamoto |
| 7,560,595 B2 | 7/2009 | Otsuki et al. |
| 7,572,554 B2 | 8/2009 | Koike et al. |
| 7,579,112 B2 | 8/2009 | Chiang et al. |
| 7,579,117 B1 | 8/2009 | Beard |
| 7,579,118 B2 | 8/2009 | Lee et al. |
| 7,582,380 B1 | 9/2009 | Dunstan et al. |
| 7,585,587 B2 | 9/2009 | Kanno et al. |
| 7,585,994 B2 | 9/2009 | Ignatyev et al. |
| 7,588,859 B1 | 9/2009 | Oh et al. |
| 7,594,982 B1 | 9/2009 | Roscheisen et al. |
| 7,598,002 B2 | 10/2009 | Gorkovenko et al. |
| 7,604,895 B2 | 10/2009 | Kim et al. |
| 7,608,178 B2 | 10/2009 | De Jonghe et al. |
| 7,615,280 B2 | 11/2009 | Behravesh et al. |
| 7,629,083 B2 | 12/2009 | Cho et al. |
| 7,635,530 B2 | 12/2009 | Kenis et al. |
| 7,645,543 B2 | 1/2010 | Visco et al. |
| 7,652,029 B2 | 1/2010 | Llompart et al. |
| 7,656,125 B2 | 2/2010 | Lampe-Onnerud et al. |
| 7,666,233 B2 | 2/2010 | Visco et al. |
| 7,678,505 B2 | 3/2010 | Lee et al. |
| 7,691,289 B2 | 4/2010 | Okun et al. |
| 7,695,860 B2 | 4/2010 | Amine et al. |
| 7,695,862 B2 | 4/2010 | Otsuki et al. |
| 7,704,468 B1 | 4/2010 | Klaehn et al. |
| 7,709,158 B1 | 5/2010 | Schlaikjer et al. |
| 7,713,449 B2 | 5/2010 | Adachi et al. |
| 7,718,321 B2 | 5/2010 | Yoon et al. |
| 7,718,826 B2 | 5/2010 | Otsuki et al. |
| 7,723,515 B1 | 5/2010 | DiMauro |
| 7,731,765 B2 | 6/2010 | Johnson |
| 7,736,806 B2 | 6/2010 | Shimamura et al. |
| 7,745,047 B2 | 6/2010 | Zhamu et al. |
| 7,745,670 B2 | 6/2010 | DiMauro |
| 7,759,418 B2 | 7/2010 | Murakami et al. |
| 7,760,614 B2 | 7/2010 | Peters et al. |
| 7,763,702 B2 | 7/2010 | Allcock et al. |
| 7,771,496 B1 | 8/2010 | Nakahara et al. |
| 7,771,880 B2 | 8/2010 | Kumar et al. |
| 7,776,478 B2 | 8/2010 | Klaassen |
| 7,781,098 B2 | 8/2010 | Chiang et al. |
| 7,781,105 B2 | 8/2010 | Lee et al. |
| 7,781,108 B2 | 8/2010 | Visco et al. |
| 7,790,312 B2 | 9/2010 | Costello et al. |
| 7,790,315 B2 | 9/2010 | Mukherjee et al. |
| 7,791,861 B2 | 9/2010 | Zhong et al. |
| 7,811,700 B2 | 10/2010 | Hennige et al. |
| 7,811,707 B2 | 10/2010 | Lampe-Onnerud et al. |
| 7,811,708 B2 | 10/2010 | Lampe-Onnerud et al. |
| 7,816,032 B2 | 10/2010 | Honda et al. |
| 7,820,328 B1 | 10/2010 | Takeuchi et al. |
| 7,824,800 B1 | 11/2010 | Dunstan et al. |
| 7,828,728 B2 | 11/2010 | Boock et al. |
| 7,829,212 B2 | 11/2010 | Visco et al. |
| 7,829,242 B2 | 11/2010 | Horpel et al. |
| 7,838,143 B2 | 11/2010 | Onnerud et al. |
| 7,838,144 B2 | 11/2010 | Visco et al. |
| 7,838,148 B2 | 11/2010 | Nakaoka |
| 7,846,650 B2 | 12/2010 | Brady et al. |
| 7,851,090 B2 | 12/2010 | Park et al. |
| 7,854,743 B2 | 12/2010 | Palasis et al. |
| 7,858,216 B2 | 12/2010 | Sloop |
| 7,858,222 B2 | 12/2010 | Hennige et al. |
| 7,858,223 B2 | 12/2010 | Visco et al. |
| 7,864,397 B2 | 1/2011 | Wu et al. |
| 7,871,721 B2 | 1/2011 | Kim et al. |
| 7,875,204 B2 | 1/2011 | Pan et al. |
| 7,875,393 B2 | 1/2011 | Ryu et al. |
| 7,883,794 B2 | 2/2011 | Kim et al. |
| 7,887,970 B1 | 2/2011 | Gerald, II et al. |
| 7,901,830 B1 | 3/2011 | Gerald, II et al. |
| 7,906,643 B2 | 3/2011 | DiMauro |
| 7,919,629 B2 | 4/2011 | Michot |
| 7,923,801 B2 | 4/2011 | Tian et al. |
| 7,931,989 B2 | 4/2011 | Klaassen |
| 7,939,198 B2 | 5/2011 | Mukherjee et al. |
| 7,939,199 B1 | 5/2011 | Gan et al. |
| 7,939,205 B2 | 5/2011 | Klaassen |
| 7,939,206 B2 | 5/2011 | Otsuki et al. |
| 7,951,495 B2 | 5/2011 | Otsuki et al. |
| 7,960,061 B2 | 6/2011 | Jost et al. |
| 7,965,062 B2 | 6/2011 | Kishi et al. |
| 7,976,983 B2 | 7/2011 | Nakura |
| 7,977,393 B2 | 7/2011 | Yoshimura |
| 7,977,413 B2 | 7/2011 | Peters et al. |
| 7,981,567 B2 | 7/2011 | Yoshimura et al. |
| 7,985,776 B2 | 7/2011 | Lilienfeld et al. |
| 7,988,746 B2 | 8/2011 | Chiang et al. |
| 7,989,109 B2 | 8/2011 | Lee et al. |
| 7,993,780 B2 | 8/2011 | Jang et al. |

(56) References Cited

U.S. PATENT DOCUMENTS

| | | |
|---|---|---|
| 7,993,782 B2 | 8/2011 | Takada et al. |
| 7,998,626 B2 | 8/2011 | Visco et al. |
| 8,000,084 B2 | 8/2011 | Siggel et al. |
| 8,002,851 B2 | 8/2011 | Fyvie et al. |
| 8,003,241 B2 | 8/2011 | Partin et al. |
| 8,003,256 B2 | 8/2011 | Ohishi |
| 8,004,057 B2 | 8/2011 | Tian et al. |
| 8,007,940 B2 | 8/2011 | Marple et al. |
| 8,012,615 B2 | 9/2011 | Onnerud et al. |
| 8,013,412 B2 | 9/2011 | Tian |
| 8,021,775 B2 | 9/2011 | Kaun |
| 8,026,008 B2 | 9/2011 | Kim et al. |
| 8,026,394 B2 | 9/2011 | Yamamoto et al. |
| 8,026,510 B2 | 9/2011 | Mori et al. |
| 8,030,500 B2 | 10/2011 | Holenz et al. |
| 8,034,491 B2 | 10/2011 | Ryu et al. |
| 8,039,996 B2 | 10/2011 | Peters et al. |
| 8,048,569 B2 | 11/2011 | Fujikawa et al. |
| 8,048,571 B2 | 11/2011 | Visco et al. |
| 8,057,937 B2 | 11/2011 | Sung et al. |
| 8,062,796 B2 | 11/2011 | Yoon et al. |
| 8,067,107 B2 | 11/2011 | Sloop et al. |
| 8,071,127 B2 | 12/2011 | Cipolla et al. |
| 8,071,233 B2 | 12/2011 | Partin et al. |
| 8,072,734 B2 | 12/2011 | Zhong et al. |
| 8,076,031 B1 | 12/2011 | West et al. |
| 8,076,032 B1 | 12/2011 | West et al. |
| 8,084,998 B2 | 12/2011 | Lampe-Onnerud et al. |
| 8,088,785 B2 | 1/2012 | Llompart et al. |
| 8,092,940 B2 | 1/2012 | Tabuchi et al. |
| 8,092,942 B1 | 1/2012 | Chen et al. |
| 8,105,733 B2 | 1/2012 | Hoerpel et al. |
| 8,110,001 B2 | 2/2012 | Carter et al. |
| 8,114,171 B2 | 2/2012 | Visco et al. |
| 8,119,038 B2 | 2/2012 | Lee et al. |
| 8,119,156 B2 | 2/2012 | Cipolla et al. |
| 8,119,233 B2 | 2/2012 | Chiruvolu et al. |
| 8,119,288 B2 | 2/2012 | Zhamu et al. |
| 8,124,269 B2 | 2/2012 | Takahashi et al. |
| 8,124,274 B2 | 2/2012 | Marple et al. |
| 8,129,052 B2 | 3/2012 | Visco et al. |
| 8,133,614 B1 | 3/2012 | Gan et al. |
| 8,137,844 B2 | 3/2012 | Awano et al. |
| 8,138,168 B1 | 3/2012 | Jones et al. |
| 8,138,231 B2 | 3/2012 | Liebeskind et al. |
| 8,138,380 B2 | 3/2012 | Olah et al. |
| 8,148,009 B2 | 4/2012 | Chiang et al. |
| 8,153,307 B1 | 4/2012 | Tanaka et al. |
| 8,153,435 B1 | 4/2012 | Fraser |
| 8,158,282 B2 | 4/2012 | Zhamu et al. |
| 8,163,204 B2 | 4/2012 | Elliott et al. |
| 8,163,441 B2 | 4/2012 | Hoerpel et al. |
| 8,167,920 B2 | 5/2012 | DiMauro et al. |
| 8,168,326 B2 | 5/2012 | Chiang et al. |
| 8,168,330 B2 | 5/2012 | Tan et al. |
| 8,168,331 B2 | 5/2012 | Best et al. |
| 8,168,831 B2 | 5/2012 | Otsuki et al. |
| 8,178,009 B2 | 5/2012 | Watanabe |
| 8,178,215 B2 | 5/2012 | Yabe et al. |
| 8,182,943 B2 | 5/2012 | Visco et al. |
| 8,187,749 B2 | 5/2012 | Takahashi et al. |
| 8,192,863 B2 | 6/2012 | Best et al. |
| 8,202,598 B2 | 6/2012 | Peters et al. |
| 8,202,649 B2 | 6/2012 | Visco et al. |
| 8,206,468 B2 | 6/2012 | Chiang et al. |
| 8,206,469 B2 | 6/2012 | Chiang et al. |
| 8,211,336 B2 | 7/2012 | Miyasaka et al. |
| 8,216,722 B2 | 7/2012 | Gordon |
| 8,221,915 B2 | 7/2012 | Tikhonov et al. |
| 8,223,473 B2 | 7/2012 | Dreissig et al. |
| 8,227,103 B2 | 7/2012 | Tsukamoto |
| 8,227,105 B1 | 7/2012 | Gerald, II et al. |
| 8,227,114 B2 | 7/2012 | Tokita et al. |
| 8,236,446 B2 | 8/2012 | Lu |
| 8,236,449 B2 | 8/2012 | Nakura |
| 8,241,458 B2 | 8/2012 | Barinov et al. |
| 8,241,789 B2 | 8/2012 | Chiang et al. |
| 8,241,793 B2 | 8/2012 | Zhamu et al. |
| 8,257,866 B2 | 9/2012 | Loveness et al. |
| 8,257,870 B2 | 9/2012 | Horikawa |
| 8,263,248 B2 | 9/2012 | Kaun |
| 8,263,697 B2 | 9/2012 | Miyoshi et al. |
| 8,268,197 B2 | 9/2012 | Singh et al. |
| 8,268,347 B1 | 9/2012 | Cipolla et al. |
| 8,269,260 B2 | 9/2012 | Tian et al. |
| 8,269,302 B2 | 9/2012 | Tian et al. |
| 8,274,126 B2 | 9/2012 | Tian et al. |
| 8,277,975 B2 | 10/2012 | Chiang et al. |
| 8,283,071 B2 | 10/2012 | Marple et al. |
| 8,283,325 B2 | 10/2012 | Nam et al. |
| 8,284,539 B2 | 10/2012 | Lu et al. |
| 8,287,483 B2 | 10/2012 | Mitragotri et al. |
| 8,288,444 B2 | 10/2012 | Lilienfeld et al. |
| 8,293,398 B2 | 10/2012 | Visco et al. |
| 8,301,322 B2 | 10/2012 | Mitsutani |
| 8,308,971 B1 | 11/2012 | Bhat et al. |
| 8,309,240 B1 | 11/2012 | Li et al. |
| 8,315,700 B2 | 11/2012 | Citron et al. |
| 8,318,342 B2 | 11/2012 | Ueda |
| 8,323,815 B2 | 12/2012 | Beard |
| 8,323,820 B2 | 12/2012 | Visco et al. |
| 8,329,388 B2 | 12/2012 | Brady et al. |
| 8,334,075 B2 | 12/2012 | Visco et al. |
| 8,334,094 B2 | 12/2012 | Brady et al. |
| 8,349,550 B2 | 1/2013 | Brady et al. |
| 8,350,093 B2 | 1/2013 | DiMauro |
| 8,357,450 B2 | 1/2013 | Miyoshi et al. |
| 8,357,464 B2 | 1/2013 | Sastry et al. |
| 8,357,468 B2 | 1/2013 | Exnar et al. |
| 8,361,658 B2 | 1/2013 | Shimamura et al. |
| 8,361,664 B2 | 1/2013 | Visco et al. |
| 8,367,755 B2 | 2/2013 | Terada |
| 8,377,586 B2 | 2/2013 | Yazami |
| 8,377,596 B2 | 2/2013 | Kaneko et al. |
| 8,384,058 B2 | 2/2013 | Green |
| 8,389,147 B2 | 3/2013 | Visco et al. |
| 8,389,173 B2 | 3/2013 | Akiyama et al. |
| 8,409,103 B2 | 4/2013 | Grunwald et al. |
| 8,414,915 B2 | 4/2013 | Cipolla et al. |
| 8,415,045 B2 | 4/2013 | Miyajima et al. |
| 8,420,266 B2 | 4/2013 | Utsumi |
| 8,426,060 B2 | 4/2013 | Hisamitsu et al. |
| 8,435,679 B2 | 5/2013 | Lamanna et al. |
| 8,441,090 B2 | 5/2013 | Tian et al. |
| 8,445,136 B2 | 5/2013 | Visco et al. |
| 8,450,012 B2 | 5/2013 | Cui et al. |
| 8,455,131 B2 | 6/2013 | Visco et al. |
| 8,455,141 B2 | 6/2013 | Nakamura et al. |
| 8,459,213 B2 | 6/2013 | Moriarty et al. |
| 8,465,871 B2 | 6/2013 | Juzkow et al. |
| 8,466,533 B2 | 6/2013 | Tian et al. |
| 8,470,472 B2 | 6/2013 | Nishie et al. |
| 8,476,451 B2 | 7/2013 | Ellman et al. |
| 8,476,727 B2 | 7/2013 | Tian et al. |
| 8,481,195 B1 | 7/2013 | Liu |
| 8,482,093 B2 | 7/2013 | Tian et al. |
| 8,486,560 B2 | 7/2013 | Tartaglia |
| 8,486,565 B2 | 7/2013 | Hinago et al. |
| 8,492,023 B2 | 7/2013 | Sastry et al. |
| 8,492,033 B2 | 7/2013 | Amine et al. |
| 8,501,339 B2 | 8/2013 | Visco et al. |
| 8,501,481 B1 | 8/2013 | Fraser |
| 8,512,896 B2 | 8/2013 | Ryu et al. |
| 8,512,899 B2 | 8/2013 | Michot et al. |
| 8,513,758 B2 | 8/2013 | Tian et al. |
| 8,518,390 B2 | 8/2013 | Kramer et al. |
| 8,518,525 B2 | 8/2013 | Dennes et al. |
| 8,524,399 B2 | 9/2013 | Kim et al. |
| 8,525,287 B2 | 9/2013 | Tian et al. |
| 8,529,867 B2 | 9/2013 | Fullerton |
| 8,530,099 B2 | 9/2013 | Chen et al. |
| 8,530,551 B2 | 9/2013 | Eckel et al. |
| 8,530,940 B2 | 9/2013 | Tian et al. |
| 8,530,991 B2 | 9/2013 | Tian et al. |

(56) References Cited

U.S. PATENT DOCUMENTS

| | | |
|---|---|---|
| 8,530,992 B2 | 9/2013 | Tian et al. |
| 8,530,993 B2 | 9/2013 | Tian et al. |
| 8,540,899 B2 | 9/2013 | Miller |
| 8,541,136 B2 | 9/2013 | Beck et al. |
| 8,546,023 B2 | 10/2013 | Park et al. |
| 8,546,853 B2 | 10/2013 | Tian et al. |
| 8,556,996 B2 | 10/2013 | Loveness et al. |
| 8,557,444 B2 | 10/2013 | Arora et al. |
| 8,558,286 B2 | 10/2013 | Tian et al. |
| 8,562,873 B2 | 10/2013 | Murakami |
| 8,563,168 B2 | 10/2013 | Balsara et al. |
| 8,563,761 B2 | 10/2013 | Armand et al. |
| 8,574,534 B2 | 11/2013 | Dai et al. |
| 8,574,773 B2 | 11/2013 | Wilson et al. |
| 8,575,246 B2 | 11/2013 | Ishii et al. |
| 8,579,994 B2 | 11/2013 | Kawaoka et al. |
| 8,580,430 B2 | 11/2013 | Chiang et al. |
| 8,580,432 B2 | 11/2013 | Zhamu et al. |
| 8,580,438 B2 | 11/2013 | Farmer et al. |
| 8,580,735 B2 | 11/2013 | Francois et al. |
| 8,586,238 B2 | 11/2013 | Chiang et al. |
| 8,591,531 B2 | 11/2013 | Buevich et al. |
| 8,592,075 B1 | 11/2013 | Gerald, II et al. |
| 8,592,081 B2 | 11/2013 | Utsumi |
| 8,597,815 B2 | 12/2013 | Takahashi et al. |
| 8,597,827 B2 | 12/2013 | Kako et al. |
| 8,599,534 B2 | 12/2013 | Farahmandi |
| 8,609,652 B2 | 12/2013 | DiMauro |
| 8,617,736 B2 | 12/2013 | Bhatt et al. |
| 8,623,543 B2 | 1/2014 | Sastry et al. |
| 8,623,556 B1 | 1/2014 | Liu |
| 8,623,964 B2 | 1/2014 | Song et al. |
| 8,628,873 B2 | 1/2014 | Kawasoe et al. |
| 8,632,898 B2 | 1/2014 | Dougherty et al. |
| 8,643,064 B2 | 2/2014 | Tian et al. |
| 8,647,773 B2 | 2/2014 | Goodenough et al. |
| 8,652,686 B2 | 2/2014 | Visco et al. |
| 8,652,688 B2 | 2/2014 | Yushin et al. |
| 8,652,692 B2 | 2/2014 | Visco et al. |
| 8,657,176 B2 | 2/2014 | Shelton, IV et al. |
| 8,658,062 B2 | 2/2014 | Kumta et al. |
| 8,658,304 B2 | 2/2014 | Visco et al. |
| 8,663,841 B2 | 3/2014 | Tajima et al. |
| 8,669,114 B2 | 3/2014 | Sundermeyer et al. |
| 8,671,684 B2 | 3/2014 | Moriarty |
| 8,673,477 B2 | 3/2014 | Visco et al. |
| 8,673,499 B2 | 3/2014 | Nakura |
| 8,673,503 B2 | 3/2014 | Balaji et al. |
| 8,679,670 B2 | 3/2014 | Onnerud et al. |
| 8,679,684 B2 | 3/2014 | Kolosnitsyn et al. |
| 8,679,686 B2 | 3/2014 | Patoux et al. |
| 8,685,537 B2 | 4/2014 | Imai et al. |
| 8,685,569 B2 | 4/2014 | Oguni et al. |
| 8,686,074 B2 | 4/2014 | Tanji et al. |
| 8,691,444 B2 | 4/2014 | Visco et al. |
| 8,703,310 B2 | 4/2014 | Mullin et al. |
| 8,703,344 B2 | 4/2014 | Bhat et al. |
| 8,703,345 B2 | 4/2014 | Lee et al. |
| 8,709,198 B2 | 4/2014 | Miller |
| 8,709,679 B2 | 4/2014 | Visco et al. |
| 8,715,863 B2 | 5/2014 | Zhang et al. |
| 8,715,865 B2 | 5/2014 | Xu et al. |
| 8,728,170 B1 | 5/2014 | Atanasoska et al. |
| 8,734,668 B2 | 5/2014 | Bhat et al. |
| 8,734,674 B1 | 5/2014 | Hersam et al. |
| 8,734,983 B2 | 5/2014 | Kaun |
| 8,734,988 B2 | 5/2014 | Palanichamy et al. |
| 8,735,005 B2 | 5/2014 | Holstein et al. |
| 8,740,038 B2 | 6/2014 | Shelton, IV et al. |
| 8,741,486 B1 | 6/2014 | Jacobsen et al. |
| 8,741,500 B2 | 6/2014 | Fujita et al. |
| 8,746,535 B2 | 6/2014 | Shelton, IV et al. |
| 8,748,046 B2 | 6/2014 | Smart et al. |
| 8,754,138 B2 | 6/2014 | Michot et al. |
| 8,758,946 B2 | 6/2014 | McDonald |
| 8,764,853 B2 | 7/2014 | Xu et al. |
| 8,765,295 B2 | 7/2014 | West et al. |
| 8,765,303 B2 | 7/2014 | Chen et al. |
| 8,765,306 B2 | 7/2014 | Amiruddin et al. |
| 8,777,004 B2 | 7/2014 | Shelton, IV et al. |
| 8,778,233 B2 | 7/2014 | Ueno et al. |
| 8,778,522 B2 | 7/2014 | Visco et al. |
| 8,778,533 B2 | 7/2014 | Iwayasu et al. |
| 8,778,540 B1 | 7/2014 | Farmer et al. |
| 8,778,546 B2 | 7/2014 | Farmer |
| 8,784,694 B2 | 7/2014 | Kay |
| 8,785,022 B2 | 7/2014 | Sato et al. |
| 8,785,034 B2 | 7/2014 | Forster et al. |
| 8,785,921 B2 | 7/2014 | Ueno et al. |
| 8,786,932 B2 | 7/2014 | Copeland et al. |
| 8,790,814 B2 | 7/2014 | Wang et al. |
| 8,795,886 B2 | 8/2014 | Adachi et al. |
| 8,795,903 B2 | 8/2014 | Smart et al. |
| 8,801,810 B1 | 8/2014 | Cui et al. |
| 8,802,285 B2 | 8/2014 | Ryu et al. |
| 8,808,377 B2 | 8/2014 | Donner |
| 8,808,924 B2 | 8/2014 | Lee et al. |
| 8,814,956 B2 | 8/2014 | Yamazaki |
| 8,815,199 B2 | 8/2014 | Morinaka et al. |
| 8,815,432 B2 | 8/2014 | Jo et al. |
| 8,815,443 B2 | 8/2014 | Mitchell et al. |
| 8,815,453 B1 | 8/2014 | Tsukamoto |
| 8,815,587 B2 | 8/2014 | Harris et al. |
| 8,821,559 B2 | 9/2014 | DiMauro et al. |
| 8,822,084 B2 | 9/2014 | Tsujioka et al. |
| 8,822,088 B2 | 9/2014 | Tajima et al. |
| 8,828,573 B2 | 9/2014 | Visco et al. |
| 8,828,574 B2 | 9/2014 | Visco et al. |
| 8,828,575 B2 | 9/2014 | Visco et al. |
| 8,828,580 B2 | 9/2014 | Visco et al. |
| 8,828,605 B2 | 9/2014 | Lampe-Onnerud |
| 8,840,856 B2 | 9/2014 | Morinaka et al. |
| 8,841,014 B1 | 9/2014 | Deshpande et al. |
| 8,841,035 B2 | 9/2014 | Choi et al. |
| 8,845,764 B2 | 9/2014 | Kuriki |
| 8,846,249 B2 | 9/2014 | Nakura |
| 8,846,251 B2 | 9/2014 | Cui et al. |
| 8,846,922 B2 | 9/2014 | Hoge et al. |
| 8,852,801 B2 | 10/2014 | Takada et al. |
| 8,852,808 B2 | 10/2014 | Arora et al. |
| 8,852,813 B2 | 10/2014 | Madabusi et al. |
| 8,857,694 B2 | 10/2014 | Shelton, IV et al. |
| 8,858,837 B2 | 10/2014 | Oh et al. |
| 8,859,149 B2 | 10/2014 | Nakamura |
| 8,860,009 B2 | 10/2014 | Ueno et al. |
| 8,864,009 B2 | 10/2014 | Shelton, IV et al. |
| 8,865,342 B2 | 10/2014 | Monden et al. |
| 8,865,355 B2 | 10/2014 | Iriyama et al. |
| 8,870,810 B2 | 10/2014 | Mitragotri et al. |
| 8,871,385 B2 | 10/2014 | Gering et al. |
| 8,871,390 B2 | 10/2014 | Balaji et al. |
| 8,883,344 B2 | 11/2014 | Park et al. |
| 8,889,285 B2 | 11/2014 | Sastry et al. |
| 8,889,301 B2 | 11/2014 | Balsara et al. |
| 8,895,189 B2 | 11/2014 | Zhamu et al. |
| 8,900,754 B2 | 12/2014 | Hinago et al. |
| 8,906,447 B2 | 12/2014 | Zhamu et al. |
| 8,906,515 B2 | 12/2014 | Tomantschger et al. |
| 8,906,548 B2 | 12/2014 | Voelker et al. |
| 8,906,549 B1 | 12/2014 | Palazzo |
| 8,907,133 B2 | 12/2014 | Gellett et al. |
| 8,911,639 B2 | 12/2014 | Lynd et al. |
| 8,916,291 B2 | 12/2014 | Ichihashi et al. |
| 8,922,959 B2 | 12/2014 | Cho et al. |
| 8,927,099 B2 | 1/2015 | Ueno et al. |
| 8,927,127 B2 | 1/2015 | Hosoya et al. |
| 8,927,775 B2 | 1/2015 | Rupert et al. |
| 8,929,054 B2 | 1/2015 | Felten et al. |
| 8,932,771 B2 | 1/2015 | Visco et al. |
| 8,936,882 B2 | 1/2015 | Abraham et al. |
| 8,940,444 B2 | 1/2015 | Gennett et al. |
| 8,940,446 B1 | 1/2015 | Holme et al. |
| 8,945,774 B2 | 2/2015 | Coowar et al. |
| 8,951,670 B2 | 2/2015 | Alarco et al. |

(56) References Cited

U.S. PATENT DOCUMENTS

| | | |
|---|---|---|
| 8,951,673 B2 | 2/2015 | Wessells et al. |
| 8,951,676 B2 | 2/2015 | Doe et al. |
| 8,955,588 B2 | 2/2015 | Ogle et al. |
| 8,961,738 B2 | 2/2015 | Barinov et al. |
| 8,962,173 B1 | 2/2015 | Liu |
| 8,968,820 B2 | 3/2015 | Zhamu et al. |
| 8,968,909 B2 | 3/2015 | Kim et al. |
| 8,968,921 B2 | 3/2015 | Yazami |
| 8,974,947 B2 | 3/2015 | Fujii et al. |
| 8,978,954 B2 | 3/2015 | Shelton, IV et al. |
| 8,979,928 B2 | 3/2015 | Donner |
| 8,980,474 B2 | 3/2015 | Kim et al. |
| 8,980,602 B2 | 3/2015 | Medoff |
| 8,981,723 B2 | 3/2015 | Suto |
| 8,986,638 B2 | 3/2015 | Ivanovic-Burmazovic et al. |
| 8,986,881 B2 | 3/2015 | Kako et al. |
| 8,999,008 B2 | 4/2015 | Hudson et al. |
| 8,999,009 B2 | 4/2015 | Tikhonov et al. |
| 9,010,442 B2 | 4/2015 | Streich et al. |
| 9,011,731 B2 | 4/2015 | Fu et al. |
| 9,012,093 B2 | 4/2015 | Matsumoto et al. |
| 9,012,094 B2 | 4/2015 | Tikhonov et al. |
| 9,016,542 B2 | 4/2015 | Shelton, IV et al. |
| 9,017,879 B2 | 4/2015 | Park et al. |
| 9,023,114 B2 | 5/2015 | Buevich et al. |
| 9,028,864 B2 | 5/2015 | Cipolla et al. |
| 9,029,019 B2 | 5/2015 | Jang et al. |
| 9,029,022 B2 | 5/2015 | Miyagi et al. |
| 9,034,519 B2 | 5/2015 | Xiao et al. |
| 9,039,788 B2 | 5/2015 | Xu et al. |
| 9,050,084 B2 | 6/2015 | Schmid et al. |
| 9,051,629 B2 | 6/2015 | Heres et al. |
| 9,055,941 B2 | 6/2015 | Schmid et al. |
| 9,057,712 B1 | 6/2015 | Fraser |
| 9,059,477 B2 | 6/2015 | Oh et al. |
| 9,059,481 B2 | 6/2015 | He et al. |
| 9,061,261 B2 | 6/2015 | Fullerton |
| 9,065,080 B2 | 6/2015 | Sastry et al. |
| 9,070,948 B2 | 6/2015 | Yu |
| 9,076,589 B2 | 7/2015 | Wright et al. |
| 9,076,591 B2 | 7/2015 | Zheng |
| 9,077,037 B2 | 7/2015 | Hwu et al. |
| 9,077,046 B2 | 7/2015 | Tikhonov et al. |
| 9,078,897 B1 | 7/2015 | Cipolla et al. |
| 9,093,693 B2 | 7/2015 | Zhamu et al. |
| 9,093,716 B2 | 7/2015 | Tokuda et al. |
| 9,093,722 B2 | 7/2015 | Zhang et al. |
| 9,099,252 B2 | 8/2015 | Liu et al. |
| 9,099,738 B2 | 8/2015 | Blomgren et al. |
| 9,099,756 B2 | 8/2015 | Choi et al. |
| 9,105,908 B2 | 8/2015 | Peuchert et al. |
| 9,105,942 B2 | 8/2015 | Koga et al. |
| 9,111,684 B2 | 8/2015 | Onagi et al. |
| 9,112,210 B2 | 8/2015 | Chen et al. |
| 9,112,212 B1 | 8/2015 | Fasching et al. |
| 9,112,236 B2 | 8/2015 | Miyagi et al. |
| 9,112,239 B2 | 8/2015 | Wu et al. |
| 9,113,865 B2 | 8/2015 | Shelton, IV et al. |
| 9,118,088 B2 | 8/2015 | Ohashi et al. |
| 9,120,121 B2 | 9/2015 | Miller |
| 9,123,941 B2 | 9/2015 | Visco et al. |
| 9,123,969 B2 | 9/2015 | Sastry et al. |
| 9,123,973 B2 | 9/2015 | Lee et al. |
| 9,129,754 B2 | 9/2015 | Kuriki et al. |
| 9,129,756 B2 | 9/2015 | Gadkaree et al. |
| 9,130,214 B2 | 9/2015 | Wakayama et al. |
| 9,130,243 B2 | 9/2015 | Nogi et al. |
| 9,130,245 B2 | 9/2015 | Utsumi |
| 9,130,246 B2 | 9/2015 | Han et al. |
| 9,134,547 B2 | 9/2015 | McCabe et al. |
| 9,136,568 B2 | 9/2015 | Visco et al. |
| 9,142,357 B2 | 9/2015 | Matsumoto |
| 9,147,874 B2 | 9/2015 | Chen et al. |
| 9,147,906 B2 | 9/2015 | Tang et al. |
| 9,166,206 B2 | 10/2015 | Kairawicz et al. |
| 9,166,222 B2 | 10/2015 | Amiruddin et al. |
| 9,166,249 B2 | 10/2015 | Darolles et al. |
| 9,168,038 B2 | 10/2015 | Shelton, IV et al. |
| 9,172,076 B2 | 10/2015 | Luski et al. |
| 9,172,088 B2 | 10/2015 | Loveness et al. |
| 9,172,094 B2 | 10/2015 | Loveness et al. |
| 9,176,357 B2 | 11/2015 | Lam et al. |
| 9,183,994 B2 | 11/2015 | Gadkaree et al. |
| 9,183,995 B2 | 11/2015 | Inoue et al. |
| 9,184,467 B2 | 11/2015 | Tikhonov et al. |
| 9,184,468 B2 | 11/2015 | Tikhonov et al. |
| 9,187,640 B2 | 11/2015 | Furukawa et al. |
| 9,187,834 B2 | 11/2015 | Albrecht et al. |
| 9,187,835 B2 | 11/2015 | Albrecht et al. |
| 9,190,616 B2 | 11/2015 | Paulasaari et al. |
| 9,190,667 B2 | 11/2015 | Zhamu et al. |
| 9,190,695 B2 | 11/2015 | Okamoto et al. |
| 9,190,696 B2 | 11/2015 | He et al. |
| 9,190,698 B2 | 11/2015 | Smart et al. |
| 9,193,868 B1 | 11/2015 | Sato et al. |
| 9,196,781 B2 | 11/2015 | Tian et al. |
| 9,196,926 B2 | 11/2015 | Kaneko et al. |
| 9,198,600 B2 | 12/2015 | Grunwald et al. |
| 9,198,662 B2 | 12/2015 | Barton et al. |
| 9,200,375 B2 | 12/2015 | Gilliam et al. |
| 9,203,084 B2 | 12/2015 | Wang et al. |
| 9,203,107 B2 | 12/2015 | Kawasaki et al. |
| 9,203,113 B2 | 12/2015 | Miyoshi et al. |
| 9,204,819 B2 | 12/2015 | Grunwald et al. |
| 9,204,880 B2 | 12/2015 | Baxter, III et al. |
| 9,206,210 B2 | 12/2015 | Gering et al. |
| 9,207,513 B2 | 12/2015 | Milliron et al. |
| 9,209,446 B2 | 12/2015 | Carlson |
| 9,209,456 B2 | 12/2015 | Fasching et al. |
| 9,211,120 B2 | 12/2015 | Scheib et al. |
| 9,214,659 B2 | 12/2015 | Horpel et al. |
| 9,214,696 B2 | 12/2015 | Min et al. |
| 9,216,019 B2 | 12/2015 | Schmid et al. |
| 9,219,274 B2 | 12/2015 | Kawasaki et al. |
| 9,220,500 B2 | 12/2015 | Swayze et al. |
| 9,220,501 B2 | 12/2015 | Baxter, III et al. |
| 9,222,926 B1 | 12/2015 | Fraser |
| 9,225,003 B2 | 12/2015 | Yukawa |
| 9,225,038 B2 | 12/2015 | Hirose |
| 9,227,850 B2 | 1/2016 | Ooishi |
| 9,227,956 B2 | 1/2016 | Darout et al. |
| 9,230,746 B2 | 1/2016 | Miyoshi et al. |
| 9,231,243 B2 | 1/2016 | Cui et al. |
| 9,231,335 B2 | 1/2016 | Ishii et al. |
| 9,232,941 B2 | 1/2016 | Mandakolathur Vasudevan et al. |
| 9,236,599 B2 | 1/2016 | Zhong |
| 9,236,633 B2 | 1/2016 | Chen et al. |
| 9,236,634 B2 | 1/2016 | Cheng et al. |
| 9,236,635 B2 | 1/2016 | Abe et al. |
| 9,240,614 B2 | 1/2016 | Abe et al. |
| 9,241,714 B2 | 1/2016 | Timm et al. |
| 9,245,691 B1 | 1/2016 | Zheng |
| 9,246,150 B2 | 1/2016 | Tsujikawa et al. |
| 9,252,399 B2 | 2/2016 | Chamberlain, II et al. |
| 9,252,419 B2 | 2/2016 | Miwa et al. |
| 9,252,422 B2 | 2/2016 | Kim et al. |
| 9,252,455 B1 | 2/2016 | Liu et al. |
| 9,252,456 B2 | 2/2016 | Kofinas et al. |
| 9,257,720 B2 | 2/2016 | Okamoto et al. |
| 9,259,424 B2 | 2/2016 | Cipolla et al. |
| 9,259,690 B2 | 2/2016 | Hanakawa et al. |
| 9,263,731 B2 | 2/2016 | Tikhonov et al. |
| 9,263,764 B2 | 2/2016 | Roh et al. |
| 9,269,961 B2 | 2/2016 | Forster et al. |
| 9,269,998 B2 | 2/2016 | Hayes et al. |
| 9,271,899 B2 | 3/2016 | Francois |
| 9,272,406 B2 | 3/2016 | Aronhalt et al. |
| 9,273,399 B2 | 3/2016 | Hellring et al. |
| 9,276,268 B2 | 3/2016 | Wieland |
| 9,277,919 B2 | 3/2016 | Timmer et al. |
| 9,281,541 B2 | 3/2016 | Tokuda et al. |
| 9,281,543 B2 | 3/2016 | Hosoya et al. |
| 9,282,962 B2 | 3/2016 | Schmid et al. |
| 9,284,264 B2 | 3/2016 | Abbott et al. |

(56) References Cited

U.S. PATENT DOCUMENTS

| | | |
|---|---|---|
| 9,284,294 B2 | 3/2016 | Arhancet et al. |
| 9,284,324 B2 | 3/2016 | Nakamura et al. |
| 9,287,560 B2 | 3/2016 | Yu |
| 9,287,573 B2 | 3/2016 | Visco et al. |
| 9,293,236 B2 | 3/2016 | Kawakami et al. |
| 9,293,749 B2 | 3/2016 | Seo et al. |
| 9,293,773 B2 | 3/2016 | Smart et al. |
| 9,293,787 B2 | 3/2016 | Yawata et al. |
| 9,293,790 B2 | 3/2016 | Doe et al. |
| 9,293,796 B2 | 3/2016 | Lanning et al. |
| 9,295,464 B2 | 3/2016 | Shelton, IV et al. |
| 9,301,752 B2 | 4/2016 | Mandakolathur Vasudevan et al. |
| 9,301,753 B2 | 4/2016 | Aldridge et al. |
| 9,301,755 B2 | 4/2016 | Shelton, IV et al. |
| 9,307,965 B2 | 4/2016 | Ming et al. |
| 9,307,989 B2 | 4/2016 | Shelton, IV et al. |
| 9,312,567 B2 | 4/2016 | Otsuki et al. |
| 9,312,572 B2 | 4/2016 | Trimble et al. |
| 9,314,246 B2 | 4/2016 | Shelton, IV et al. |
| 9,314,247 B2 | 4/2016 | Shelton, IV et al. |
| 9,318,776 B2 | 4/2016 | Abe et al. |
| 9,320,518 B2 | 4/2016 | Henderson et al. |
| 9,320,523 B2 | 4/2016 | Shelton, IV et al. |
| 9,324,992 B2 | 4/2016 | Gennett et al. |
| 9,325,004 B2 | 4/2016 | Chang et al. |
| 9,325,037 B2 | 4/2016 | Trimble et al. |
| 9,328,218 B2 | 5/2016 | Schoening et al. |
| 9,331,353 B2 | 5/2016 | Chappey et al. |
| 9,331,360 B2 | 5/2016 | Weiss et al. |
| 9,332,974 B2 | 5/2016 | Henderson et al. |
| 9,332,984 B2 | 5/2016 | Weaner et al. |
| 9,343,741 B2 | 5/2016 | Kitagawa et al. |
| 9,345,477 B2 | 5/2016 | Anim et al. |
| 9,350,017 B2 | 5/2016 | Tikhonov et al. |
| 9,350,044 B2 | 5/2016 | Kuriki et al. |
| 9,350,055 B2 | 5/2016 | Sastry et al. |
| 9,351,730 B2 | 5/2016 | Schmid et al. |
| 9,358,005 B2 | 6/2016 | Shelton, IV et al. |
| 9,358,064 B2 | 6/2016 | Clark, III et al. |
| 9,362,595 B2 | 6/2016 | Abe et al. |
| 9,364,233 B2 | 6/2016 | Alexander, III et al. |
| 9,365,755 B2 | 6/2016 | Yano et al. |
| 9,368,831 B2 | 6/2016 | He et al. |
| 9,384,906 B2 | 7/2016 | Abe et al. |
| 9,386,984 B2 | 7/2016 | Aronhalt et al. |
| 9,386,988 B2 | 7/2016 | Baxter, III et al. |
| 9,391,277 B2 | 7/2016 | Ueno et al. |
| 9,391,346 B2 | 7/2016 | Otsuki et al. |
| 9,406,972 B2 | 8/2016 | Shatunov et al. |
| 9,406,976 B2 | 8/2016 | Jeong et al. |
| 9,410,036 B2 | 8/2016 | Arhancet et al. |
| 9,414,838 B2 | 8/2016 | Shelton, IV et al. |
| 9,419,304 B2 | 8/2016 | Okutani et al. |
| 9,433,419 B2 | 9/2016 | Gonzalez et al. |
| 9,447,068 B2 | 9/2016 | Arhancet et al. |
| 9,450,269 B2 | 9/2016 | Tode et al. |
| 9,461,333 B2 | 10/2016 | Yu et al. |
| 9,472,813 B2 | 10/2016 | Uzun et al. |
| 9,472,828 B2 | 10/2016 | Abe |
| 9,480,476 B2 | 11/2016 | Aldridge et al. |
| 9,484,565 B2 | 11/2016 | Miyazaki et al. |
| 9,484,579 B2 | 11/2016 | Son et al. |
| 9,486,560 B2 | 11/2016 | Buevich et al. |
| 9,499,695 B2 | 11/2016 | Tomita et al. |
| 9,505,879 B2 | 11/2016 | Harumashi et al. |
| 9,509,148 B2 | 11/2016 | Kako et al. |
| 9,510,849 B2 | 12/2016 | Clark, III et al. |
| 9,515,353 B2 | 12/2016 | Tsujikawa et al. |
| 9,517,063 B2 | 12/2016 | Swayze et al. |
| 9,525,157 B2 | 12/2016 | Miyajama et al. |
| 9,545,401 B2 | 1/2017 | Cipolla et al. |
| 9,546,426 B2 | 1/2017 | Logan et al. |
| 9,550,886 B2 | 1/2017 | Chen et al. |
| 9,550,895 B2 | 1/2017 | Schrauwen |
| 9,559,382 B2 | 1/2017 | Yokoyama et al. |
| 9,566,061 B2 | 2/2017 | Aronhalt et al. |
| 9,568,799 B2 | 2/2017 | Lam et al. |
| 9,570,778 B2 | 2/2017 | Yamazaki et al. |
| 9,572,574 B2 | 2/2017 | Shelton, IV et al. |
| 9,572,577 B2 | 2/2017 | Lloyd et al. |
| 9,583,788 B2 | 2/2017 | Abe et al. |
| 9,587,102 B2 | 3/2017 | Eguchi et al. |
| 9,588,358 B2 | 3/2017 | Branda et al. |
| 9,590,270 B2 | 3/2017 | Fujii et al. |
| 9,592,050 B2 | 3/2017 | Schmid et al. |
| 9,592,053 B2 | 3/2017 | Shelton, IV et al. |
| 9,592,054 B2 | 3/2017 | Schmid et al. |
| 9,595,737 B2 | 3/2017 | Shimamoto et al. |
| 9,601,740 B2 | 3/2017 | Lee et al. |
| 9,608,273 B2 | 3/2017 | Matsuo et al. |
| 9,608,287 B2 | 3/2017 | Abe et al. |
| 9,610,560 B2 | 4/2017 | Farha et al. |
| 9,610,597 B1 | 4/2017 | Fraser |
| 9,611,420 B2 | 4/2017 | George et al. |
| 9,614,229 B2 | 4/2017 | Du et al. |
| 9,620,812 B2 | 4/2017 | Kaneko et al. |
| 9,620,816 B2 | 4/2017 | Abe et al. |
| 9,620,818 B2 | 4/2017 | Han et al. |
| 9,627,687 B2 | 4/2017 | Kawasaki et al. |
| 9,629,814 B2 | 4/2017 | Widenhouse et al. |
| 9,640,839 B2 | 5/2017 | Porta Garcia et al. |
| 9,647,255 B2 | 5/2017 | Choi et al. |
| 9,647,294 B2 | 5/2017 | Abe et al. |
| 9,649,503 B2 | 5/2017 | Delp et al. |
| 9,662,508 B2 | 5/2017 | Delp et al. |
| 9,676,987 B2 | 6/2017 | Pober |
| 9,687,237 B2 | 6/2017 | Schmid et al. |
| 9,693,777 B2 | 7/2017 | Schellin et al. |
| 9,698,410 B2 | 7/2017 | Fasching et al. |
| 9,698,447 B2 | 7/2017 | Li |
| 9,698,448 B2 | 7/2017 | Burrell et al. |
| 9,700,317 B2 | 7/2017 | Aronhalt et al. |
| 9,714,340 B2 | 7/2017 | Yamamoto et al. |
| 9,718,999 B2 | 8/2017 | Kouno et al. |
| 9,722,280 B2 | 8/2017 | Chesneau et al. |
| 9,724,098 B2 | 8/2017 | Baxter, III et al. |
| 9,724,896 B2 | 8/2017 | Momoi et al. |
| 9,735,448 B2 | 8/2017 | Ishiji |
| 9,748,608 B2 | 8/2017 | Kawasaki et al. |
| 9,755,204 B2 | 9/2017 | Shimura et al. |
| 9,755,277 B2 | 9/2017 | Taeda et al. |
| 9,757,124 B2 | 9/2017 | Schellin et al. |
| 9,761,876 B2 | 9/2017 | Mori et al. |
| 9,761,903 B2 | 9/2017 | Hellring et al. |
| 9,761,909 B2 | 9/2017 | Chesneau et al. |
| 9,761,910 B2 | 9/2017 | Klaehn et al. |
| 9,774,058 B2 | 9/2017 | Pratt et al. |
| 9,775,608 B2 | 10/2017 | Aronhalt et al. |
| 9,780,365 B2 | 10/2017 | Liu et al. |
| 9,786,954 B2 | 10/2017 | West et al. |
| 9,788,834 B2 | 10/2017 | Schmid et al. |
| 9,789,162 B2 | 10/2017 | Baylink et al. |
| 9,793,577 B2 | 10/2017 | Porta Garcia et al. |
| 9,795,383 B2 | 10/2017 | Aldridge et al. |
| 9,795,384 B2 | 10/2017 | Weaner et al. |
| 9,799,925 B2 | 10/2017 | Hasegawa et al. |
| 9,801,627 B2 | 10/2017 | Harris et al. |
| 9,801,628 B2 | 10/2017 | Harris et al. |
| 9,801,634 B2 | 10/2017 | Shelton, IV et al. |
| 9,801,831 B2 | 10/2017 | Steele et al. |
| 9,803,052 B2 | 10/2017 | Harumashi et al. |
| 9,804,607 B1 | 10/2017 | Coleman |
| 9,806,375 B2 | 10/2017 | Yoshida et al. |
| 9,806,378 B2 | 10/2017 | Taeda et al. |
| 9,808,247 B2 | 11/2017 | Shelton, IV et al. |
| 9,814,900 B2 | 11/2017 | Lundmark et al. |
| 9,819,026 B2 | 11/2017 | Shiozaki et al. |
| 9,821,170 B2 | 11/2017 | Lundmark et al. |
| 9,827,281 B2 | 11/2017 | Naheed |
| 9,827,282 B2 | 11/2017 | Naheed |
| 9,827,322 B2 | 11/2017 | Naheed |
| 9,827,529 B2 | 11/2017 | Rebouillat et al. |
| 9,831,043 B2 | 11/2017 | Roumi et al. |
| 9,833,236 B2 | 12/2017 | Shelton, IV et al. |

(56) References Cited

U.S. PATENT DOCUMENTS

| | | |
|---|---|---|
| 9,833,238 B2 | 12/2017 | Baxter, III et al. |
| 9,833,241 B2 | 12/2017 | Huitema et al. |
| 9,833,242 B2 | 12/2017 | Baxter, III et al. |
| 9,839,420 B2 | 12/2017 | Shelton, IV et al. |
| 9,839,422 B2 | 12/2017 | Schellin et al. |
| 9,839,423 B2 | 12/2017 | Vendely et al. |
| 9,839,873 B2 | 12/2017 | Rebouillat et al. |
| 9,844,369 B2 | 12/2017 | Huitema et al. |
| 9,844,372 B2 | 12/2017 | Shelton, IV et al. |
| 9,844,376 B2 | 12/2017 | Baxter, III et al. |
| 9,848,875 B2 | 12/2017 | Aronhalt et al. |
| 9,848,955 B2 | 12/2017 | Buevich et al. |
| 9,853,326 B2 | 12/2017 | Tokuda et al. |
| 9,861,361 B2 | 1/2018 | Aronhalt et al. |
| 9,865,881 B2 | 1/2018 | Araki et al. |
| 9,876,224 B2 | 1/2018 | Yu |
| 9,876,254 B2 | 1/2018 | Yawata et al. |
| 9,877,721 B2 | 1/2018 | Schellin et al. |
| 9,882,208 B2 | 1/2018 | Ando et al. |
| 9,883,861 B2 | 2/2018 | Shelton, IV et al. |
| 9,884,456 B2 | 2/2018 | Schellin et al. |
| 9,893,326 B2 | 2/2018 | Seino et al. |
| 9,899,672 B2 | 2/2018 | Zhamu et al. |
| 9,905,822 B2 | 2/2018 | Mori et al. |
| 9,905,885 B2 | 2/2018 | Kalinovich et al. |
| 9,910,020 B1 | 3/2018 | Fraser |
| 9,910,301 B2 | 3/2018 | Branda et al. |
| 9,911,984 B2 | 3/2018 | Tamirisa et al. |
| 9,918,716 B2 | 3/2018 | Baxter, III et al. |
| 9,921,421 B2 | 3/2018 | Branda et al. |
| 9,923,201 B2 | 3/2018 | Wang et al. |
| 9,923,237 B2 | 3/2018 | Pratt et al. |
| 9,923,238 B2 | 3/2018 | Sawa et al. |
| 9,923,240 B2 | 3/2018 | Kuwajima et al. |
| 9,924,944 B2 | 3/2018 | Shelton, IV et al. |
| 9,924,947 B2 | 3/2018 | Shelton, IV et al. |
| 9,931,624 B2 | 4/2018 | Yokota et al. |
| 9,934,911 B2 | 4/2018 | Shimamoto et al. |
| 9,947,966 B2 | 4/2018 | Lim et al. |
| 9,960,451 B1 | 5/2018 | Zhamu et al. |
| 9,969,843 B2 | 5/2018 | Harumashi et al. |
| 9,974,538 B2 | 5/2018 | Baxter, III et al. |
| 9,988,482 B2 | 6/2018 | Burckhardt et al. |
| 9,991,503 B2 | 6/2018 | Fukunaga et al. |
| 9,991,622 B2 | 6/2018 | Kono et al. |
| 2001/0004506 A1 | 6/2001 | Gan et al. |
| 2001/0004507 A1 | 6/2001 | Gan et al. |
| 2001/0006749 A1 | 7/2001 | Shackle |
| 2001/0010881 A1 | 8/2001 | Ehrlich |
| 2001/0012590 A1 | 8/2001 | Ehrlich |
| 2001/0018152 A1 | 8/2001 | Kida et al. |
| 2001/0031367 A1 | 10/2001 | Gilbert |
| 2001/0033974 A1 | 10/2001 | Gavelin et al. |
| 2001/0045364 A1 | 11/2001 | Hockaday et al. |
| 2002/0002247 A1 | 1/2002 | Allcock et al. |
| 2002/0014616 A1 | 2/2002 | Allcock et al. |
| 2002/0018926 A1 | 2/2002 | Shiga et al. |
| 2002/0018929 A1 | 2/2002 | Dai et al. |
| 2002/0026021 A1 | 2/2002 | Armand et al. |
| 2002/0028387 A1 | 3/2002 | Gavelin et al. |
| 2002/0031701 A1 | 3/2002 | Kawakami et al. |
| 2002/0034692 A1 | 3/2002 | Appel et al. |
| 2002/0034757 A1 | 3/2002 | Cubicciotti |
| 2002/0039275 A1 | 4/2002 | Takeuchi et al. |
| 2002/0042003 A1 | 4/2002 | Appel et al. |
| 2002/0048706 A1 | 4/2002 | Mayes et al. |
| 2002/0050286 A1 | 5/2002 | Kubota |
| 2002/0054912 A1 | 5/2002 | Kim et al. |
| 2002/0055040 A1 | 5/2002 | Mukherjee et al. |
| 2002/0055047 A1 | 5/2002 | Satoh et al. |
| 2002/0070374 A1 | 6/2002 | Barker et al. |
| 2002/0072806 A1 | 6/2002 | Buskirk et al. |
| 2002/0074972 A1 | 6/2002 | Narang et al. |
| 2002/0076611 A1 | 6/2002 | Palazzo et al. |
| 2002/0085968 A1 | 7/2002 | Smalley et al. |
| 2002/0086206 A1 | 7/2002 | Fauteux et al. |
| 2002/0090331 A1 | 7/2002 | Smalley et al. |
| 2002/0090547 A1 | 7/2002 | Schmidt et al. |
| 2002/0094311 A1 | 7/2002 | Smalley et al. |
| 2002/0098135 A1 | 7/2002 | Smalley et al. |
| 2002/0100725 A1 | 8/2002 | Lee et al. |
| 2002/0102196 A1 | 8/2002 | Smalley et al. |
| 2002/0110739 A1 | 8/2002 | McEwen et al. |
| 2002/0114996 A1 | 8/2002 | Schmidt et al. |
| 2002/0122950 A1 | 9/2002 | Ehrlich et al. |
| 2002/0122979 A1 | 9/2002 | Schmidt et al. |
| 2002/0122980 A1 | 9/2002 | Fleischer et al. |
| 2002/0127162 A1 | 9/2002 | Smalley et al. |
| 2002/0127169 A1 | 9/2002 | Smalley et al. |
| 2002/0127454 A1 | 9/2002 | Narang et al. |
| 2002/0127474 A1 | 9/2002 | Fleischer et al. |
| 2002/0128364 A1 | 9/2002 | Michot et al. |
| 2002/0136681 A1 | 9/2002 | Smalley et al. |
| 2002/0136683 A1 | 9/2002 | Smalley et al. |
| 2002/0150524 A1 | 10/2002 | Smalley et al. |
| 2002/0155353 A1 | 10/2002 | Bronstert et al. |
| 2002/0159943 A1 | 10/2002 | Smalley et al. |
| 2002/0159995 A1 | 10/2002 | Brady et al. |
| 2002/0160253 A1 | 10/2002 | Vaidyanathan |
| 2002/0160257 A1 | 10/2002 | Lee et al. |
| 2002/0160258 A1 | 10/2002 | Lee et al. |
| 2002/0160270 A1 | 10/2002 | Bronstert et al. |
| 2002/0160271 A1 | 10/2002 | Frech et al. |
| 2002/0182488 A1 | 12/2002 | Cho et al. |
| 2002/0185627 A1 | 12/2002 | Chen-Yang et al. |
| 2002/0193533 A1 | 12/2002 | Kamo et al. |
| 2002/0193540 A1 | 12/2002 | Armand et al. |
| 2002/0197249 A1 | 12/2002 | Brady et al. |
| 2002/0197250 A1 | 12/2002 | Brady et al. |
| 2002/0197251 A1 | 12/2002 | Brady et al. |
| 2002/0197252 A1 | 12/2002 | Brady et al. |
| 2002/0197456 A1 | 12/2002 | Pope |
| 2002/0197522 A1 | 12/2002 | Lawrence et al. |
| 2002/0197531 A1 | 12/2002 | Inoue et al. |
| 2002/0198487 A1 | 12/2002 | Brady et al. |
| 2003/0003358 A1 | 1/2003 | Mandal et al. |
| 2003/0003360 A1 | 1/2003 | Gorkovenko et al. |
| 2003/0003369 A1 | 1/2003 | Dai |
| 2003/0013007 A1 | 1/2003 | Kaun |
| 2003/0014859 A1 | 1/2003 | Kejha et al. |
| 2003/0021917 A1 | 1/2003 | Hotaka et al. |
| 2003/0023304 A1 | 1/2003 | Carter et al. |
| 2003/0026063 A1 | 2/2003 | Munshi |
| 2003/0027170 A1 | 2/2003 | Vogels et al. |
| 2003/0031933 A1 | 2/2003 | Shembel et al. |
| 2003/0036620 A1 | 2/2003 | Kawanabe et al. |
| 2003/0038024 A1 | 2/2003 | Yagi et al. |
| 2003/0059683 A1 | 3/2003 | Blau et al. |
| 2003/0059794 A1 | 3/2003 | Vogels et al. |
| 2003/0068555 A1 | 4/2003 | Naruoka |
| 2003/0082446 A1 | 5/2003 | Chiang et al. |
| 2003/0082458 A1 | 5/2003 | Oyama |
| 2003/0091904 A1 | 5/2003 | Munshi |
| 2003/0094599 A1 | 5/2003 | Le et al. |
| 2003/0099884 A1 | 5/2003 | Chiang et al. |
| 2003/0100822 A1 | 5/2003 | Lew et al. |
| 2003/0108801 A1 | 6/2003 | Otsuki et al. |
| 2003/0113635 A1 | 6/2003 | Gan et al. |
| 2003/0114606 A1 | 6/2003 | Taniguchi et al. |
| 2003/0125437 A1 | 7/2003 | Michot et al. |
| 2003/0129500 A1 | 7/2003 | Gan et al. |
| 2003/0134968 A1 | 7/2003 | Kang et al. |
| 2003/0143461 A1 | 7/2003 | Poehler et al. |
| 2003/0148191 A1 | 8/2003 | Mori |
| 2003/0166167 A1 | 9/2003 | van Es et al. |
| 2003/0166812 A1 | 9/2003 | Taniguchi et al. |
| 2003/0170548 A1 | 9/2003 | Otsuki et al. |
| 2003/0170633 A1 | 9/2003 | Vogels et al. |
| 2003/0175597 A1 | 9/2003 | Otsuki et al. |
| 2003/0175598 A1 | 9/2003 | Otsuki et al. |
| 2003/0180625 A1 | 9/2003 | Oh et al. |
| 2003/0186110 A1 | 10/2003 | Sloop |
| 2003/0190531 A1 | 10/2003 | Otsuki et al. |
| 2003/0198868 A1 | 10/2003 | Takeuchi et al. |

(56) References Cited

U.S. PATENT DOCUMENTS

| | | |
|---|---|---|
| 2003/0207178 A1 | 11/2003 | Hu et al. |
| 2003/0211389 A1 | 11/2003 | Schlaikjer |
| 2004/0009404 A1 | 1/2004 | Harrup et al. |
| 2004/0013927 A1 | 1/2004 | Lawrence et al. |
| 2004/0016455 A1 | 1/2004 | Oogami |
| 2004/0022939 A1 | 2/2004 | Kim et al. |
| 2004/0023092 A1 | 2/2004 | Armand et al. |
| 2004/0028585 A1 | 2/2004 | Cardarelli et al. |
| 2004/0036444 A1 | 2/2004 | Oogami |
| 2004/0038122 A1 | 2/2004 | Hisamitsu et al. |
| 2004/0038124 A1 | 2/2004 | Hisamitsu et al. |
| 2004/0038127 A1 | 2/2004 | Schlaikjer |
| 2004/0039134 A1 | 2/2004 | Murakami et al. |
| 2004/0050414 A1 | 3/2004 | Oogami |
| 2004/0053138 A1 | 3/2004 | Otterstedt et al. |
| 2004/0072683 A1 | 4/2004 | Kodas et al. |
| 2004/0075802 A1 | 4/2004 | Kitamura et al. |
| 2004/0084080 A1 | 5/2004 | Sager et al. |
| 2004/0085710 A1 | 5/2004 | Takeuchi et al. |
| 2004/0091772 A1* | 5/2004 | Ravdel ............... H01M 10/0525 429/188 |
| 2004/0091774 A1 | 5/2004 | Narang et al. |
| 2004/0126305 A1 | 7/2004 | Chen et al. |
| 2004/0126658 A1 | 7/2004 | Otsuki et al. |
| 2004/0126659 A1 | 7/2004 | Graetz et al. |
| 2004/0139587 A1 | 7/2004 | Sato et al. |
| 2004/0142246 A1 | 7/2004 | Han et al. |
| 2004/0146769 A1 | 7/2004 | Birschbach |
| 2004/0146778 A1 | 7/2004 | Lee et al. |
| 2004/0146786 A1 | 7/2004 | Sato et al. |
| 2004/0151985 A1 | 8/2004 | Munshi |
| 2004/0157122 A1 | 8/2004 | Naoi et al. |
| 2004/0158091 A1 | 8/2004 | Ignatyev et al. |
| 2004/0170901 A1 | 9/2004 | Blau et al. |
| 2004/0175622 A9 | 9/2004 | Hu et al. |
| 2004/0189762 A1 | 9/2004 | Chen et al. |
| 2004/0189763 A1 | 9/2004 | Zheng et al. |
| 2004/0191617 A1 | 9/2004 | Visco et al. |
| 2004/0191635 A1 | 9/2004 | Otsuki et al. |
| 2004/0192853 A1 | 9/2004 | Otsuki et al. |
| 2004/0198885 A1 | 10/2004 | Okamoto et al. |
| 2004/0201878 A1 | 10/2004 | Agrawal et al. |
| 2004/0204672 A1 | 10/2004 | Palasis et al. |
| 2004/0209124 A1 | 10/2004 | Schmidt et al. |
| 2004/0214090 A1 | 10/2004 | West et al. |
| 2004/0218347 A1 | 11/2004 | Schwake |
| 2004/0220348 A1 | 11/2004 | Michot et al. |
| 2004/0225153 A1 | 11/2004 | Allcock et al. |
| 2004/0229127 A1 | 11/2004 | Wensley et al. |
| 2004/0234859 A1 | 11/2004 | Lee et al. |
| 2004/0248014 A1 | 12/2004 | West et al. |
| 2004/0253228 A1 | 12/2004 | Srivastava |
| 2004/0253520 A1 | 12/2004 | Wensley et al. |
| 2004/0258705 A1 | 12/2004 | Zabrecky et al. |
| 2004/0266732 A1 | 12/2004 | Galvez et al. |
| 2005/0008938 A1 | 1/2005 | Cho et al. |
| 2005/0042503 A1 | 2/2005 | Kim et al. |
| 2005/0042515 A1 | 2/2005 | Hwang et al. |
| 2005/0061742 A1 | 3/2005 | Brady et al. |
| 2005/0079420 A1 | 4/2005 | Cho et al. |
| 2005/0085655 A1 | 4/2005 | Schmidt et al. |
| 2005/0089890 A1 | 4/2005 | Cubicciotti |
| 2005/0095197 A1 | 5/2005 | Tuszynski et al. |
| 2005/0095504 A1 | 5/2005 | Kim et al. |
| 2005/0095506 A1 | 5/2005 | Klaassen |
| 2005/0101957 A1 | 5/2005 | Buskirk et al. |
| 2005/0106458 A1 | 5/2005 | Eguchi et al. |
| 2005/0106460 A1 | 5/2005 | Otsuki et al. |
| 2005/0106470 A1 | 5/2005 | Yoon et al. |
| 2005/0118503 A1 | 6/2005 | Honda et al. |
| 2005/0119744 A1 | 6/2005 | Buskirk et al. |
| 2005/0123836 A1 | 6/2005 | Otsuki et al. |
| 2005/0136329 A1 | 6/2005 | Howard, Jr. et al. |
| 2005/0153207 A1 | 7/2005 | Otsuki et al. |
| 2005/0158626 A1 | 7/2005 | Wagner et al. |
| 2005/0164093 A1 | 7/2005 | Otsuki et al. |
| 2005/0170253 A1 | 8/2005 | Yoon et al. |
| 2005/0170254 A1 | 8/2005 | West et al. |
| 2005/0174092 A1 | 8/2005 | Dougherty et al. |
| 2005/0175529 A1 | 8/2005 | Ceder et al. |
| 2005/0175894 A1 | 8/2005 | Visco et al. |
| 2005/0175895 A1 | 8/2005 | Gorkovenko et al. |
| 2005/0175904 A1 | 8/2005 | Gorkovenko |
| 2005/0181280 A1 | 8/2005 | Ceder et al. |
| 2005/0186481 A1 | 8/2005 | Ogawa et al. |
| 2005/0191439 A1 | 9/2005 | Hirose et al. |
| 2005/0196672 A1 | 9/2005 | Mukherjee et al. |
| 2005/0214700 A1 | 9/2005 | Yamamoto et al. |
| 2005/0215764 A1 | 9/2005 | Tuszynski et al. |
| 2005/0221168 A1 | 10/2005 | Dahn et al. |
| 2005/0221192 A1 | 10/2005 | Hennige et al. |
| 2005/0221193 A1 | 10/2005 | Kinouchi et al. |
| 2005/0221395 A1 | 10/2005 | Zabrecky et al. |
| 2005/0228087 A1 | 10/2005 | Murakami et al. |
| 2005/0233207 A1 | 10/2005 | Kim |
| 2005/0233212 A1 | 10/2005 | Kaun |
| 2005/0233214 A1 | 10/2005 | Marple et al. |
| 2005/0239041 A1 | 10/2005 | Brady et al. |
| 2005/0244704 A1 | 11/2005 | Sloop et al. |
| 2005/0249656 A1 | 11/2005 | Smalley et al. |
| 2005/0249667 A1 | 11/2005 | Tuszynski et al. |
| 2005/0250011 A1 | 11/2005 | Mitchell et al. |
| 2005/0250015 A1 | 11/2005 | Wensley et al. |
| 2005/0255385 A1 | 11/2005 | Harrup et al. |
| 2005/0256450 A1 | 11/2005 | Palasis et al. |
| 2005/0260120 A1 | 11/2005 | Smalley et al. |
| 2005/0266289 A1 | 12/2005 | Armand et al. |
| 2005/0266292 A1 | 12/2005 | Kim et al. |
| 2005/0272214 A1 | 12/2005 | Chiang et al. |
| 2005/0275828 A1 | 12/2005 | Behravesh et al. |
| 2005/0277023 A1 | 12/2005 | Marple et al. |
| 2005/0277026 A1 | 12/2005 | Nishikawa et al. |
| 2005/0281999 A1 | 12/2005 | Hofmann et al. |
| 2005/0287439 A1 | 12/2005 | Shimamura et al. |
| 2006/0014770 A1 | 1/2006 | Llompart et al. |
| 2006/0019131 A1 | 1/2006 | Akiyama et al. |
| 2006/0019167 A1 | 1/2006 | Li |
| 2006/0032046 A1 | 2/2006 | Nathan et al. |
| 2006/0034943 A1 | 2/2006 | Tuszynski |
| 2006/0035137 A1 | 2/2006 | Maruo et al. |
| 2006/0035154 A1 | 2/2006 | West et al. |
| 2006/0046151 A1 | 3/2006 | Otsuki et al. |
| 2006/0057142 A1 | 3/2006 | Brady et al. |
| 2006/0073381 A1 | 4/2006 | Kanno et al. |
| 2006/0078790 A1 | 4/2006 | Nimon et al. |
| 2006/0081840 A1 | 4/2006 | Mori et al. |
| 2006/0088763 A1 | 4/2006 | Li et al. |
| 2006/0092596 A1 | 5/2006 | Otsuki et al. |
| 2006/0100679 A1 | 5/2006 | DiMauro et al. |
| 2006/0105244 A1 | 5/2006 | Kejha et al. |
| 2006/0109608 A1 | 5/2006 | Zhong et al. |
| 2006/0112539 A1 | 6/2006 | Kejha et al. |
| 2006/0115579 A1 | 6/2006 | Mukherjee et al. |
| 2006/0121346 A1 | 6/2006 | Nam et al. |
| 2006/0121355 A1 | 6/2006 | Kolosnitsyn et al. |
| 2006/0124973 A1 | 6/2006 | Arai et al. |
| 2006/0137158 A1 | 6/2006 | Zou et al. |
| 2006/0147371 A1 | 7/2006 | Tuszynski et al. |
| 2006/0147795 A1 | 7/2006 | Li et al. |
| 2006/0147807 A1 | 7/2006 | Kim et al. |
| 2006/0154144 A1 | 7/2006 | Gorkovenko et al. |
| 2006/0154147 A1 | 7/2006 | Kurihara et al. |
| 2006/0159999 A1 | 7/2006 | Kejha et al. |
| 2006/0166098 A1 | 7/2006 | Tabuchi et al. |
| 2006/0172200 A1 | 8/2006 | Yoon et al. |
| 2006/0172201 A1 | 8/2006 | Yasukawa et al. |
| 2006/0174934 A1 | 8/2006 | Sager et al. |
| 2006/0177740 A1 | 8/2006 | Wensley et al. |
| 2006/0180796 A1 | 8/2006 | Adachi et al. |
| 2006/0194119 A1 | 8/2006 | Son et al. |
| 2006/0204834 A1 | 9/2006 | Kim et al. |
| 2006/0204856 A1 | 9/2006 | Ryu et al. |
| 2006/0204857 A1 | 9/2006 | Kejha et al. |
| 2006/0210867 A1 | 9/2006 | Kenis et al. |

(56) References Cited

U.S. PATENT DOCUMENTS

| | | |
|---|---|---|
| 2006/0210873 A1 | 9/2006 | Hollenkamp et al. |
| 2006/0210883 A1 | 9/2006 | Chen et al. |
| 2006/0216612 A1 | 9/2006 | Jambunathan et al. |
| 2006/0217568 A1 | 9/2006 | Ignatyev et al. |
| 2006/0223182 A1 | 10/2006 | DiMauro et al. |
| 2006/0228468 A1 | 10/2006 | Lain et al. |
| 2006/0240327 A1 | 10/2006 | Xu et al. |
| 2006/0246343 A1 | 11/2006 | Mitchell et al. |
| 2006/0257852 A1 | 11/2006 | Rappuoli et al. |
| 2006/0269834 A1 | 11/2006 | West et al. |
| 2006/0281010 A1 | 12/2006 | Lee et al. |
| 2006/0281011 A1 | 12/2006 | Lee et al. |
| 2006/0292451 A1 | 12/2006 | Lee et al. |
| 2007/0003694 A1 | 1/2007 | Chiruvolu et al. |
| 2007/0012244 A1 | 1/2007 | Klaassen |
| 2007/0015053 A1 | 1/2007 | Morris |
| 2007/0015060 A1 | 1/2007 | Klaassen |
| 2007/0015061 A1 | 1/2007 | Klaassen |
| 2007/0016068 A1 | 1/2007 | Grunwald et al. |
| 2007/0016069 A1 | 1/2007 | Grunwald et al. |
| 2007/0016070 A1 | 1/2007 | Grunwald et al. |
| 2007/0016072 A1 | 1/2007 | Grunwald et al. |
| 2007/0020529 A1 | 1/2007 | Ryu et al. |
| 2007/0026315 A1 | 2/2007 | Lampe-Onnerud et al. |
| 2007/0027129 A1 | 2/2007 | Tuszynski et al. |
| 2007/0029972 A1 | 2/2007 | Lampe-Onnerud et al. |
| 2007/0037046 A1 | 2/2007 | Takahashi et al. |
| 2007/0037063 A1 | 2/2007 | Choi et al. |
| 2007/0040154 A1 | 2/2007 | Murakami |
| 2007/0042266 A1 | 2/2007 | Oh et al. |
| 2007/0042667 A1 | 2/2007 | Sung |
| 2007/0043158 A1 | 2/2007 | Smalley et al. |
| 2007/0048209 A1 | 3/2007 | Smalley et al. |
| 2007/0048596 A1 | 3/2007 | Hasegawa et al. |
| 2007/0048622 A1 | 3/2007 | Yoon et al. |
| 2007/0048623 A1 | 3/2007 | Park et al. |
| 2007/0051620 A1 | 3/2007 | Visco et al. |
| 2007/0054180 A1 | 3/2007 | Miyajima et al. |
| 2007/0054186 A1 | 3/2007 | Costello et al. |
| 2007/0065727 A1 | 3/2007 | Koike et al. |
| 2007/0072084 A1 | 3/2007 | Nishie |
| 2007/0077496 A1 | 4/2007 | Scott et al. |
| 2007/0085059 A1 | 4/2007 | Mora-Gutierrez et al. |
| 2007/0092549 A1 | 4/2007 | Tuszynski et al. |
| 2007/0092798 A1 | 4/2007 | Spitler |
| 2007/0093739 A1 | 4/2007 | Brady et al. |
| 2007/0098645 A1 | 5/2007 | Agbodoe |
| 2007/0099072 A1 | 5/2007 | Hennige et al. |
| 2007/0099084 A1 | 5/2007 | Huang et al. |
| 2007/0099090 A1 | 5/2007 | Oh et al. |
| 2007/0100012 A1 | 5/2007 | Beard |
| 2007/0117007 A1 | 5/2007 | Visco et al. |
| 2007/0117026 A1 | 5/2007 | Kumar et al. |
| 2007/0122698 A1 | 5/2007 | Mitchell et al. |
| 2007/0141470 A1 | 6/2007 | Nakura |
| 2007/0146965 A1 | 6/2007 | Mitchell et al. |
| 2007/0149496 A1 | 6/2007 | Tuszynski et al. |
| 2007/0149916 A1 | 6/2007 | Subramony et al. |
| 2007/0160901 A1 | 7/2007 | Kaun |
| 2007/0166617 A1 | 7/2007 | Gozdz et al. |
| 2007/0172739 A1 | 7/2007 | Visco et al. |
| 2007/0172740 A1 | 7/2007 | Otsuki et al. |
| 2007/0180688 A1 | 8/2007 | Kawakami et al. |
| 2007/0181177 A9 | 8/2007 | Sager et al. |
| 2007/0182418 A1 | 8/2007 | Reynier et al. |
| 2007/0183954 A1 | 8/2007 | Ohtsuki et al. |
| 2007/0190424 A1 | 8/2007 | Mitchell et al. |
| 2007/0202413 A1 | 8/2007 | Wudl et al. |
| 2007/0206342 A1 | 9/2007 | Tipton et al. |
| 2007/0207384 A1 | 9/2007 | Nakura |
| 2007/0212583 A1 | 9/2007 | Johnson |
| 2007/0212615 A1 | 9/2007 | Jost et al. |
| 2007/0216469 A1 | 9/2007 | Sakamoto |
| 2007/0218371 A1 | 9/2007 | Elliott et al. |
| 2007/0225799 A1 | 9/2007 | Doty |
| 2007/0235893 A1 | 10/2007 | Miyoshi |
| 2007/0243454 A1 | 10/2007 | Klaassen |
| 2007/0243470 A1 | 10/2007 | Yamamoto et al. |
| 2007/0254213 A1 | 11/2007 | Best et al. |
| 2007/0258983 A1 | 11/2007 | Brady et al. |
| 2007/0265426 A1 | 11/2007 | Allcock et al. |
| 2007/0269411 A1 | 11/2007 | Sun et al. |
| 2007/0269659 A1 | 11/2007 | Gilbert |
| 2007/0292429 A1 | 12/2007 | Brady et al. |
| 2007/0292746 A1 | 12/2007 | Sloop |
| 2007/0292750 A1 | 12/2007 | Beard |
| 2007/0298314 A1 | 12/2007 | Partin et al. |
| 2008/0008928 A1 | 1/2008 | Partin et al. |
| 2008/0008933 A1 | 1/2008 | Lampe-Onnerud |
| 2008/0012430 A1 | 1/2008 | Peters et al. |
| 2008/0012707 A1 | 1/2008 | Peters et al. |
| 2008/0019258 A1 | 1/2008 | Peters et al. |
| 2008/0020276 A1 | 1/2008 | Horikawa |
| 2008/0020284 A1 | 1/2008 | Michot et al. |
| 2008/0020285 A1 | 1/2008 | Horikawa |
| 2008/0026297 A1 | 1/2008 | Chen et al. |
| 2008/0029145 A1 | 2/2008 | Sung |
| 2008/0032197 A1 | 2/2008 | Horpel et al. |
| 2008/0038641 A1 | 2/2008 | Visco et al. |
| 2008/0044729 A1 | 2/2008 | Gilmour |
| 2008/0044736 A1 | 2/2008 | Nakura |
| 2008/0051495 A1 | 2/2008 | Murakami et al. |
| 2008/0057386 A1 | 3/2008 | Visco et al. |
| 2008/0063585 A1 | 3/2008 | Smalley et al. |
| 2008/0063588 A1 | 3/2008 | Smalley et al. |
| 2008/0066297 A1 | 3/2008 | Lin et al. |
| 2008/0070076 A1 | 3/2008 | Makita et al. |
| 2008/0075999 A1 | 3/2008 | Izuhara et al. |
| 2008/0076023 A1 | 3/2008 | Yumoto |
| 2008/0089830 A1 | 4/2008 | Smalley et al. |
| 2008/0096056 A1 | 4/2008 | Harrup et al. |
| 2008/0099734 A1 | 5/2008 | Chiang et al. |
| 2008/0107586 A1 | 5/2008 | Smalley et al. |
| 2008/0113266 A1 | 5/2008 | Park et al. |
| 2008/0118428 A1 | 5/2008 | Awano et al. |
| 2008/0118843 A1 | 5/2008 | Tarnopolsky |
| 2008/0119421 A1 | 5/2008 | Tuszynski et al. |
| 2008/0128315 A1 | 6/2008 | Buevich et al. |
| 2008/0131772 A1 | 6/2008 | Jambunathan et al. |
| 2008/0132922 A1 | 6/2008 | Buevich et al. |
| 2008/0138434 A1 | 6/2008 | Brady et al. |
| 2008/0138700 A1 | 6/2008 | Horpel et al. |
| 2008/0152996 A1 | 6/2008 | Thackeray et al. |
| 2008/0153005 A1 | 6/2008 | Horikawa et al. |
| 2008/0160417 A1 | 7/2008 | Yoshimura |
| 2008/0161454 A1 | 7/2008 | Mader |
| 2008/0164444 A1 | 7/2008 | Otsuki et al. |
| 2008/0171263 A1 | 7/2008 | Ugaji et al. |
| 2008/0171268 A1 | 7/2008 | Yazami |
| 2008/0175915 A1 | 7/2008 | Kim et al. |
| 2008/0176141 A1 | 7/2008 | Pan et al. |
| 2008/0193840 A1 | 8/2008 | Shirane et al. |
| 2008/0193848 A1 | 8/2008 | Fujikawa et al. |
| 2008/0193855 A1 | 8/2008 | McDonald |
| 2008/0199687 A1 | 8/2008 | Chiruvolu et al. |
| 2008/0209876 A1 | 9/2008 | Miller |
| 2008/0213588 A1 | 9/2008 | Chen et al. |
| 2008/0213661 A1 | 9/2008 | Michot et al. |
| 2008/0213662 A1 | 9/2008 | Chiang et al. |
| 2008/0224100 A1 | 9/2008 | Smalley et al. |
| 2008/0231237 A1 | 9/2008 | Kishi et al. |
| 2008/0233477 A1 | 9/2008 | Takahashi et al. |
| 2008/0241693 A1 | 10/2008 | Fukuchi et al. |
| 2008/0241699 A1 | 10/2008 | Halalay |
| 2008/0254361 A1 | 10/2008 | Horikawa |
| 2008/0261116 A1 | 10/2008 | Burton et al. |
| 2008/0269492 A1 | 10/2008 | Otsuki et al. |
| 2008/0283415 A1 | 11/2008 | Gilbert |
| 2008/0286649 A1 | 11/2008 | Li et al. |
| 2008/0305401 A1 | 12/2008 | Smart et al. |
| 2008/0311025 A1 | 12/2008 | Smalley et al. |
| 2008/0318135 A1 | 12/2008 | Sung et al. |
| 2008/0319131 A1 | 12/2008 | McCullough et al. |
| 2009/0004094 A1 | 1/2009 | Smalley et al. |

(56) References Cited

U.S. PATENT DOCUMENTS

| | | |
|---|---|---|
| 2009/0005824 A1 | 1/2009 | Visco et al. |
| 2009/0011340 A1 | 1/2009 | Lee et al. |
| 2009/0017364 A1 | 1/2009 | Manev |
| 2009/0017386 A1 | 1/2009 | Xu et al. |
| 2009/0023070 A1 | 1/2009 | Tokita et al. |
| 2009/0023071 A1 | 1/2009 | Ohishi |
| 2009/0027827 A1 | 1/2009 | Siggel et al. |
| 2009/0029138 A1 | 1/2009 | Miyoshi et al. |
| 2009/0029193 A1 | 1/2009 | Onnerud et al. |
| 2009/0029237 A1 | 1/2009 | Yazami |
| 2009/0035656 A1 | 2/2009 | Lee et al. |
| 2009/0036304 A1 | 2/2009 | Misner et al. |
| 2009/0047579 A1 | 2/2009 | Jang et al. |
| 2009/0075176 A1 | 3/2009 | Singh et al. |
| 2009/0081547 A1 | 3/2009 | Nakura |
| 2009/0081548 A1 | 3/2009 | Nakura |
| 2009/0090640 A1 | 4/2009 | Jang et al. |
| 2009/0104523 A1 | 4/2009 | Mullin et al. |
| 2009/0114344 A1 | 5/2009 | Barinov et al. |
| 2009/0117466 A1 | 5/2009 | Zhamu et al. |
| 2009/0117467 A1 | 5/2009 | Zhamu et al. |
| 2009/0123813 A1 | 5/2009 | Chiang et al. |
| 2009/0130567 A1 | 5/2009 | Segawa |
| 2009/0136830 A1 | 5/2009 | Gordon |
| 2009/0136834 A1 | 5/2009 | Coowar et al. |
| 2009/0136854 A1 | 5/2009 | Nakura |
| 2009/0137699 A1 | 5/2009 | Mader |
| 2009/0148771 A1 | 6/2009 | Ishii et al. |
| 2009/0148777 A1 | 6/2009 | Song et al. |
| 2009/0155696 A1 | 6/2009 | Lee et al. |
| 2009/0155697 A1 | 6/2009 | Park et al. |
| 2009/0169463 A1 | 7/2009 | Smalley et al. |
| 2009/0169725 A1 | 7/2009 | Zhamu et al. |
| 2009/0169996 A1 | 7/2009 | Zhamu et al. |
| 2009/0173734 A1 | 7/2009 | Yoshihiro et al. |
| 2009/0178969 A1 | 7/2009 | Hanakawa et al. |
| 2009/0181296 A1 | 7/2009 | Lampe-Onnerud et al. |
| 2009/0186258 A1 | 7/2009 | Makita et al. |
| 2009/0186267 A1 | 7/2009 | Tiegs |
| 2009/0186276 A1 | 7/2009 | Zhamu et al. |
| 2009/0186277 A1 | 7/2009 | Beck et al. |
| 2009/0191464 A1 | 7/2009 | Ryu et al. |
| 2009/0208832 A1 | 8/2009 | Beard |
| 2009/0208835 A1 | 8/2009 | Horiuchi et al. |
| 2009/0220566 A1 | 9/2009 | Barralet et al. |
| 2009/0226811 A1 | 9/2009 | Nakaoka |
| 2009/0236973 A1 | 9/2009 | Yabe et al. |
| 2009/0242830 A1 | 10/2009 | Mao et al. |
| 2009/0246625 A1 | 10/2009 | Lu |
| 2009/0246628 A1 | 10/2009 | Adachi et al. |
| 2009/0253035 A1 | 10/2009 | Otsuki et al. |
| 2009/0253046 A1 | 10/2009 | Smart et al. |
| 2009/0256528 A1 | 10/2009 | Greening et al. |
| 2009/0259420 A1 | 10/2009 | Greening et al. |
| 2009/0263725 A1 | 10/2009 | Balsara et al. |
| 2009/0269396 A1 | 10/2009 | Cipolla et al. |
| 2009/0269511 A1 | 10/2009 | Zhamu et al. |
| 2009/0269654 A1 | 10/2009 | Kairawicz et al. |
| 2009/0269673 A1 | 10/2009 | Ignatyev et al. |
| 2009/0274754 A1 | 11/2009 | Cipolla et al. |
| 2009/0280400 A1 | 11/2009 | Tsukamoto |
| 2009/0280414 A1 | 11/2009 | Koh et al. |
| 2009/0286163 A1 | 11/2009 | Shin et al. |
| 2009/0291330 A1 | 11/2009 | Onnerud et al. |
| 2009/0292105 A1 | 11/2009 | Michot |
| 2009/0297935 A1 | 12/2009 | Visco et al. |
| 2009/0297937 A1 | 12/2009 | Lampe-Onnerud et al. |
| 2009/0305016 A1 | 12/2009 | Miyoshi et al. |
| 2009/0311587 A1 | 12/2009 | Best et al. |
| 2009/0325017 A9 | 12/2009 | Johnson |
| 2009/0325963 A1 | 12/2009 | Lilienfeld et al. |
| 2009/0326275 A1 | 12/2009 | DiMauro |
| 2010/0000079 A1 | 1/2010 | Horpel et al. |
| 2010/0003401 A1 | 1/2010 | Horpel et al. |
| 2010/0003603 A1 | 1/2010 | Chiang et al. |
| 2010/0009260 A1 | 1/2010 | Tanaka et al. |
| 2010/0014215 A1 | 1/2010 | Zhong et al. |
| 2010/0015514 A1 | 1/2010 | Miyagi et al. |
| 2010/0015521 A1 | 1/2010 | Kim |
| 2010/0018034 A1 | 1/2010 | Miyasaka et al. |
| 2010/0021800 A1 | 1/2010 | Yazami et al. |
| 2010/0021815 A1 | 1/2010 | Oh et al. |
| 2010/0021819 A1 | 1/2010 | Zhamu et al. |
| 2010/0028784 A1 | 2/2010 | Pham et al. |
| 2010/0047695 A1 | 2/2010 | Smart et al. |
| 2010/0062345 A1 | 3/2010 | Horikawa |
| 2010/0068461 A1 | 3/2010 | Wallace et al. |
| 2010/0068605 A1 | 3/2010 | Harris et al. |
| 2010/0068628 A1 | 3/2010 | Ueda |
| 2010/0069816 A1 | 3/2010 | Brady et al. |
| 2010/0075195 A1 | 3/2010 | Elliott et al. |
| 2010/0075222 A1 | 3/2010 | Watanabe |
| 2010/0075225 A1 | 3/2010 | Wilkins et al. |
| 2010/0078599 A1 | 4/2010 | Kumta et al. |
| 2010/0082104 A1 | 4/2010 | Carter et al. |
| 2010/0086823 A1 | 4/2010 | Koshino et al. |
| 2010/0090650 A1 | 4/2010 | Yazami et al. |
| 2010/0092869 A1 | 4/2010 | Kaneko et al. |
| 2010/0094042 A1 | 4/2010 | Klaehn et al. |
| 2010/0104918 A1 | 4/2010 | Nowak et al. |
| 2010/0104950 A1 | 4/2010 | Lamanna et al. |
| 2010/0112443 A1 | 5/2010 | Blomgren et al. |
| 2010/0114292 A1 | 5/2010 | Heaton et al. |
| 2010/0114293 A1 | 5/2010 | Heaton et al. |
| 2010/0114301 A1 | 5/2010 | Heaton et al. |
| 2010/0119881 A1 | 5/2010 | Patel et al. |
| 2010/0119883 A1 | 5/2010 | Friesen et al. |
| 2010/0119956 A1 | 5/2010 | Tokuda et al. |
| 2010/0120179 A1 | 5/2010 | Zhamu et al. |
| 2010/0124691 A1 | 5/2010 | Harris |
| 2010/0125082 A1 | 5/2010 | Holenz et al. |
| 2010/0125087 A1 | 5/2010 | Holenz et al. |
| 2010/0136410 A1 | 6/2010 | Kawasoe et al. |
| 2010/0137253 A1 | 6/2010 | Llompart et al. |
| 2010/0143770 A1 | 6/2010 | Onnerud et al. |
| 2010/0143798 A1 | 6/2010 | Zhamu et al. |
| 2010/0151303 A1 | 6/2010 | Marple et al. |
| 2010/0159346 A1 | 6/2010 | Hinago et al. |
| 2010/0164436 A1 | 7/2010 | Lampe-Onnerud et al. |
| 2010/0166862 A1 | 7/2010 | Francois et al. |
| 2010/0166961 A1 | 7/2010 | Beard |
| 2010/0167121 A1 | 7/2010 | Arai et al. |
| 2010/0167129 A1 | 7/2010 | Wu et al. |
| 2010/0168808 A1 | 7/2010 | Citron |
| 2010/0173139 A1 | 7/2010 | Miyoshi et al. |
| 2010/0173198 A1 | 7/2010 | Zhamu et al. |
| 2010/0176337 A1 | 7/2010 | Zhamu et al. |
| 2010/0178531 A1 | 7/2010 | Amaratunga et al. |
| 2010/0178555 A1 | 7/2010 | Best |
| 2010/0178562 A1 | 7/2010 | Exnar et al. |
| 2010/0178567 A1 | 7/2010 | Hauser et al. |
| 2010/0178568 A1 | 7/2010 | Unalan et al. |
| 2010/0180889 A1 | 7/2010 | Monzyk et al. |
| 2010/0183907 A1 | 7/2010 | Hauser et al. |
| 2010/0183917 A1 | 7/2010 | Holzapfel et al. |
| 2010/0190059 A1 | 7/2010 | Graetz et al. |
| 2010/0190978 A1 | 7/2010 | DiMauro |
| 2010/0193370 A1 | 8/2010 | Olah et al. |
| 2010/0196766 A1 | 8/2010 | Park et al. |
| 2010/0200403 A1 | 8/2010 | Lopatin et al. |
| 2010/0203370 A1 | 8/2010 | Pozin et al. |
| 2010/0204370 A1 | 8/2010 | Mader |
| 2010/0206613 A1 | 8/2010 | Rieke |
| 2010/0209782 A1 | 8/2010 | Choi et al. |
| 2010/0210745 A1 | 8/2010 | McDaniel et al. |
| 2010/0216016 A1 | 8/2010 | Seino et al. |
| 2010/0216023 A1 | 8/2010 | Wei et al. |
| 2010/0216027 A1 | 8/2010 | Fujii |
| 2010/0216033 A1 | 8/2010 | Shimamura et al. |
| 2010/0220430 A1 | 9/2010 | Bae et al. |
| 2010/0224824 A1 | 9/2010 | Gorshkov |
| 2010/0233146 A1 | 9/2010 | McDaniel |
| 2010/0233523 A1 | 9/2010 | Jo et al. |
| 2010/0233673 A1 | 9/2010 | Brady et al. |

(56) References Cited

U.S. PATENT DOCUMENTS

| | | |
|---|---|---|
| 2010/0234478 A1 | 9/2010 | Rieke |
| 2010/0234493 A1 | 9/2010 | Peters et al. |
| 2010/0234504 A1 | 9/2010 | Fyvie et al. |
| 2010/0238608 A1 | 9/2010 | Dreissig et al. |
| 2010/0239902 A1 | 9/2010 | Hisamitsu et al. |
| 2010/0239917 A1 | 9/2010 | Lee et al. |
| 2010/0240813 A1 | 9/2010 | Terada |
| 2010/0248078 A1 | 9/2010 | Beard |
| 2010/0255356 A1 | 10/2010 | Fujii et al. |
| 2010/0255383 A1 | 10/2010 | Kofinas et al. |
| 2010/0263201 A1 | 10/2010 | Hisamitsu et al. |
| 2010/0263910 A1 | 10/2010 | Mitchell et al. |
| 2010/0279155 A1 | 11/2010 | Scott et al. |
| 2010/0285352 A1 | 11/2010 | Juzkow et al. |
| 2010/0285354 A1 | 11/2010 | Su et al. |
| 2010/0285358 A1 | 11/2010 | Cui et al. |
| 2010/0285373 A1 | 11/2010 | Horikawa |
| 2010/0291293 A1 | 11/2010 | Hennige et al. |
| 2010/0291429 A1 | 11/2010 | Farmer |
| 2010/0291443 A1 | 11/2010 | Farmer |
| 2010/0291444 A1 | 11/2010 | Farmer et al. |
| 2010/0292512 A1 | 11/2010 | DiMauro |
| 2010/0293779 A1 | 11/2010 | Kim et al. |
| 2010/0297502 A1 | 11/2010 | Zhu et al. |
| 2010/0297510 A1 | 11/2010 | Kim et al. |
| 2010/0299008 A1 | 11/2010 | Mitsutani |
| 2010/0304205 A1 | 12/2010 | Jo et al. |
| 2010/0304223 A1 | 12/2010 | Otsuki et al. |
| 2010/0310941 A1 | 12/2010 | Kumta et al. |
| 2010/0311879 A1 | 12/2010 | Rieke |
| 2010/0316913 A1 | 12/2010 | Klaassen |
| 2010/0320089 A1 | 12/2010 | Misra et al. |
| 2010/0323238 A1 | 12/2010 | Takahashi et al. |
| 2010/0330410 A1 | 12/2010 | Takahashi et al. |
| 2010/0330419 A1 | 12/2010 | Cui et al. |
| 2010/0330421 A1 | 12/2010 | Cui et al. |
| 2010/0330423 A1 | 12/2010 | Cui et al. |
| 2010/0330425 A1 | 12/2010 | Lopatin et al. |
| 2010/0330433 A1 | 12/2010 | Amine et al. |
| 2011/0003213 A1 | 1/2011 | Burchardt et al. |
| 2011/0004152 A1 | 1/2011 | Brady et al. |
| 2011/0005065 A1 | 1/2011 | Chiang et al. |
| 2011/0012067 A1 | 1/2011 | Kay |
| 2011/0014279 A1 | 1/2011 | Mora-Gutierrez et al. |
| 2011/0014522 A1 | 1/2011 | Visco et al. |
| 2011/0014523 A1 | 1/2011 | Park et al. |
| 2011/0014527 A1 | 1/2011 | Ohlsen |
| 2011/0020704 A1 | 1/2011 | Fukuchi et al. |
| 2011/0020706 A1 | 1/2011 | Nesper |
| 2011/0021568 A1 | 1/2011 | Ellman et al. |
| 2011/0024396 A1 | 2/2011 | Onnerud et al. |
| 2011/0027656 A1 | 2/2011 | Chiang et al. |
| 2011/0033734 A1 | 2/2011 | Chamberlain et al. |
| 2011/0033756 A1 | 2/2011 | Nakura |
| 2011/0037065 A1 | 2/2011 | Ueno et al. |
| 2011/0039144 A1 | 2/2011 | Visco et al. |
| 2011/0039157 A1 | 2/2011 | Sasaki et al. |
| 2011/0045346 A1 | 2/2011 | Chiang et al. |
| 2011/0049745 A1 | 3/2011 | Katayama et al. |
| 2011/0052966 A1 | 3/2011 | Lampe-Onnerud |
| 2011/0059349 A1 | 3/2011 | Lampe-Onnerud et al. |
| 2011/0064796 A1 | 3/2011 | Cipolla et al. |
| 2011/0064988 A1 | 3/2011 | Yu |
| 2011/0064999 A1 | 3/2011 | Chiang et al. |
| 2011/0067230 A1 | 3/2011 | Tan et al. |
| 2011/0070489 A1 | 3/2011 | Chiang et al. |
| 2011/0070495 A1 | 3/2011 | Ban et al. |
| 2011/0070504 A1 | 3/2011 | Matsumoto et al. |
| 2011/0076542 A1 | 3/2011 | Farmer |
| 2011/0076572 A1 | 3/2011 | Amine et al. |
| 2011/0077880 A1 | 3/2011 | Gering |
| 2011/0081563 A1 | 4/2011 | Christensen et al. |
| 2011/0081575 A1 | 4/2011 | Voelker et al. |
| 2011/0081581 A1 | 4/2011 | Ryu et al. |
| 2011/0086781 A1 | 4/2011 | Smalley et al. |
| 2011/0097624 A1 | 4/2011 | Bhatt et al. |
| 2011/0097628 A1 | 4/2011 | Lopatin et al. |
| 2011/0097630 A1 | 4/2011 | Choi et al. |
| 2011/0097700 A1 | 4/2011 | Brady et al. |
| 2011/0098463 A1 | 4/2011 | Yoshitani et al. |
| 2011/0104553 A1 | 5/2011 | Pol et al. |
| 2011/0104565 A1 | 5/2011 | Utsumi |
| 2011/0111294 A1 | 5/2011 | Lopez et al. |
| 2011/0111304 A1 | 5/2011 | Cui et al. |
| 2011/0114896 A1 | 5/2011 | Mitchell et al. |
| 2011/0117407 A1 | 5/2011 | Huang |
| 2011/0117445 A1 | 5/2011 | Abraham |
| 2011/0117446 A1 | 5/2011 | Lucht et al. |
| 2011/0123869 A1 | 5/2011 | Choi et al. |
| 2011/0129433 A1 | 6/2011 | Currie |
| 2011/0130392 A1 | 6/2011 | DiMauro et al. |
| 2011/0136006 A1 | 6/2011 | Nogi et al. |
| 2011/0136019 A1 | 6/2011 | Amiruddin et al. |
| 2011/0139331 A1 | 6/2011 | Arora et al. |
| 2011/0139730 A1 | 6/2011 | Dennes et al. |
| 2011/0143201 A1 | 6/2011 | Takada et al. |
| 2011/0143202 A1 | 6/2011 | Farmer et al. |
| 2011/0143207 A1 | 6/2011 | Arora et al. |
| 2011/0143217 A1 | 6/2011 | Arora et al. |
| 2011/0143219 A1 | 6/2011 | Weiss et al. |
| 2011/0150983 A1 | 6/2011 | Cipolla et al. |
| 2011/0151324 A1 | 6/2011 | Chiang et al. |
| 2011/0159329 A1 | 6/2011 | Tsujikawa et al. |
| 2011/0159365 A1 | 6/2011 | Loveness et al. |
| 2011/0159366 A1 | 6/2011 | Nakura |
| 2011/0159377 A1 | 6/2011 | Lee et al. |
| 2011/0159379 A1 | 6/2011 | Matsumoto et al. |
| 2011/0163327 A1 | 7/2011 | Ueno et al. |
| 2011/0171112 A1 | 7/2011 | Armand et al. |
| 2011/0171502 A1 | 7/2011 | Kottenstette et al. |
| 2011/0171539 A1 | 7/2011 | Patoux et al. |
| 2011/0177393 A1 | 7/2011 | Park et al. |
| 2011/0178306 A1 | 7/2011 | Michot |
| 2011/0181249 A1 | 7/2011 | Deguchi et al. |
| 2011/0183216 A1 | 7/2011 | Kim et al. |
| 2011/0189512 A1 | 8/2011 | Onnerud et al. |
| 2011/0189520 A1 | 8/2011 | Carter et al. |
| 2011/0189548 A1 | 8/2011 | Xu |
| 2011/0189579 A1 | 8/2011 | Bismarck et al. |
| 2011/0195318 A1 | 8/2011 | Tsujikawa et al. |
| 2011/0200868 A1 | 8/2011 | Klaassen |
| 2011/0200874 A1 | 8/2011 | Ono et al. |
| 2011/0206979 A1 | 8/2011 | Giroud et al. |
| 2011/0206994 A1 | 8/2011 | Balsara et al. |
| 2011/0207000 A1 | 8/2011 | Jow et al. |
| 2011/0207828 A1 | 8/2011 | Miller et al. |
| 2011/0212359 A1 | 9/2011 | Dai et al. |
| 2011/0229401 A1 | 9/2011 | Dai et al. |
| 2011/0229761 A1 | 9/2011 | Cui et al. |
| 2011/0230736 A1 | 9/2011 | Tepper et al. |
| 2011/0236744 A1 | 9/2011 | Kim et al. |
| 2011/0236751 A1 | 9/2011 | Amiruddin et al. |
| 2011/0236765 A1 | 9/2011 | Matsui et al. |
| 2011/0236772 A1 | 9/2011 | Burchardt et al. |
| 2011/0236798 A1 | 9/2011 | Burchardt et al. |
| 2011/0236799 A1 | 9/2011 | Burchardt et al. |
| 2011/0240064 A1 | 10/2011 | Wales et al. |
| 2011/0244313 A1 | 10/2011 | Holstein et al. |
| 2011/0250503 A1 | 10/2011 | Wilson et al. |
| 2011/0250626 A1 | 10/2011 | Williams et al. |
| 2011/0256457 A1 | 10/2011 | Utsumi |
| 2011/0257587 A1 | 10/2011 | Lilienfeld et al. |
| 2011/0263650 A1 | 10/2011 | Ellman et al. |
| 2011/0264229 A1 | 10/2011 | Donner |
| 2011/0264381 A1 | 10/2011 | Gering |
| 2011/0269010 A1 | 11/2011 | Sawaguchi et al. |
| 2011/0274725 A1 | 11/2011 | Breton et al. |
| 2011/0274976 A1 | 11/2011 | Blomgren et al. |
| 2011/0274977 A1 | 11/2011 | Nakura |
| 2011/0275743 A1 | 11/2011 | Ishii et al. |
| 2011/0278170 A1 | 11/2011 | Chiang et al. |
| 2011/0281159 A1 | 11/2011 | Farmer et al. |
| 2011/0287316 A1 | 11/2011 | Lu et al. |
| 2011/0287318 A1 | 11/2011 | Loveness et al. |

(56) References Cited

U.S. PATENT DOCUMENTS

| | | |
|---|---|---|
| 2011/0293997 A1 | 12/2011 | Tartaglia |
| 2011/0300444 A1 | 12/2011 | Nakamura |
| 2011/0300450 A1 | 12/2011 | Balaji et al. |
| 2011/0301707 A1 | 12/2011 | Buskirk et al. |
| 2011/0301931 A1 | 12/2011 | Gering |
| 2011/0303868 A1 | 12/2011 | Sienkiewicz et al. |
| 2011/0305949 A1 | 12/2011 | Nesper et al. |
| 2011/0305958 A1 | 12/2011 | Kuriki |
| 2011/0311865 A1 | 12/2011 | Tatsumi et al. |
| 2011/0311881 A1 | 12/2011 | Benicewicz |
| 2011/0319426 A1 | 12/2011 | Holenz et al. |
| 2012/0003508 A1 | 1/2012 | Narbonne et al. |
| 2012/0003514 A1 | 1/2012 | Tsujikawa et al. |
| 2012/0003518 A1 | 1/2012 | Fischel |
| 2012/0007560 A1 | 1/2012 | Smart et al. |
| 2012/0009481 A1 | 1/2012 | Song et al. |
| 2012/0009483 A1 | 1/2012 | Chu et al. |
| 2012/0009485 A1 | 1/2012 | Xu et al. |
| 2012/0015249 A1 | 1/2012 | Awano et al. |
| 2012/0021266 A1 | 1/2012 | Marple et al. |
| 2012/0021286 A1 | 1/2012 | Tabuchi et al. |
| 2012/0021294 A1 | 1/2012 | Zhamu et al. |
| 2012/0021303 A1 | 1/2012 | Amendola et al. |
| 2012/0028047 A1 | 2/2012 | Imai et al. |
| 2012/0028105 A1 | 2/2012 | Kumar et al. |
| 2012/0034500 A1 | 2/2012 | Kaun |
| 2012/0034512 A1 | 2/2012 | Zhang et al. |
| 2012/0034523 A1 | 2/2012 | Sheem et al. |
| 2012/0038967 A1 | 2/2012 | Copeland et al. |
| 2012/0045670 A1 | 2/2012 | Stefan et al. |
| 2012/0045697 A1 | 2/2012 | Park et al. |
| 2012/0052401 A1 | 3/2012 | Goodenough et al. |
| 2012/0058377 A1 | 3/2012 | Sastry et al. |
| 2012/0058398 A1 | 3/2012 | Balaji et al. |
| 2012/0060360 A1 | 3/2012 | Liu |
| 2012/0064396 A1 | 3/2012 | Nishie et al. |
| 2012/0064398 A1 | 3/2012 | Kim et al. |
| 2012/0064399 A1 | 3/2012 | Carlson |
| 2012/0064409 A1 | 3/2012 | Zhamu et al. |
| 2012/0070741 A1 | 3/2012 | Liu et al. |
| 2012/0074036 A1 | 3/2012 | Eckel et al. |
| 2012/0074617 A1 | 3/2012 | Eckel et al. |
| 2012/0077076 A1 | 3/2012 | Cheng et al. |
| 2012/0077082 A1 | 3/2012 | Se-Hee et al. |
| 2012/0077091 A1 | 3/2012 | Lee et al. |
| 2012/0077095 A1 | 3/2012 | Roumi et al. |
| 2012/0082873 A1 | 4/2012 | Fischel |
| 2012/0082890 A1 | 4/2012 | Dong et al. |
| 2012/0082901 A1 | 4/2012 | Schmidt et al. |
| 2012/0082902 A1 | 4/2012 | Hwu et al. |
| 2012/0082903 A1 | 4/2012 | Zhang et al. |
| 2012/0088155 A1 | 4/2012 | Yushin et al. |
| 2012/0088162 A1 | 4/2012 | Harrup et al. |
| 2012/0094178 A1 | 4/2012 | Loveridge et al. |
| 2012/0094188 A1 | 4/2012 | Visco et al. |
| 2012/0094194 A1 | 4/2012 | Visco et al. |
| 2012/0097194 A1 | 4/2012 | McDaniel et al. |
| 2012/0100438 A1 | 4/2012 | Fasching et al. |
| 2012/0105007 A1 | 5/2012 | Amiruddin et al. |
| 2012/0107680 A1 | 5/2012 | Amiruddin et al. |
| 2012/0107697 A1 | 5/2012 | Roh et al. |
| 2012/0107726 A1 | 5/2012 | Ogata et al. |
| 2012/0110835 A1 | 5/2012 | Hudson et al. |
| 2012/0115018 A1 | 5/2012 | Kawaoka et al. |
| 2012/0115041 A1 | 5/2012 | West et al. |
| 2012/0121974 A1 | 5/2012 | Tikhonov et al. |
| 2012/0121989 A1 | 5/2012 | Roberts et al. |
| 2012/0121991 A1 | 5/2012 | Tikhonov et al. |
| 2012/0129019 A1 | 5/2012 | Onnerud et al. |
| 2012/0129045 A1 | 5/2012 | Gin et al. |
| 2012/0129046 A1 | 5/2012 | Utsumi |
| 2012/0133341 A1 | 5/2012 | Gan et al. |
| 2012/0135312 A1 | 5/2012 | Takahashi |
| 2012/0135313 A1 | 5/2012 | West et al. |
| 2012/0138916 A1 | 6/2012 | Ueno et al. |
| 2012/0141864 A1 | 6/2012 | Juzkow et al. |
| 2012/0141866 A1 | 6/2012 | Kuriki et al. |
| 2012/0141867 A1 | 6/2012 | Iwayasu et al. |
| 2012/0141869 A1 | 6/2012 | Takahata |
| 2012/0141870 A1 | 6/2012 | Chen et al. |
| 2012/0141878 A1 | 6/2012 | Ohashi et al. |
| 2012/0141883 A1 | 6/2012 | Smart et al. |
| 2012/0141884 A1 | 6/2012 | Takahata |
| 2012/0146010 A1 | 6/2012 | Ueno et al. |
| 2012/0148896 A1 | 6/2012 | Dennes et al. |
| 2012/0148897 A1 | 6/2012 | Dennes et al. |
| 2012/0148922 A1 | 6/2012 | Takahashi |
| 2012/0149852 A1 | 6/2012 | Dennes et al. |
| 2012/0155507 A1 | 6/2012 | Srinivasan et al. |
| 2012/0164519 A1 | 6/2012 | Lee et al. |
| 2012/0164541 A1 | 6/2012 | Darolles et al. |
| 2012/0169297 A1 | 7/2012 | Schaefer et al. |
| 2012/0171535 A1 | 7/2012 | Ma |
| 2012/0171536 A1 | 7/2012 | Kaneda |
| 2012/0171542 A1 | 7/2012 | Matsumoto et al. |
| 2012/0175552 A1 | 7/2012 | Fukuchi et al. |
| 2012/0177995 A1 | 7/2012 | Sun et al. |
| 2012/0178145 A1 | 7/2012 | Nam et al. |
| 2012/0183842 A1 | 7/2012 | Kawasaki et al. |
| 2012/0183843 A1 | 7/2012 | Kawasaki et al. |
| 2012/0183856 A1 | 7/2012 | Cui et al. |
| 2012/0183865 A1 | 7/2012 | Deguchi |
| 2012/0183866 A1 | 7/2012 | Lee et al. |
| 2012/0188086 A1 | 7/2012 | Xie et al. |
| 2012/0189910 A1 | 7/2012 | Brune et al. |
| 2012/0189920 A1 | 7/2012 | Li et al. |
| 2012/0202112 A1 | 8/2012 | Yushin et al. |
| 2012/0208087 A1 | 8/2012 | Yamamoto et al. |
| 2012/0211705 A1 | 8/2012 | Ueno et al. |
| 2012/0218683 A1 | 8/2012 | Kondou et al. |
| 2012/0219865 A1 | 8/2012 | Kaneko et al. |
| 2012/0225331 A1 | 9/2012 | Tartaglia |
| 2012/0225358 A1 | 9/2012 | Seo et al. |
| 2012/0225359 A1 | 9/2012 | Xu et al. |
| 2012/0225959 A1 | 9/2012 | Muller et al. |
| 2012/0231308 A1 | 9/2012 | Chiang et al. |
| 2012/0231325 A1 | 9/2012 | Yoon et al. |
| 2012/0231336 A1 | 9/2012 | Kim et al. |
| 2012/0231352 A1 | 9/2012 | Pol et al. |
| 2012/0232285 A1 | 9/2012 | Michot |
| 2012/0244206 A1 | 9/2012 | Cipolla et al. |
| 2012/0244391 A1 | 9/2012 | Yushin et al. |
| 2012/0244417 A1 | 9/2012 | Takahata et al. |
| 2012/0249080 A1 | 10/2012 | Suto |
| 2012/0251853 A1 | 10/2012 | Kim et al. |
| 2012/0251886 A1 | 10/2012 | Yushin et al. |
| 2012/0251892 A1 | 10/2012 | Kang et al. |
| 2012/0251896 A1 | 10/2012 | Chiang et al. |
| 2012/0270076 A9 | 10/2012 | Yazami |
| 2012/0270112 A1 | 10/2012 | Visco et al. |
| 2012/0273737 A1 | 11/2012 | Ooishi |
| 2012/0276445 A1 | 11/2012 | Xu |
| 2012/0282328 A1 | 11/2012 | Cipolla et al. |
| 2012/0282530 A1 | 11/2012 | Chiang et al. |
| 2012/0288750 A1 | 11/2012 | Kung et al. |
| 2012/0288751 A1 | 11/2012 | Kako et al. |
| 2012/0288769 A1 | 11/2012 | Kono et al. |
| 2012/0289887 A1 | 11/2012 | Visco et al. |
| 2012/0292196 A1 | 11/2012 | Albrecht et al. |
| 2012/0292197 A1 | 11/2012 | Albrecht et al. |
| 2012/0293916 A1 | 11/2012 | Lee et al. |
| 2012/0295155 A1 | 11/2012 | Deng et al. |
| 2012/0295165 A1 | 11/2012 | Morin et al. |
| 2012/0295166 A1 | 11/2012 | Gennett et al. |
| 2012/0297611 A1 | 11/2012 | Ma |
| 2012/0301766 A1 | 11/2012 | Monden et al. |
| 2012/0301789 A1 | 11/2012 | Loveness et al. |
| 2012/0301797 A1 | 11/2012 | Abe et al. |
| 2012/0308894 A1 | 12/2012 | Oguni et al. |
| 2012/0315535 A1 | 12/2012 | Matsumoto |
| 2012/0315546 A1 | 12/2012 | Kaneko et al. |
| 2012/0315549 A1 | 12/2012 | Tang et al. |
| 2012/0319034 A1 | 12/2012 | Awano et al. |
| 2012/0321959 A1 | 12/2012 | Yushin et al. |

(56) References Cited

U.S. PATENT DOCUMENTS

| | | |
|---|---|---|
| 2012/0323036 A1 | 12/2012 | Chen et al. |
| 2012/0323324 A1 | 12/2012 | Buskirk et al. |
| 2012/0325410 A1 | 12/2012 | Barinov et al. |
| 2012/0326073 A1 | 12/2012 | Lynd et al. |
| 2012/0328942 A1 | 12/2012 | Thomas-Alyea et al. |
| 2012/0328952 A1 | 12/2012 | Yushin et al. |
| 2013/0001092 A1 | 1/2013 | Abbott et al. |
| 2013/0004839 A1 | 1/2013 | Utsumi |
| 2013/0004852 A1 | 1/2013 | Visco et al. |
| 2013/0004859 A1 | 1/2013 | Yu et al. |
| 2013/0004862 A1 | 1/2013 | Miyoshi et al. |
| 2013/0011728 A1 | 1/2013 | Tokuda et al. |
| 2013/0011736 A1 | 1/2013 | Loveness et al. |
| 2013/0017443 A1 | 1/2013 | Yamazaki |
| 2013/0017453 A1 | 1/2013 | Ajayan et al. |
| 2013/0020557 A1 | 1/2013 | Roscheisen et al. |
| 2013/0022861 A1 | 1/2013 | Miyagi et al. |
| 2013/0022863 A1 | 1/2013 | Madabusi et al. |
| 2013/0022880 A1 | 1/2013 | Tsujioka et al. |
| 2013/0026409 A1 | 1/2013 | Baker et al. |
| 2013/0029230 A1 | 1/2013 | Park et al. |
| 2013/0034762 A1 | 2/2013 | Marple et al. |
| 2013/0035723 A1 | 2/2013 | Donner |
| 2013/0040203 A1 | 2/2013 | Yoon et al. |
| 2013/0043057 A1 | 2/2013 | Oguni et al. |
| 2013/0043125 A1 | 2/2013 | Gill et al. |
| 2013/0043843 A1 | 2/2013 | Amiruddin et al. |
| 2013/0045427 A1 | 2/2013 | Zhamu et al. |
| 2013/0048923 A1 | 2/2013 | Gorshkov |
| 2013/0052508 A1 | 2/2013 | Kim et al. |
| 2013/0052528 A1 | 2/2013 | Kuriki et al. |
| 2013/0052542 A1 | 2/2013 | Abraham et al. |
| 2013/0055559 A1 | 3/2013 | Slocum et al. |
| 2013/0059172 A1 | 3/2013 | Sastry et al. |
| 2013/0059195 A1 | 3/2013 | Kuriki et al. |
| 2013/0065122 A1 | 3/2013 | Chiang et al. |
| 2013/0065130 A1 | 3/2013 | Ban et al. |
| 2013/0067726 A1 | 3/2013 | Kuriki et al. |
| 2013/0069601 A1 | 3/2013 | Coowar et al. |
| 2013/0069658 A1 | 3/2013 | Rich et al. |
| 2013/0069661 A1 | 3/2013 | Rich et al. |
| 2013/0070391 A1 | 3/2013 | Zheng |
| 2013/0071729 A1 | 3/2013 | Klaassen |
| 2013/0071733 A1 | 3/2013 | Abe et al. |
| 2013/0071739 A1 | 3/2013 | Tajima et al. |
| 2013/0071762 A1 | 3/2013 | Tajima et al. |
| 2013/0072154 A1 | 3/2013 | Rich et al. |
| 2013/0078525 A1 | 3/2013 | Morin et al. |
| 2013/0084495 A1 | 4/2013 | Tajima et al. |
| 2013/0084496 A1 | 4/2013 | Osada et al. |
| 2013/0084501 A1 | 4/2013 | Wakayama et al. |
| 2013/0084505 A1 | 4/2013 | Iriyama et al. |
| 2013/0088204 A1 | 4/2013 | Khare et al. |
| 2013/0089793 A1 | 4/2013 | Gering et al. |
| 2013/0090900 A1 | 4/2013 | Gering |
| 2013/0092866 A1 | 4/2013 | Rupert et al. |
| 2013/0095351 A1 | 4/2013 | Gellett et al. |
| 2013/0095392 A1 | 4/2013 | Shin et al. |
| 2013/0100563 A1 | 4/2013 | Cho et al. |
| 2013/0108539 A1 | 5/2013 | Fu et al. |
| 2013/0108802 A1 | 5/2013 | Oladeji |
| 2013/0108899 A1 | 5/2013 | Schaefer |
| 2013/0108920 A1 | 5/2013 | Oladeji |
| 2013/0108930 A1 | 5/2013 | Patterson et al. |
| 2013/0109262 A1 | 5/2013 | Zhou |
| 2013/0115520 A1 | 5/2013 | Abe et al. |
| 2013/0115529 A1 | 5/2013 | Zhang et al. |
| 2013/0115531 A1 | 5/2013 | Amendola et al. |
| 2013/0122361 A1 | 5/2013 | Yazami |
| 2013/0128488 A1 | 5/2013 | Forster et al. |
| 2013/0129660 A1 | 5/2013 | Currie |
| 2013/0130069 A1 | 5/2013 | Mullin et al. |
| 2013/0130108 A1 | 5/2013 | Alarco et al. |
| 2013/0130121 A1 | 5/2013 | Abe et al. |
| 2013/0130125 A1 | 5/2013 | Hauser |
| 2013/0130126 A1 | 5/2013 | McDonald et al. |
| 2013/0130128 A1 | 5/2013 | Okamoto et al. |
| 2013/0135110 A1 | 5/2013 | Xie et al. |
| 2013/0136981 A1 | 5/2013 | Peuchert et al. |
| 2013/0141693 A1 | 6/2013 | McCabe et al. |
| 2013/0143090 A1 | 6/2013 | Hosoya et al. |
| 2013/0143129 A1 | 6/2013 | Okamoto et al. |
| 2013/0149567 A1 | 6/2013 | Schaefer |
| 2013/0149596 A1 | 6/2013 | Shiflett |
| 2013/0149602 A1 | 6/2013 | Luski et al. |
| 2013/0149605 A1 | 6/2013 | Kakehata et al. |
| 2013/0149670 A1 | 6/2013 | Francois |
| 2013/0156720 A1 | 6/2013 | Currie |
| 2013/0157141 A1 | 6/2013 | Zhong et al. |
| 2013/0157147 A1 | 6/2013 | Li et al. |
| 2013/0157149 A1 | 6/2013 | Peled et al. |
| 2013/0157152 A1 | 6/2013 | Lanning et al. |
| 2013/0163148 A1 | 6/2013 | Isii et al. |
| 2013/0164571 A1 | 6/2013 | Hirose |
| 2013/0164611 A1 | 6/2013 | Nanba et al. |
| 2013/0164612 A1 | 6/2013 | Tanemura et al. |
| 2013/0164628 A1 | 6/2013 | Visco et al. |
| 2013/0167363 A1 | 7/2013 | Xu et al. |
| 2013/0169238 A1 | 7/2013 | Rojeski |
| 2013/0171340 A1 | 7/2013 | Rojeski |
| 2013/0171500 A1 | 7/2013 | Xu et al. |
| 2013/0171502 A1 | 7/2013 | Chen et al. |
| 2013/0171512 A1 | 7/2013 | Rojeski |
| 2013/0177814 A1 | 7/2013 | Rojeski et al. |
| 2013/0177818 A1 | 7/2013 | Han et al. |
| 2013/0178011 A1 | 7/2013 | Ginley et al. |
| 2013/0183579 A1 | 7/2013 | Kim et al. |
| 2013/0183580 A1 | 7/2013 | Kako et al. |
| 2013/0189575 A1 | 7/2013 | Anguchamy et al. |
| 2013/0189579 A1 | 7/2013 | Darby et al. |
| 2013/0189592 A1 | 7/2013 | Roumi et al. |
| 2013/0194723 A1 | 8/2013 | Felten et al. |
| 2013/0195805 A1 | 8/2013 | Wei et al. |
| 2013/0196223 A1 | 8/2013 | Gering et al. |
| 2013/0196235 A1 | 8/2013 | Prieto et al. |
| 2013/0199936 A1 | 8/2013 | Zhang et al. |
| 2013/0202920 A1 | 8/2013 | Xu et al. |
| 2013/0202945 A1 | 8/2013 | Zhamu et al. |
| 2013/0202955 A1 | 8/2013 | Yawata et al. |
| 2013/0202956 A1 | 8/2013 | Xu et al. |
| 2013/0202959 A1 | 8/2013 | Chiang et al. |
| 2013/0202967 A1 | 8/2013 | Kim et al. |
| 2013/0202973 A1 | 8/2013 | Lane et al. |
| 2013/0206606 A1 | 8/2013 | Gilliam et al. |
| 2013/0209348 A1 | 8/2013 | Ludvik et al. |
| 2013/0209391 A1 | 8/2013 | Arhancet et al. |
| 2013/0209860 A1 | 8/2013 | Tsujikawa et al. |
| 2013/0209869 A1 | 8/2013 | Rojeski |
| 2013/0209870 A1 | 8/2013 | Tsujikawa et al. |
| 2013/0209887 A1 | 8/2013 | Young |
| 2013/0209897 A1 | 8/2013 | Paranthaman et al. |
| 2013/0216894 A1 | 8/2013 | Wang et al. |
| 2013/0216899 A1 | 8/2013 | Tsujikawa et al. |
| 2013/0216907 A1 | 8/2013 | Rayner et al. |
| 2013/0216908 A1 | 8/2013 | Tsujikawa et al. |
| 2013/0216918 A1 | 8/2013 | Tokuda et al. |
| 2013/0216920 A1 | 8/2013 | Tsujikawa et al. |
| 2013/0224576 A1 | 8/2013 | Rosciano et al. |
| 2013/0224583 A1 | 8/2013 | Green |
| 2013/0224603 A1 | 8/2013 | Chen et al. |
| 2013/0224604 A1 | 8/2013 | Yu et al. |
| 2013/0224605 A1 | 8/2013 | Lamanna et al. |
| 2013/0230772 A1 | 9/2013 | Noda et al. |
| 2013/0230773 A1 | 9/2013 | Tsujikawa et al. |
| 2013/0230779 A1 | 9/2013 | Kaneko et al. |
| 2013/0232772 A1 | 9/2013 | Tikhonov et al. |
| 2013/0234074 A1 | 9/2013 | Gilles et al. |
| 2013/0236750 A1 | 9/2013 | Sato |
| 2013/0236766 A1 | 9/2013 | Seo et al. |
| 2013/0244095 A1 | 9/2013 | Min et al. |
| 2013/0244102 A1 | 9/2013 | Golodnitsky et al. |
| 2013/0244107 A1 | 9/2013 | Rojeski |
| 2013/0244133 A1 | 9/2013 | Wieland |
| 2013/0252090 A1 | 9/2013 | Tsujikawa et al. |

(56) References Cited

U.S. PATENT DOCUMENTS

| | | |
|---|---|---|
| 2013/0252101 A1 | 9/2013 | Zhou et al. |
| 2013/0252112 A1 | 9/2013 | Doe et al. |
| 2013/0252114 A1 | 9/2013 | Doe et al. |
| 2013/0259776 A1 | 10/2013 | Heres et al. |
| 2013/0260222 A1 | 10/2013 | Lu et al. |
| 2013/0260229 A1 | 10/2013 | Uzun et al. |
| 2013/0260232 A1 | 10/2013 | Lu et al. |
| 2013/0260246 A1 | 10/2013 | Chen et al. |
| 2013/0260254 A1 | 10/2013 | Kren et al. |
| 2013/0260255 A1 | 10/2013 | Lopatin et al. |
| 2013/0264999 A1 | 10/2013 | Srinivasan et al. |
| 2013/0266827 A1 | 10/2013 | Sastry et al. |
| 2013/0266846 A1 | 10/2013 | Kawasaki et al. |
| 2013/0266858 A1 | 10/2013 | Inoue et al. |
| 2013/0266866 A1 | 10/2013 | Miyazaki et al. |
| 2013/0271085 A1 | 10/2013 | Chen et al. |
| 2013/0271089 A1 | 10/2013 | Yazami et al. |
| 2013/0271811 A1 | 10/2013 | Lam et al. |
| 2013/0277599 A1 | 10/2013 | Michot et al. |
| 2013/0278989 A1 | 10/2013 | Lam et al. |
| 2013/0280579 A1 | 10/2013 | Wright et al. |
| 2013/0280592 A1 | 10/2013 | Sato et al. |
| 2013/0280601 A1 | 10/2013 | Geramita et al. |
| 2013/0280621 A1 | 10/2013 | Koga et al. |
| 2013/0281591 A1 | 10/2013 | Yano et al. |
| 2013/0281977 A1 | 10/2013 | Steele et al. |
| 2013/0288083 A1 | 10/2013 | Sweetland et al. |
| 2013/0288084 A1 | 10/2013 | Sastry et al. |
| 2013/0288113 A1 | 10/2013 | Onagi et al. |
| 2013/0288120 A1 | 10/2013 | Iida et al. |
| 2013/0288136 A1 | 10/2013 | Arora et al. |
| 2013/0288138 A1 | 10/2013 | Tikhonov et al. |
| 2013/0295439 A1 | 11/2013 | Masarapu et al. |
| 2013/0295461 A1 | 11/2013 | Chen et al. |
| 2013/0295465 A1 | 11/2013 | Kaneko et al. |
| 2013/0295492 A1 | 11/2013 | Hinago et al. |
| 2013/0300033 A1 | 11/2013 | Kim et al. |
| 2013/0302650 A1 | 11/2013 | Delangis |
| 2013/0302679 A1 | 11/2013 | Uemachi |
| 2013/0302697 A1 | 11/2013 | Wang et al. |
| 2013/0302702 A1 | 11/2013 | Matsumoto |
| 2013/0302704 A1 | 11/2013 | Visco et al. |
| 2013/0309527 A1 | 11/2013 | Liu et al. |
| 2013/0309549 A1 | 11/2013 | Luski et al. |
| 2013/0309561 A1 | 11/2013 | Chen et al. |
| 2013/0309564 A1 | 11/2013 | Yoshida et al. |
| 2013/0309571 A1 | 11/2013 | Yoon et al. |
| 2013/0309580 A1 | 11/2013 | Tomura |
| 2013/0316233 A1 | 11/2013 | Hirayama et al. |
| 2013/0316248 A9 | 11/2013 | Ignatyev et al. |
| 2013/0319870 A1 | 12/2013 | Chen et al. |
| 2013/0320582 A1 | 12/2013 | Cui et al. |
| 2013/0320928 A1 | 12/2013 | Yazami et al. |
| 2013/0323571 A1 | 12/2013 | Dai et al. |
| 2013/0323585 A1 | 12/2013 | Inoue et al. |
| 2013/0323595 A1 | 12/2013 | Sohn et al. |
| 2013/0323605 A1 | 12/2013 | Yamamoto et al. |
| 2013/0327648 A1 | 12/2013 | Grant et al. |
| 2013/0330609 A1 | 12/2013 | Sawa et al. |
| 2013/0330611 A1 | 12/2013 | Chen et al. |
| 2013/0330637 A1 | 12/2013 | Matsumoto et al. |
| 2013/0337189 A1 | 12/2013 | Miller |
| 2013/0337304 A1 | 12/2013 | Luski et al. |
| 2013/0337335 A1 | 12/2013 | Kim et al. |
| 2013/0337338 A1 | 12/2013 | Tikhonov et al. |
| 2013/0337339 A1 | 12/2013 | Tikhonov et al. |
| 2013/0337340 A1 | 12/2013 | Tikhonov et al. |
| 2013/0337341 A1 | 12/2013 | Tikhonov et al. |
| 2013/0337343 A1 | 12/2013 | Tokuda et al. |
| 2013/0337346 A1 | 12/2013 | Miyoshi et al. |
| 2013/0344360 A1 | 12/2013 | Miyajama et al. |
| 2013/0344383 A1 | 12/2013 | Loveness et al. |
| 2013/0344390 A1 | 12/2013 | Chen et al. |
| 2013/0344391 A1 | 12/2013 | Yushin et al. |
| 2013/0344392 A1 | 12/2013 | Huang et al. |
| 2013/0344396 A1 | 12/2013 | Bosnyak et al. |
| 2013/0344397 A1 | 12/2013 | Visco et al. |
| 2014/0011081 A1 | 1/2014 | Ahn et al. |
| 2014/0011088 A1 | 1/2014 | Lopatin et al. |
| 2014/0015160 A1 | 1/2014 | Kung et al. |
| 2014/0017547 A1 | 1/2014 | Eichinger |
| 2014/0017549 A1 | 1/2014 | Miyazaki et al. |
| 2014/0017557 A1 | 1/2014 | Lockett et al. |
| 2014/0017558 A1 | 1/2014 | Lockett et al. |
| 2014/0017559 A1 | 1/2014 | Kawasaki et al. |
| 2014/0017568 A1 | 1/2014 | Gadkaree et al. |
| 2014/0017571 A1 | 1/2014 | Lockett et al. |
| 2014/0017573 A1 | 1/2014 | Otsuki et al. |
| 2014/0023884 A1 | 1/2014 | Miller |
| 2014/0023932 A1 | 1/2014 | Zhang et al. |
| 2014/0023934 A1 | 1/2014 | Otsuki et al. |
| 2014/0027677 A1 | 1/2014 | Lipka et al. |
| 2014/0030182 A1 | 1/2014 | Dai et al. |
| 2014/0030559 A1 | 1/2014 | Yazami et al. |
| 2014/0030609 A1 | 1/2014 | Abe et al. |
| 2014/0030610 A1 | 1/2014 | Abe et al. |
| 2014/0030623 A1 | 1/2014 | Chiang et al. |
| 2014/0038006 A1 | 2/2014 | Sturm et al. |
| 2014/0038043 A1 | 2/2014 | Hirayama et al. |
| 2014/0038059 A1 | 2/2014 | Li et al. |
| 2014/0038060 A1 | 2/2014 | Abe |
| 2014/0045015 A1 | 2/2014 | Yokoyama et al. |
| 2014/0045016 A1 | 2/2014 | Okutani et al. |
| 2014/0045017 A1 | 2/2014 | Nonaka et al. |
| 2014/0045019 A1 | 2/2014 | Yokoyama et al. |
| 2014/0045020 A1 | 2/2014 | Okutani et al. |
| 2014/0045021 A1 | 2/2014 | Okutani et al. |
| 2014/0045022 A1 | 2/2014 | Matsuda et al. |
| 2014/0045065 A1 | 2/2014 | Bao et al. |
| 2014/0045096 A1 | 2/2014 | Berger et al. |
| 2014/0050739 A1 | 2/2014 | Francois et al. |
| 2014/0050910 A1 | 2/2014 | Mukherjee et al. |
| 2014/0050972 A1 | 2/2014 | Amiruddin et al. |
| 2014/0057153 A1 | 2/2014 | Visco et al. |
| 2014/0057168 A1 | 2/2014 | Newbound et al. |
| 2014/0057169 A1 | 2/2014 | George et al. |
| 2014/0057172 A1 | 2/2014 | Jeong et al. |
| 2014/0057173 A1 | 2/2014 | Jeong et al. |
| 2014/0057179 A1 | 2/2014 | Yushin et al. |
| 2014/0059820 A1 | 3/2014 | Wright et al. |
| 2014/0060859 A1 | 3/2014 | Kountz et al. |
| 2014/0065461 A1 | 3/2014 | Kountz et al. |
| 2014/0065479 A1 | 3/2014 | Yamada et al. |
| 2014/0069643 A1 | 3/2014 | Ogle et al. |
| 2014/0072837 A1 | 3/2014 | Sastry et al. |
| 2014/0072843 A1 | 3/2014 | Liemersdorf et al. |
| 2014/0072871 A1 | 3/2014 | Chen et al. |
| 2014/0072877 A1 | 3/2014 | Araki et al. |
| 2014/0072879 A1 | 3/2014 | Chen et al. |
| 2014/0075745 A1 | 3/2014 | Lu et al. |
| 2014/0080012 A1 | 3/2014 | Minami et al. |
| 2014/0083689 A1 | 3/2014 | Streich et al. |
| 2014/0087214 A1 | 3/2014 | Amatucci et al. |
| 2014/0087250 A1 | 3/2014 | Coowar et al. |
| 2014/0087251 A1 | 3/2014 | Takahashi et al. |
| 2014/0087257 A1 | 3/2014 | Gopukumar et al. |
| 2014/0093780 A1 | 4/2014 | Tabuchi et al. |
| 2014/0093783 A1 | 4/2014 | Lamanna et al. |
| 2014/0093787 A1 | 4/2014 | Abe et al. |
| 2014/0099528 A1 | 4/2014 | Lockett et al. |
| 2014/0099539 A1 | 4/2014 | Yamazaki et al. |
| 2014/0099557 A1 | 4/2014 | Doe et al. |
| 2014/0099560 A1 | 4/2014 | Parans Paranthaman et al. |
| 2014/0102884 A1 | 4/2014 | Miller |
| 2014/0104754 A1 | 4/2014 | Lipka et al. |
| 2014/0105851 A1 | 4/2014 | Currie |
| 2014/0106219 A1 | 4/2014 | Wang et al. |
| 2014/0106992 A1 | 4/2014 | Patil et al. |
| 2014/0107326 A1 | 4/2014 | Swager et al. |
| 2014/0113202 A1 | 4/2014 | Sun et al. |
| 2014/0113203 A1 | 4/2014 | Xiao et al. |
| 2014/0117940 A1 | 5/2014 | Takahata |
| 2014/0125292 A1 | 5/2014 | Best et al. |
| 2014/0127567 A1 | 5/2014 | Kuriki et al. |

(56) References Cited

U.S. PATENT DOCUMENTS

| | | |
|---|---|---|
| 2014/0127575 A1 | 5/2014 | Scrosati et al. |
| 2014/0128991 A1 | 5/2014 | Atanasoska et al. |
| 2014/0131217 A1 | 5/2014 | Buschmann |
| 2014/0132220 A1 | 5/2014 | Jamison |
| 2014/0134499 A1 | 5/2014 | Newbound et al. |
| 2014/0134501 A1 | 5/2014 | Li et al. |
| 2014/0134521 A1 | 5/2014 | Naito et al. |
| 2014/0138591 A1 | 5/2014 | Yoon et al. |
| 2014/0140912 A1 | 5/2014 | Ivanovic-Burmazovic et al. |
| 2014/0141336 A1 | 5/2014 | Morin |
| 2014/0141337 A1 | 5/2014 | Morin |
| 2014/0141340 A1 | 5/2014 | Egorov et al. |
| 2014/0146440 A1 | 5/2014 | Gadkaree et al. |
| 2014/0147710 A1 | 5/2014 | Schaefer |
| 2014/0147741 A1 | 5/2014 | Shin et al. |
| 2014/0147752 A1 | 5/2014 | Pratt et al. |
| 2014/0154546 A1 | 6/2014 | Carter et al. |
| 2014/0154557 A1 | 6/2014 | Mori et al. |
| 2014/0154559 A1 | 6/2014 | Mori et al. |
| 2014/0154587 A1 | 6/2014 | Abe et al. |
| 2014/0154590 A1 | 6/2014 | Kramer et al. |
| 2014/0158196 A1 | 6/2014 | Kurihara et al. |
| 2014/0162108 A1 | 6/2014 | Visco et al. |
| 2014/0162130 A1 | 6/2014 | Barsoum et al. |
| 2014/0162131 A1 | 6/2014 | Friend et al. |
| 2014/0162135 A1 | 6/2014 | Prieto et al. |
| 2014/0166929 A1 | 6/2014 | Takeuchi et al. |
| 2014/0166939 A1 | 6/2014 | Park et al. |
| 2014/0170303 A1 | 6/2014 | Rayner et al. |
| 2014/0170465 A1 | 6/2014 | Visco et al. |
| 2014/0170475 A1 | 6/2014 | Park et al. |
| 2014/0170480 A1 | 6/2014 | Oladeji |
| 2014/0170482 A1 | 6/2014 | Park et al. |
| 2014/0170498 A1 | 6/2014 | Park |
| 2014/0170500 A1 | 6/2014 | Oguni et al. |
| 2014/0170503 A1 | 6/2014 | Yushin et al. |
| 2014/0170524 A1 | 6/2014 | Chiang et al. |
| 2014/0170900 A1 | 6/2014 | Ishii et al. |
| 2014/0173300 A1 | 6/2014 | Yamazaki et al. |
| 2014/0176074 A1 | 6/2014 | Kako et al. |
| 2014/0176076 A1 | 6/2014 | Momo et al. |
| 2014/0178759 A1 | 6/2014 | Worsley et al. |
| 2014/0178770 A1 | 6/2014 | Xu et al. |
| 2014/0178772 A1 | 6/2014 | Jeong et al. |
| 2014/0184162 A1 | 7/2014 | Takahashi et al. |
| 2014/0184172 A1 | 7/2014 | Momo et al. |
| 2014/0193712 A1 | 7/2014 | Yushin et al. |
| 2014/0196631 A1 | 7/2014 | McDaniel |
| 2014/0197797 A1 | 7/2014 | Yamazaki |
| 2014/0197801 A1 | 7/2014 | Nuzzo et al. |
| 2014/0197802 A1 | 7/2014 | Yamazaki |
| 2014/0197805 A1 | 7/2014 | Greening et al. |
| 2014/0199585 A1 | 7/2014 | Rupert et al. |
| 2014/0199599 A1 | 7/2014 | Yu et al. |
| 2014/0199600 A1 | 7/2014 | Yawata et al. |
| 2014/0199613 A1 | 7/2014 | Chappey et al. |
| 2014/0200294 A1 | 7/2014 | Furukawa et al. |
| 2014/0200626 A1 | 7/2014 | Campbell et al. |
| 2014/0205905 A1 | 7/2014 | Xiao et al. |
| 2014/0205908 A1 | 7/2014 | Wohrle et al. |
| 2014/0212716 A1 | 7/2014 | Farmer et al. |
| 2014/0212752 A1 | 7/2014 | Arakawa et al. |
| 2014/0212761 A1 | 7/2014 | Kitagawa et al. |
| 2014/0212763 A1 | 7/2014 | Tzeng et al. |
| 2014/0212770 A1 | 7/2014 | Abe et al. |
| 2014/0220417 A1 | 8/2014 | Cheng et al. |
| 2014/0220422 A1 | 8/2014 | Rogers et al. |
| 2014/0220450 A1 | 8/2014 | Jilek et al. |
| 2014/0225569 A1 | 8/2014 | Yamazaki et al. |
| 2014/0227432 A1 | 8/2014 | Liu et al. |
| 2014/0227548 A1 | 8/2014 | Myrick |
| 2014/0227584 A1 | 8/2014 | Holstein et al. |
| 2014/0230887 A1 | 8/2014 | Eguchi et al. |
| 2014/0234693 A1 | 8/2014 | Tsujikawa et al. |
| 2014/0234705 A1 | 8/2014 | Yayamoto et al. |
| 2014/0234711 A1 | 8/2014 | Rojeski |
| 2014/0234712 A1 | 8/2014 | Rojeski |
| 2014/0234713 A1 | 8/2014 | Rojeski |
| 2014/0234726 A1 | 8/2014 | Christensen et al. |
| 2014/0234727 A1 | 8/2014 | Abe et al. |
| 2014/0234732 A1 | 8/2014 | Park et al. |
| 2014/0239905 A1 | 8/2014 | Yamazaki |
| 2014/0242445 A1 | 8/2014 | Gozdz et al. |
| 2014/0242453 A1 | 8/2014 | Lee et al. |
| 2014/0242469 A1 | 8/2014 | Yamamoto et al. |
| 2014/0242474 A1 | 8/2014 | Matsui et al. |
| 2014/0245599 A1 | 9/2014 | Voelker et al. |
| 2014/0246905 A1 | 9/2014 | Yamazaki et al. |
| 2014/0248521 A1 | 9/2014 | Chiang et al. |
| 2014/0248526 A1 | 9/2014 | Wohrle et al. |
| 2014/0248537 A1 | 9/2014 | Hayashi et al. |
| 2014/0255792 A1 | 9/2014 | Cao et al. |
| 2014/0255802 A1 | 9/2014 | Barde et al. |
| 2014/0256534 A1 | 9/2014 | Gao et al. |
| 2014/0257272 A1 | 9/2014 | Clark et al. |
| 2014/0264198 A1 | 9/2014 | Tong et al. |
| 2014/0266055 A1 | 9/2014 | Trimble et al. |
| 2014/0266056 A1 | 9/2014 | Trimble et al. |
| 2014/0266075 A1 | 9/2014 | Gellett et al. |
| 2014/0272132 A1 | 9/2014 | Frianeza-Kullberg |
| 2014/0272489 A1 | 9/2014 | Anandan et al. |
| 2014/0272524 A1 | 9/2014 | Visco et al. |
| 2014/0272531 A1 | 9/2014 | Manning |
| 2014/0272553 A1 | 9/2014 | Cheng et al. |
| 2014/0272558 A1 | 9/2014 | Xiao et al. |
| 2014/0272567 A1 | 9/2014 | Zhang et al. |
| 2014/0272568 A1 | 9/2014 | Frianeza-Kullberg |
| 2014/0272574 A1 | 9/2014 | Son et al. |
| 2014/0272576 A1 | 9/2014 | Kamat et al. |
| 2014/0272577 A1 | 9/2014 | Hartner et al. |
| 2014/0272578 A1 | 9/2014 | Xiao et al. |
| 2014/0272579 A1 | 9/2014 | Frianeza-Kullberg |
| 2014/0272580 A1 | 9/2014 | Frianeza-Kullburg |
| 2014/0272583 A1 | 9/2014 | Hellring et al. |
| 2014/0272591 A1 | 9/2014 | Vanier et al. |
| 2014/0287301 A1 | 9/2014 | Yushin et al. |
| 2014/0287305 A1 | 9/2014 | Wachsman et al. |
| 2014/0287323 A1 | 9/2014 | Lu et al. |
| 2014/0287325 A1 | 9/2014 | Abe et al. |
| 2014/0287330 A1 | 9/2014 | Ohlsen |
| 2014/0293507 A1 | 10/2014 | Gadkaree et al. |
| 2014/0295268 A1 | 10/2014 | Wang et al. |
| 2014/0295270 A1 | 10/2014 | Adachi et al. |
| 2014/0295275 A1 | 10/2014 | Kay |
| 2014/0295290 A1 | 10/2014 | Park et al. |
| 2014/0302354 A1 | 10/2014 | Shao et al. |
| 2014/0302373 A1 | 10/2014 | Lockett et al. |
| 2014/0302400 A1 | 10/2014 | Shao et al. |
| 2014/0302401 A1 | 10/2014 | Burkhardt et al. |
| 2014/0302402 A1 | 10/2014 | Chen et al. |
| 2014/0302403 A1 | 10/2014 | Doe et al. |
| 2014/0306162 A1 | 10/2014 | Poe et al. |
| 2014/0308562 A1 | 10/2014 | Jeong et al. |
| 2014/0308583 A1 | 10/2014 | Manthiram et al. |
| 2014/0308585 A1 | 10/2014 | Han et al. |
| 2014/0308588 A1 | 10/2014 | Hirakawa et al. |
| 2014/0310951 A1 | 10/2014 | Grant et al. |
| 2014/0312269 A1 | 10/2014 | Laumann et al. |
| 2014/0314948 A1 | 10/2014 | Braun et al. |
| 2014/0315072 A1 | 10/2014 | Kobayashi et al. |
| 2014/0315091 A1 | 10/2014 | Yamazaki et al. |
| 2014/0315097 A1 | 10/2014 | Tan et al. |
| 2014/0315104 A1 | 10/2014 | Liu et al. |
| 2014/0315928 A1 | 10/2014 | Darout et al. |
| 2014/0319649 A1 | 10/2014 | Forster et al. |
| 2014/0322579 A1 | 10/2014 | Mitsuhashi et al. |
| 2014/0322602 A1 | 10/2014 | Yamazaki et al. |
| 2014/0322608 A1 | 10/2014 | Claussen et al. |
| 2014/0329120 A1 | 11/2014 | Cui et al. |
| 2014/0329131 A1 | 11/2014 | Jo et al. |
| 2014/0329150 A1 | 11/2014 | de Guzman et al. |
| 2014/0329724 A1 | 11/2014 | George et al. |
| 2014/0332715 A1 | 11/2014 | Kawakami et al. |
| 2014/0335406 A1 | 11/2014 | An |

(56) References Cited

U.S. PATENT DOCUMENTS

| | | |
|---|---|---|
| 2014/0335410 A1 | 11/2014 | Loveridge et al. |
| 2014/0335411 A1 | 11/2014 | Liu et al. |
| 2014/0342200 A1 | 11/2014 | Morita et al. |
| 2014/0342209 A1 | 11/2014 | He et al. |
| 2014/0342223 A1 | 11/2014 | Voelker et al. |
| 2014/0342228 A1 | 11/2014 | Liu et al. |
| 2014/0342240 A1 | 11/2014 | Harrup et al. |
| 2014/0342244 A1 | 11/2014 | West et al. |
| 2014/0342249 A1 | 11/2014 | He et al. |
| 2014/0346618 A1 | 11/2014 | Lahlouh et al. |
| 2014/0349182 A1 | 11/2014 | O'Neill et al. |
| 2014/0349186 A1 | 11/2014 | Burton et al. |
| 2014/0353042 A1 | 12/2014 | Karale et al. |
| 2014/0353146 A1 | 12/2014 | Gilliam et al. |
| 2014/0356703 A1 | 12/2014 | Dennes et al. |
| 2014/0356708 A1 | 12/2014 | Arikawa et al. |
| 2014/0356735 A1 | 12/2014 | Pena Hueso et al. |
| 2014/0363496 A1 | 12/2014 | Ghoroghchian |
| 2014/0363735 A1 | 12/2014 | Yoshida et al. |
| 2014/0363746 A1 | 12/2014 | He et al. |
| 2014/0370379 A1 | 12/2014 | Inoue et al. |
| 2014/0370380 A9 | 12/2014 | Cui et al. |
| 2014/0370387 A1 | 12/2014 | Anguchamy et al. |
| 2014/0370396 A1 | 12/2014 | Kang et al. |
| 2014/0376160 A1 | 12/2014 | Kako et al. |
| 2014/0377635 A1 | 12/2014 | Matsumoto et al. |
| 2014/0377648 A1 | 12/2014 | Gennett et al. |
| 2014/0377667 A1 | 12/2014 | Roschenthaler et al. |
| 2014/0377668 A1 | 12/2014 | Abe et al. |
| 2015/0002162 A1 | 1/2015 | Rich et al. |
| 2015/0004444 A1 | 1/2015 | Christensen et al. |
| 2015/0004480 A1 | 1/2015 | Gardner et al. |
| 2015/0004482 A1 | 1/2015 | Gardner et al. |
| 2015/0004488 A1 | 1/2015 | Abdelsalam et al. |
| 2015/0004495 A1 | 1/2015 | Cui et al. |
| 2015/0005206 A1 | 1/2015 | Zhou et al. |
| 2015/0010460 A1 | 1/2015 | Takeuchi et al. |
| 2015/0010784 A1 | 1/2015 | Takahata et al. |
| 2015/0014184 A1 | 1/2015 | Swonger |
| 2015/0014581 A1 | 1/2015 | Kawakami et al. |
| 2015/0014605 A1 | 1/2015 | Kawakami et al. |
| 2015/0017541 A1 | 1/2015 | Tajima et al. |
| 2015/0017543 A1 | 1/2015 | Lee et al. |
| 2015/0017544 A1 | 1/2015 | Prasad et al. |
| 2015/0017549 A1 | 1/2015 | Nishimura et al. |
| 2015/0017550 A1 | 1/2015 | Nishimura et al. |
| 2015/0022957 A1 | 1/2015 | Hiroki et al. |
| 2015/0024121 A1 | 1/2015 | He et al. |
| 2015/0024248 A1 | 1/2015 | He et al. |
| 2015/0024249 A1 | 1/2015 | Lim et al. |
| 2015/0024251 A1 | 1/2015 | Visco et al. |
| 2015/0024279 A1 | 1/2015 | Tan et al. |
| 2015/0030856 A1 | 1/2015 | Singh et al. |
| 2015/0030906 A1 | 1/2015 | Amin-Sanayei et al. |
| 2015/0030939 A1 | 1/2015 | Amereller et al. |
| 2015/0036204 A1 | 2/2015 | Branda et al. |
| 2015/0037675 A1 | 2/2015 | Izuhara et al. |
| 2015/0037686 A1 | 2/2015 | Pena Hueso et al. |
| 2015/0037689 A1 | 2/2015 | Nishimura et al. |
| 2015/0037690 A1 | 2/2015 | Dalavi et al. |
| 2015/0044517 A1 | 2/2015 | Mikhaylik et al. |
| 2015/0044533 A1 | 2/2015 | Tode et al. |
| 2015/0044556 A1 | 2/2015 | Wang et al. |
| 2015/0044564 A1 | 2/2015 | Wang et al. |
| 2015/0044565 A1 | 2/2015 | Wang et al. |
| 2015/0044571 A1 | 2/2015 | Abdelsalam et al. |
| 2015/0044573 A1 | 2/2015 | Roschenthaler et al. |
| 2015/0044581 A1 | 2/2015 | Holme et al. |
| 2015/0050535 A1 | 2/2015 | Amiruddin et al. |
| 2015/0050564 A1 | 2/2015 | Mizuno et al. |
| 2015/0050565 A1 | 2/2015 | Lamanna et al. |
| 2015/0053086 A1 | 2/2015 | Rebouillat et al. |
| 2015/0056488 A1 | 2/2015 | Zhang et al. |
| 2015/0056499 A1 | 2/2015 | Dai et al. |
| 2015/0056507 A1 | 2/2015 | Dadheech et al. |
| 2015/0056509 A1 | 2/2015 | Jeong et al. |
| 2015/0056514 A1 | 2/2015 | Dai et al. |
| 2015/0056516 A1 | 2/2015 | Hellring et al. |
| 2015/0056521 A1 | 2/2015 | Burns et al. |
| 2015/0062687 A1 | 3/2015 | Milliron et al. |
| 2015/0064514 A1 | 3/2015 | Wu et al. |
| 2015/0064538 A1 | 3/2015 | Bosnyak et al. |
| 2015/0064568 A1 | 3/2015 | Yushin et al. |
| 2015/0064574 A1 | 3/2015 | He et al. |
| 2015/0064575 A1 | 3/2015 | He et al. |
| 2015/0064578 A1 | 3/2015 | Kang et al. |
| 2015/0064580 A1 | 3/2015 | Bridges et al. |
| 2015/0066011 A1 | 3/2015 | Clark et al. |
| 2015/0069307 A1 | 3/2015 | Parans Paranthaman et al. |
| 2015/0070743 A1 | 3/2015 | Branda et al. |
| 2015/0071992 A1 | 3/2015 | Cipolla et al. |
| 2015/0072225 A1 | 3/2015 | Ishiji et al. |
| 2015/0072232 A1 | 3/2015 | Nagai |
| 2015/0072234 A1 | 3/2015 | Mitchell et al. |
| 2015/0072247 A1 | 3/2015 | Cho et al. |
| 2015/0073632 A1 | 3/2015 | Hill |
| 2015/0079477 A1 | 3/2015 | Spahr et al. |
| 2015/0079483 A1 | 3/2015 | Cresce et al. |
| 2015/0079484 A1 | 3/2015 | Cresce et al. |
| 2015/0086604 A1 | 3/2015 | Buevich et al. |
| 2015/0086856 A1 | 3/2015 | Tomita et al. |
| 2015/0086859 A1 | 3/2015 | Chang et al. |
| 2015/0086865 A1 | 3/2015 | Oda |
| 2015/0086868 A1 | 3/2015 | Inoue et al. |
| 2015/0086876 A1 | 3/2015 | Taeda et al. |
| 2015/0086877 A1 | 3/2015 | Yamazaki et al. |
| 2015/0089797 A1 | 4/2015 | Binder et al. |
| 2015/0093459 A1 | 4/2015 | Mora-Gutierrez et al. |
| 2015/0093631 A1 | 4/2015 | Kawasaki et al. |
| 2015/0093647 A1 | 4/2015 | Kako et al. |
| 2015/0093653 A1 | 4/2015 | Coowar et al. |
| 2015/0093654 A1 | 4/2015 | Galiano et al. |
| 2015/0093655 A1 | 4/2015 | Kozelj et al. |
| 2015/0093659 A1 | 4/2015 | Gonzalez et al. |
| 2015/0099165 A1 | 4/2015 | Dippel et al. |
| 2015/0099171 A1 | 4/2015 | Alarco et al. |
| 2015/0099178 A1 | 4/2015 | Kawakami et al. |
| 2015/0099179 A1 | 4/2015 | Ikenuma et al. |
| 2015/0099184 A1 | 4/2015 | Rojeski et al. |
| 2015/0099185 A1 | 4/2015 | Joo et al. |
| 2015/0099187 A1 | 4/2015 | Cui et al. |
| 2015/0099188 A1 | 4/2015 | Holme et al. |
| 2015/0099190 A1 | 4/2015 | Holme et al. |
| 2015/0099191 A1 | 4/2015 | Liu et al. |
| 2015/0099192 A1 | 4/2015 | Yawata et al. |
| 2015/0102257 A1 | 4/2015 | Mullins et al. |
| 2015/0104701 A1 | 4/2015 | Azami |
| 2015/0104712 A1 | 4/2015 | Kerlau et al. |
| 2015/0104716 A1 | 4/2015 | Kang et al. |
| 2015/0109651 A1 | 4/2015 | Branda et al. |
| 2015/0110971 A1 | 4/2015 | Oladeji |
| 2015/0111078 A1 | 4/2015 | Hosoya et al. |
| 2015/0111086 A1 | 4/2015 | Arnold et al. |
| 2015/0111088 A1 | 4/2015 | Hiroki et al. |
| 2015/0111099 A1 | 4/2015 | Zhang |
| 2015/0111101 A1 | 4/2015 | Ikenuma et al. |
| 2015/0111107 A1 | 4/2015 | Oguni et al. |
| 2015/0118558 A1 | 4/2015 | Yamazaki et al. |
| 2015/0118565 A1 | 4/2015 | Bell et al. |
| 2015/0118572 A1 | 4/2015 | Lund et al. |
| 2015/0118588 A1 | 4/2015 | McLean et al. |
| 2015/0125595 A1 | 5/2015 | Lahlouh et al. |
| 2015/0125646 A1 | 5/2015 | Tournilhac et al. |
| 2015/0125752 A1 | 5/2015 | Nishimura et al. |
| 2015/0125759 A1 | 5/2015 | Xu et al. |
| 2015/0125761 A1 | 5/2015 | Shimamoto et al. |
| 2015/0131047 A1 | 5/2015 | Saylor et al. |
| 2015/0132648 A1 | 5/2015 | Inoue et al. |
| 2015/0132649 A1 | 5/2015 | Ogino et al. |
| 2015/0133622 A1 | 5/2015 | Harumashi et al. |
| 2015/0137030 A1 | 5/2015 | Matsuo et al. |
| 2015/0140206 A1 | 5/2015 | O'Neill et al. |
| 2015/0140397 A1 | 5/2015 | Tajima et al. |
| 2015/0140398 A1 | 5/2015 | Yamazaki |

(56) References Cited

U.S. PATENT DOCUMENTS

| | | |
|---|---|---|
| 2015/0140427 A1 | 5/2015 | Zhang et al. |
| 2015/0140434 A1 | 5/2015 | Jung |
| 2015/0140446 A1 | 5/2015 | Li |
| 2015/0140449 A1 | 5/2015 | Ishikawa et al. |
| 2015/0141557 A1 | 5/2015 | Chen et al. |
| 2015/0143806 A1 | 5/2015 | Friesth |
| 2015/0147602 A1 | 5/2015 | Bianchi et al. |
| 2015/0147624 A1 | 5/2015 | Yamafuku et al. |
| 2015/0147642 A1 | 5/2015 | Ling et al. |
| 2015/0147645 A1 | 5/2015 | Lee et al. |
| 2015/0147662 A1 | 5/2015 | Park et al. |
| 2015/0152566 A1 | 6/2015 | Zhang et al. |
| 2015/0155546 A1 | 6/2015 | Yushin et al. |
| 2015/0155556 A1 | 6/2015 | Kawakami et al. |
| 2015/0155557 A1 | 6/2015 | Kwon et al. |
| 2015/0155559 A1 | 6/2015 | Zimmerman et al. |
| 2015/0155598 A1 | 6/2015 | Yazami |
| 2015/0158285 A1 | 6/2015 | Barinov et al. |
| 2015/0162131 A1 | 6/2015 | Felten et al. |
| 2015/0162139 A1 | 6/2015 | Lin et al. |
| 2015/0162588 A1 | 6/2015 | Lee et al. |
| 2015/0162602 A1 | 6/2015 | Dadheech et al. |
| 2015/0162603 A1 | 6/2015 | Yushin et al. |
| 2015/0162772 A1 | 6/2015 | Peterson et al. |
| 2015/0171414 A1 | 6/2015 | Takahata et al. |
| 2015/0171426 A1 | 6/2015 | Wang et al. |
| 2015/0171467 A1 | 6/2015 | Dubois et al. |
| 2015/0179976 A1 | 6/2015 | Galand et al. |
| 2015/0180001 A1 | 6/2015 | Johnson et al. |
| 2015/0180023 A1 | 6/2015 | Xiao et al. |
| 2015/0180087 A1 | 6/2015 | Kim et al. |
| 2015/0180249 A1 | 6/2015 | Jeon et al. |
| 2015/0188125 A1 | 7/2015 | Korgel et al. |
| 2015/0188143 A1 | 7/2015 | Shiozaki et al. |
| 2015/0188187 A1 | 7/2015 | Strand et al. |
| 2015/0188189 A1 | 7/2015 | Armand et al. |
| 2015/0188191 A1 | 7/2015 | Kalinovich et al. |
| 2015/0191423 A1 | 7/2015 | Bomkamp et al. |
| 2015/0191581 A1 | 7/2015 | Schoening et al. |
| 2015/0191607 A1 | 7/2015 | McDaniel |
| 2015/0191841 A1 | 7/2015 | Grant et al. |
| 2015/0194702 A1 | 7/2015 | Tokunaga et al. |
| 2015/0200390 A1 | 7/2015 | Lu et al. |
| 2015/0200420 A1 | 7/2015 | Holme et al. |
| 2015/0200422 A1 | 7/2015 | Lee et al. |
| 2015/0202201 A1 | 7/2015 | Cipolla et al. |
| 2015/0202351 A1 | 7/2015 | Kaplan et al. |
| 2015/0202456 A1 | 7/2015 | Andersen et al. |
| 2015/0203516 A1 | 7/2015 | Zhang et al. |
| 2015/0207147 A1 | 7/2015 | Nagai et al. |
| 2015/0207174 A1 | 7/2015 | Lee et al. |
| 2015/0207176 A1 | 7/2015 | Moganty et al. |
| 2015/0207184 A1 | 7/2015 | Kunze et al. |
| 2015/0210044 A1 | 7/2015 | Barsoum et al. |
| 2015/0214529 A1 | 7/2015 | Yawata et al. |
| 2015/0214573 A1 | 7/2015 | Sastry et al. |
| 2015/0214577 A1 | 7/2015 | O'Neill et al. |
| 2015/0216820 A1 | 8/2015 | Miller et al. |
| 2015/0217016 A1 | 8/2015 | McKay et al. |
| 2015/0221936 A1 | 8/2015 | Huang |
| 2015/0221983 A1 | 8/2015 | Kamiya et al. |
| 2015/0221987 A1 | 8/2015 | Yawata et al. |
| 2015/0228980 A1 | 8/2015 | Huang |
| 2015/0236343 A1 | 8/2015 | Xiao et al. |
| 2015/0236372 A1 | 8/2015 | Yushin et al. |
| 2015/0236378 A1 | 8/2015 | Kuwajima et al. |
| 2015/0236379 A1 | 8/2015 | Wietelmann et al. |
| 2015/0236380 A1 | 8/2015 | Garsuch et al. |
| 2015/0238262 A1 | 8/2015 | Buevich et al. |
| 2015/0243936 A1 | 8/2015 | Miyagi et al. |
| 2015/0243962 A1 | 8/2015 | Hiroki et al. |
| 2015/0243972 A1 | 8/2015 | Ito et al. |
| 2015/0243973 A1 | 8/2015 | Newbound et al. |
| 2015/0243987 A1 | 8/2015 | Lu et al. |
| 2015/0243988 A1 | 8/2015 | Lu et al. |
| 2015/0244041 A1 | 8/2015 | Sastry et al. |
| 2015/0246242 A1 | 9/2015 | Delp et al. |
| 2015/0248149 A1 | 9/2015 | Yamazaki et al. |
| 2015/0249247 A1 | 9/2015 | Zhou et al. |
| 2015/0249262 A1 | 9/2015 | Wachsman et al. |
| 2015/0255771 A1 | 9/2015 | Yu |
| 2015/0261254 A1 | 9/2015 | Hiroki et al. |
| 2015/0262761 A1 | 9/2015 | Gadkaree et al. |
| 2015/0263342 A1 | 9/2015 | Newbound et al. |
| 2015/0263379 A1 | 9/2015 | Xiao et al. |
| 2015/0263543 A1 | 9/2015 | Gellett et al. |
| 2015/0270552 A1 | 9/2015 | Lee et al. |
| 2015/0270573 A1 | 9/2015 | Pena Hueso et al. |
| 2015/0273118 A9 | 10/2015 | Buevich et al. |
| 2015/0280218 A1 | 10/2015 | Zimmerman et al. |
| 2015/0280219 A1 | 10/2015 | Xiao et al. |
| 2015/0280229 A1 | 10/2015 | Chen et al. |
| 2015/0280239 A1 | 10/2015 | Hellring et al. |
| 2015/0280267 A1 | 10/2015 | Chiang et al. |
| 2015/0280281 A1 | 10/2015 | Farmer |
| 2015/0283397 A1 | 10/2015 | Andersen et al. |
| 2015/0283398 A1 | 10/2015 | Andersen et al. |
| 2015/0288028 A1 | 10/2015 | DeSimone et al. |
| 2015/0288031 A1 | 10/2015 | Zhang et al. |
| 2015/0288034 A1 | 10/2015 | Kim et al. |
| 2015/0295224 A1 | 10/2015 | Onodera et al. |
| 2015/0295241 A1 | 10/2015 | Liang et al. |
| 2015/0295275 A1 | 10/2015 | Han et al. |
| 2015/0295276 A1 | 10/2015 | Ishiji |
| 2015/0297217 A1 | 10/2015 | Huitema et al. |
| 2015/0297222 A1 | 10/2015 | Huitema et al. |
| 2015/0297223 A1 | 10/2015 | Huitema et al. |
| 2015/0297225 A1 | 10/2015 | Huitema et al. |
| 2015/0297227 A1 | 10/2015 | Huitema et al. |
| 2015/0297228 A1 | 10/2015 | Huitema et al. |
| 2015/0297229 A1 | 10/2015 | Schellin et al. |
| 2015/0297230 A1 | 10/2015 | Schellin et al. |
| 2015/0297231 A1 | 10/2015 | Huitema et al. |
| 2015/0297232 A1 | 10/2015 | Huitema et al. |
| 2015/0297233 A1 | 10/2015 | Huitema et al. |
| 2015/0297234 A1 | 10/2015 | Schellin et al. |
| 2015/0297235 A1 | 10/2015 | Harris et al. |
| 2015/0299852 A1 | 10/2015 | Ozkan et al. |
| 2015/0303463 A1 | 10/2015 | Sasaki |
| 2015/0303481 A1 | 10/2015 | Duong et al. |
| 2015/0303511 A1 | 10/2015 | Zhang et al. |
| 2015/0303515 A1 | 10/2015 | Pratt et al. |
| 2015/0303516 A1 | 10/2015 | Pratt |
| 2015/0311503 A1 | 10/2015 | Ingale et al. |
| 2015/0311509 A1 | 10/2015 | Ando et al. |
| 2015/0311525 A1 | 10/2015 | Masarapu et al. |
| 2015/0311534 A1 | 10/2015 | Shiozaki et al. |
| 2015/0311564 A1 | 10/2015 | Ishiji |
| 2015/0315382 A1 | 11/2015 | Schrauwen |
| 2015/0318530 A1 | 11/2015 | Yushin et al. |
| 2015/0318543 A1 | 11/2015 | Lee et al. |
| 2015/0318555 A1 | 11/2015 | Oku et al. |
| 2015/0318570 A1 | 11/2015 | Choi et al. |
| 2015/0318572 A1 | 11/2015 | Kuwajima et al. |
| 2015/0318574 A1 | 11/2015 | Krumdick et al. |
| 2015/0318578 A1 | 11/2015 | Abe et al. |
| 2015/0318580 A1 | 11/2015 | Fukunaga et al. |
| 2015/0321920 A1 | 11/2015 | Geramita et al. |
| 2015/0322262 A1 | 11/2015 | Sato et al. |
| 2015/0325831 A1 | 11/2015 | Dennes et al. |
| 2015/0325843 A1 | 11/2015 | Yoon et al. |
| 2015/0325852 A1 | 11/2015 | Wang et al. |
| 2015/0325855 A1 | 11/2015 | Kawakami et al. |
| 2015/0325856 A1 | 11/2015 | Federici et al. |
| 2015/0325880 A1 | 11/2015 | Kim et al. |
| 2015/0325882 A1 | 11/2015 | Yushin et al. |
| 2015/0325884 A1 | 11/2015 | Fukunaga et al. |
| 2015/0333310 A1 | 11/2015 | Choi et al. |
| 2015/0333315 A1 | 11/2015 | Yoon et al. |
| 2015/0333332 A1 | 11/2015 | Wietelmann et al. |
| 2015/0333359 A1 | 11/2015 | Takahashi et al. |
| 2015/0333360 A1 | 11/2015 | Tajima et al. |
| 2015/0333367 A1 | 11/2015 | Kato et al. |
| 2015/0333368 A1 | 11/2015 | Kato et al. |

(56) References Cited

U.S. PATENT DOCUMENTS

| | | |
|---|---|---|
| 2015/0333370 A1 | 11/2015 | Abe et al. |
| 2015/0333371 A1 | 11/2015 | Chen et al. |
| 2015/0333374 A1 | 11/2015 | Moganty et al. |
| 2015/0337443 A1 | 11/2015 | Albrecht et al. |
| 2015/0340172 A1 | 11/2015 | Kang et al. |
| 2015/0340664 A1 | 11/2015 | Takahashi et al. |
| 2015/0340679 A1 | 11/2015 | Shimura et al. |
| 2015/0340738 A1 | 11/2015 | Moganty et al. |
| 2015/0340739 A1 | 11/2015 | Klaehn et al. |
| 2015/0344512 A1 | 12/2015 | Prakash et al. |
| 2015/0349338 A1 | 12/2015 | Zhao et al. |
| 2015/0349345 A1 | 12/2015 | Ikenuma |
| 2015/0349375 A1 | 12/2015 | Takahashi et al. |
| 2015/0349376 A1 | 12/2015 | Shin et al. |
| 2015/0357125 A1 | 12/2015 | Lockett et al. |
| 2015/0357126 A1 | 12/2015 | Lockett et al. |
| 2015/0357646 A1 | 12/2015 | Lu et al. |
| 2015/0357673 A1 | 12/2015 | Kanno et al. |
| 2015/0357677 A1 | 12/2015 | Lockett et al. |
| 2015/0360049 A1 | 12/2015 | Kaplitt et al. |
| 2015/0360050 A1 | 12/2015 | Kaplitt et al. |
| 2015/0361564 A1 | 12/2015 | Albrecht et al. |
| 2015/0364734 A1 | 12/2015 | Kunoike et al. |
| 2015/0364735 A1 | 12/2015 | Kohira et al. |
| 2015/0364739 A1 | 12/2015 | Stacy et al. |
| 2015/0364747 A1 | 12/2015 | Elam et al. |
| 2015/0364748 A1 | 12/2015 | Amiruddin et al. |
| 2015/0364755 A1 | 12/2015 | Liu et al. |
| 2015/0364760 A1 | 12/2015 | Park et al. |
| 2015/0364773 A1 | 12/2015 | Tamirisa et al. |
| 2015/0364791 A1 | 12/2015 | Vu et al. |
| 2015/0364794 A1 | 12/2015 | Nakazawa et al. |
| 2015/0364795 A1 | 12/2015 | Stefan et al. |
| 2015/0364796 A1 | 12/2015 | Li et al. |
| 2015/0372296 A1 | 12/2015 | Jones et al. |
| 2015/0372305 A1 | 12/2015 | Matsuo et al. |
| 2015/0372345 A1 | 12/2015 | Kato et al. |
| 2015/0372346 A1 | 12/2015 | Sastry et al. |
| 2015/0372349 A1 | 12/2015 | Shikita |
| 2015/0373831 A1 | 12/2015 | Rogers et al. |
| 2015/0377977 A1 | 12/2015 | Yazami et al. |
| 2015/0380355 A1 | 12/2015 | Rogers et al. |
| 2015/0380727 A1 | 12/2015 | Hao et al. |
| 2015/0380728 A1 | 12/2015 | Son et al. |
| 2015/0380731 A1 | 12/2015 | Tong et al. |
| 2015/0380771 A1 | 12/2015 | Srour et al. |
| 2015/0380772 A1 | 12/2015 | Tokuda et al. |
| 2015/0380777 A1 | 12/2015 | Takahashi et al. |
| 2016/0006017 A1 | 1/2016 | Momma et al. |
| 2016/0006077 A1 | 1/2016 | Okumura et al. |
| 2016/0009902 A1 | 1/2016 | Sato et al. |
| 2016/0012979 A1 | 1/2016 | Zheng |
| 2016/0013465 A1 | 1/2016 | Akiike |
| 2016/0013469 A1 | 1/2016 | Tajima et al. |
| 2016/0013483 A1 | 1/2016 | Loveness et al. |
| 2016/0013512 A1 | 1/2016 | Bae et al. |
| 2016/0013518 A1 | 1/2016 | Kim et al. |
| 2016/0020458 A1 | 1/2016 | Choi et al. |
| 2016/0020485 A1 | 1/2016 | Liao et al. |
| 2016/0020486 A1 | 1/2016 | Lee et al. |
| 2016/0020488 A1 | 1/2016 | Cho et al. |
| 2016/0020489 A1 | 1/2016 | Rhodes et al. |
| 2016/0021932 A1 | 1/2016 | Silvestrini et al. |
| 2016/0024250 A1 | 1/2016 | Yang et al. |
| 2016/0027592 A1 | 1/2016 | Shimamoto et al. |
| 2016/0028063 A1 | 1/2016 | Visco et al. |
| 2016/0028075 A1 | 1/2016 | Yu |
| 2016/0028079 A1 | 1/2016 | Allen et al. |
| 2016/0028086 A1 | 1/2016 | Vail et al. |
| 2016/0028087 A1 | 1/2016 | Sonobe |
| 2016/0028106 A1 | 1/2016 | Kato |
| 2016/0028111 A1 | 1/2016 | Ahn et al. |
| 2016/0028114 A1 | 1/2016 | Pratt et al. |
| 2016/0028116 A1 | 1/2016 | Ahn et al. |
| 2016/0028121 A1 | 1/2016 | Stauffer |
| 2016/0028133 A1 | 1/2016 | Miles |
| 2016/0030765 A1 | 2/2016 | Towne et al. |
| 2016/0031924 A9 | 2/2016 | Prakash et al. |
| 2016/0036052 A1 | 2/2016 | Tabuchi et al. |
| 2016/0036055 A1 | 2/2016 | Yamamoto |
| 2016/0036059 A1 | 2/2016 | Tokune et al. |
| 2016/0038612 A1 | 2/2016 | Hoge et al. |
| 2016/0038755 A1 | 2/2016 | Lundmark et al. |
| 2016/0038756 A1 | 2/2016 | Andersen et al. |
| 2016/0038757 A1 | 2/2016 | Stahler et al. |
| 2016/0038758 A1 | 2/2016 | Stahler et al. |
| 2016/0038759 A1 | 2/2016 | Andersen et al. |
| 2016/0038765 A1 | 2/2016 | Delp et al. |
| 2016/0039970 A1 | 2/2016 | Kron et al. |
| 2016/0040304 A1 | 2/2016 | Albrecht et al. |
| 2016/0043070 A1 | 2/2016 | Momo et al. |
| 2016/0043359 A1 | 2/2016 | Miyake |
| 2016/0043363 A1 | 2/2016 | Tajima et al. |
| 2016/0043384 A1 | 2/2016 | Zhamu et al. |
| 2016/0043385 A1 | 2/2016 | Ryan et al. |
| 2016/0043387 A1 | 2/2016 | Kalaiselvi et al. |
| 2016/0043391 A1 | 2/2016 | Nagatomi |
| 2016/0043404 A1 | 2/2016 | Freydina |
| 2016/0043409 A1 | 2/2016 | Park et al. |
| 2016/0043430 A1 | 2/2016 | Lee et al. |
| 2016/0043431 A1 | 2/2016 | Angell et al. |
| 2016/0043432 A1 | 2/2016 | Kang et al. |
| 2016/0043435 A1 | 2/2016 | DeSimone |
| 2016/0045764 A1 | 2/2016 | Delp et al. |
| 2016/0045765 A1 | 2/2016 | Lundmark et al. |
| 2016/0045841 A1 | 2/2016 | Kaplan et al. |
| 2016/0047060 A1 | 2/2016 | Miwa et al. |
| 2016/0048037 A1 | 2/2016 | McCabe et al. |
| 2016/0049662 A1 | 2/2016 | Kim et al. |
| 2016/0049690 A1 | 2/2016 | Basak et al. |
| 2016/0049692 A1 | 2/2016 | Hasegawa et al. |
| 2016/0049699 A1 | 2/2016 | Hayashi et al. |
| 2016/0051828 A1 | 2/2016 | Stahler et al. |
| 2016/0051830 A1 | 2/2016 | Andersen et al. |
| 2016/0051831 A1 | 2/2016 | Lundmark et al. |
| 2016/0051836 A1 | 2/2016 | Lundmark et al. |
| 2016/0051837 A1 | 2/2016 | Delp et al. |
| 2016/0051838 A1 | 2/2016 | Stahler et al. |
| 2016/0056436 A1 | 2/2016 | Haruna et al. |
| 2016/0056463 A1 | 2/2016 | Tsuji et al. |
| 2016/0056500 A1 | 2/2016 | Holme et al. |
| 2016/0056503 A1 | 2/2016 | Shatunov et al. |
| 2016/0056506 A1 | 2/2016 | Gering et al. |
| 2016/0058768 A1 | 3/2016 | Darout et al. |
| 2016/0059030 A1 | 3/2016 | Huang et al. |
| 2016/0060125 A1 | 3/2016 | Chung et al. |
| 2016/0060454 A1 | 3/2016 | Arhancet et al. |
| 2016/0060774 A1 | 3/2016 | Gilliam et al. |
| 2016/0064154 A1 | 3/2016 | Saito et al. |
| 2016/0064712 A1 | 3/2016 | Hoerpel et al. |
| 2016/0064725 A1 | 3/2016 | Fasching et al. |
| 2016/0064726 A1 | 3/2016 | Ikenuma et al. |
| 2016/0064771 A1 | 3/2016 | Osaki et al. |
| 2016/0070119 A1 | 3/2016 | McCabe et al. |
| 2016/0070150 A1 | 3/2016 | Lam et al. |
| 2016/0071552 A1 | 3/2016 | Ohwada et al. |
| 2016/0071658 A1 | 3/2016 | Azais et al. |
| 2016/0072150 A1 | 3/2016 | Kim et al. |
| 2016/0072152 A1 | 3/2016 | Tsubouchi et al. |
| 2016/0073519 A1 | 3/2016 | Hiroki |
| 2016/0079601 A1 | 3/2016 | Yoshitake et al. |
| 2016/0079627 A1 | 3/2016 | Kim et al. |
| 2016/0079628 A1 | 3/2016 | Kim et al. |
| 2016/0079634 A1 | 3/2016 | Onodera et al. |
| 2016/0082279 A1 | 3/2016 | Andersen et al. |
| 2016/0085131 A1 | 3/2016 | Lam et al. |
| 2016/0087263 A1 | 3/2016 | Gadkaree et al. |
| 2016/0087272 A1 | 3/2016 | Blomgren et al. |
| 2016/0087295 A1 | 3/2016 | Phillips et al. |
| 2016/0087305 A1 | 3/2016 | Yoneda et al. |
| 2016/0087306 A1 | 3/2016 | Lee et al. |
| 2016/0087307 A1 | 3/2016 | Burkhardt et al. |
| 2016/0087309 A1 | 3/2016 | Kim et al. |
| 2016/0087315 A1 | 3/2016 | Oyama |

(56) References Cited

U.S. PATENT DOCUMENTS

| | | |
|---|---|---|
| 2016/0093874 A1 | 3/2016 | Stimson et al. |
| 2016/0093895 A1 | 3/2016 | Du et al. |
| 2016/0093916 A1 | 3/2016 | Moon et al. |
| 2016/0093917 A1 | 3/2016 | Veith et al. |
| 2016/0093918 A1 | 3/2016 | Cheng et al. |
| 2016/0093923 A1 | 3/2016 | Wang et al. |
| 2016/0094079 A1 | 3/2016 | Hiroki et al. |
| 2016/0096034 A1 | 4/2016 | Lundmark et al. |
| 2016/0096035 A1 | 4/2016 | Lundmark et al. |
| 2016/0102287 A1 | 4/2016 | Dalla-Betta et al. |
| 2016/0104882 A1 | 4/2016 | Yushin et al. |
| 2016/0104892 A1 | 4/2016 | Yukawa |
| 2016/0108529 A1 | 4/2016 | Albrecht et al. |
| 2016/0109852 A1 | 4/2016 | Kuwabara et al. |
| 2016/0111700 A1 | 4/2016 | Ikenuma et al. |
| 2016/0111710 A1 | 4/2016 | Momo et al. |
| 2016/0111723 A1 | 4/2016 | Li et al. |
| 2016/0111729 A1 | 4/2016 | Kim et al. |
| 2016/0116941 A1 | 4/2016 | Kuwabara et al. |
| 2016/0118637 A1 | 4/2016 | Narita et al. |
| 2016/0118640 A1 | 4/2016 | Miyake |
| 2016/0118644 A1 | 4/2016 | Kuriki et al. |
| 2016/0118646 A1 | 4/2016 | Ikenuma |
| 2016/0118658 A1 | 4/2016 | Kawakami et al. |
| 2016/0118664 A1 | 4/2016 | Sonobe |
| 2016/0118666 A1 | 4/2016 | Ikenuma et al. |
| 2016/0118671 A1 | 4/2016 | Wieland |
| 2016/0118685 A1 | 4/2016 | Zhang et al. |
| 2016/0118686 A1 | 4/2016 | Kim et al. |
| 2016/0118689 A1 | 4/2016 | Oguni et al. |
| 2016/0120017 A1 | 4/2016 | Momoi et al. |
| 2016/0120944 A1 | 5/2016 | Baylink et al. |
| 2016/0126519 A1 | 5/2016 | Kim et al. |
| 2016/0126535 A1 | 5/2016 | Qiao et al. |
| 2016/0126581 A1 | 5/2016 | Timofeeva et al. |
| 2016/0126589 A1 | 5/2016 | Xiao et al. |
| 2016/0126590 A1 | 5/2016 | Roberts et al. |
| 2016/0126591 A1 | 5/2016 | Zhang et al. |
| 2016/0126593 A1 | 5/2016 | Abe |
| 2016/0126594 A1 | 5/2016 | Kodama et al. |
| 2016/0126595 A1 | 5/2016 | Fukunaga et al. |
| 2016/0133992 A1 | 5/2016 | Voitl et al. |
| 2016/0133995 A1 | 5/2016 | Hattori et al. |
| 2016/0141598 A1 | 5/2016 | Dai et al. |
| 2016/0141718 A1 | 5/2016 | Ye et al. |
| 2016/0141719 A1 | 5/2016 | Itakura et al. |
| 2016/0141720 A1 | 5/2016 | Onozaki et al. |
| 2016/0145190 A1 | 5/2016 | Bomkamp et al. |
| 2016/0149258 A1 | 5/2016 | Kanno et al. |
| 2016/0149262 A1 | 5/2016 | Singh et al. |
| 2016/0149264 A1 | 5/2016 | Galiano et al. |
| 2016/0149265 A1 | 5/2016 | Onozaki et al. |
| 2016/0151118 A1 | 6/2016 | Grunwald et al. |
| 2016/0156067 A1 | 6/2016 | Suzuki et al. |
| 2016/0156071 A1 | 6/2016 | Yamakaji et al. |
| 2016/0157372 A1 | 6/2016 | Hiroki |
| 2016/0164060 A1 | 6/2016 | Zhang et al. |
| 2016/0164089 A1 | 6/2016 | Kawakami et al. |
| 2016/0164137 A1 | 6/2016 | Moganty et al. |
| 2016/0164141 A1 | 6/2016 | Chesneau et al. |
| 2016/0164142 A1 | 6/2016 | Garsuch et al. |
| 2016/0164143 A1 | 6/2016 | Sawa et al. |
| 2016/0164144 A1 | 6/2016 | Voitl et al. |
| 2016/0164145 A1 | 6/2016 | Carlson |
| 2016/0168726 A1 | 6/2016 | Dryfe et al. |
| 2016/0172708 A1 | 6/2016 | Porta Garcia et al. |
| 2016/0172709 A1 | 6/2016 | Porta Garcia et al. |
| 2016/0181576 A1 | 6/2016 | Zouta et al. |
| 2016/0181656 A1 | 6/2016 | Sung et al. |
| 2016/0181657 A1 | 6/2016 | Kawaji et al. |
| 2016/0181658 A1 | 6/2016 | Kim et al. |
| 2016/0181665 A1 | 6/2016 | Weiss et al. |
| 2016/0185600 A1 | 6/2016 | Sotowa et al. |
| 2016/0185899 A1 | 6/2016 | Arhancet et al. |
| 2016/0190545 A1 | 6/2016 | Momo et al. |
| 2016/0190576 A1 | 6/2016 | Miyake et al. |
| 2016/0190578 A1 | 6/2016 | Momo et al. |
| 2016/0190592 A1 | 6/2016 | Ochiai et al. |
| 2016/0190600 A1 | 6/2016 | Cui et al. |
| 2016/0193555 A1 | 7/2016 | Park |
| 2016/0197351 A1 | 7/2016 | Tani et al. |
| 2016/0197375 A1 | 7/2016 | Carlson et al. |
| 2016/0197377 A1 | 7/2016 | Braun |
| 2016/0197378 A1 | 7/2016 | Smart et al. |
| 2016/0198750 A1 | 7/2016 | Carlson et al. |
| 2016/0200748 A1 | 7/2016 | Galiano et al. |
| 2016/0204466 A1 | 7/2016 | Nogami et al. |
| 2016/0206731 A1 | 7/2016 | Francois |
| 2016/0211545 A1 | 7/2016 | Wiers et al. |
| 2016/0212836 A1 | 7/2016 | Arai et al. |
| 2016/0218327 A1 | 7/2016 | Takahashi et al. |
| 2016/0218356 A1 | 7/2016 | Paulsen et al. |
| 2016/0218391 A1 | 7/2016 | Voitl et al. |
| 2016/0221926 A1 | 8/2016 | Teran et al. |
| 2016/0226042 A1 | 8/2016 | Hartmann et al. |
| 2016/0226063 A1 | 8/2016 | Nishimura et al. |
| 2016/0226065 A1 | 8/2016 | Karabacak et al. |
| 2016/0226066 A1 | 8/2016 | Yamamoto et al. |
| 2016/0226067 A1 | 8/2016 | Harada et al. |
| 2016/0226068 A1 | 8/2016 | Xia et al. |
| 2016/0226069 A1 | 8/2016 | Yamada et al. |
| 2016/0226070 A1 | 8/2016 | Lopatin et al. |
| 2016/0226071 A1 | 8/2016 | Ziegler et al. |
| 2016/0226094 A1 | 8/2016 | Yamazaki |
| 2016/0226098 A1 | 8/2016 | Yoshida et al. |
| 2016/0226099 A1 | 8/2016 | Azami et al. |
| 2016/0226100 A1 | 8/2016 | Yamada et al. |
| 2016/0226101 A1 | 8/2016 | Teran et al. |
| 2016/0226102 A1 | 8/2016 | Teran et al. |
| 2016/0226103 A1 | 8/2016 | Teran et al. |
| 2016/0226104 A1 | 8/2016 | Teran et al. |
| 2016/0226106 A1 | 8/2016 | Minami et al. |
| 2016/0226109 A1 | 8/2016 | Angerbauer et al. |
| 2016/0226114 A1 | 8/2016 | Hartmann et al. |
| 2016/0226281 A1 | 8/2016 | Gadkaree et al. |
| 2016/0227839 A1 | 8/2016 | Zuber et al. |
| 2016/0228357 A1 | 8/2016 | Lichter et al. |
| 2016/0228863 A1 | 8/2016 | Miyake et al. |
| 2016/0230291 A1 | 8/2016 | Albrecht et al. |
| 2016/0233031 A1 | 8/2016 | Momo et al. |
| 2016/0233437 A1 | 8/2016 | Suzuki et al. |
| 2016/0233461 A1 | 8/2016 | Young et al. |
| 2016/0233465 A1 | 8/2016 | Lee et al. |
| 2016/0233469 A1 | 8/2016 | Kimura |
| 2016/0233473 A1 | 8/2016 | Kamo et al. |
| 2016/0233474 A1 | 8/2016 | Kagami et al. |
| 2016/0233475 A1 | 8/2016 | Son et al. |
| 2016/0233484 A1 | 8/2016 | Hirose et al. |
| 2016/0233486 A1 | 8/2016 | Lahiri et al. |
| 2016/0233487 A1 | 8/2016 | Jun et al. |
| 2016/0233488 A1 | 8/2016 | Krkljus et al. |
| 2016/0233489 A1 | 8/2016 | Uhm et al. |
| 2016/0233490 A1 | 8/2016 | Put et al. |
| 2016/0233491 A1 | 8/2016 | Manthiram et al. |
| 2016/0233501 A1 | 8/2016 | Lee et al. |
| 2016/0233502 A1 | 8/2016 | Brant et al. |
| 2016/0233503 A1 | 8/2016 | Kobayashi et al. |
| 2016/0233504 A1 | 8/2016 | Itaya |
| 2016/0233508 A1 | 8/2016 | Allen et al. |
| 2016/0233509 A1 | 8/2016 | Haeupler et al. |
| 2016/0233510 A1 | 8/2016 | Onodera et al. |
| 2016/0233511 A1 | 8/2016 | Kim et al. |
| 2016/0233512 A1 | 8/2016 | Park et al. |
| 2016/0233513 A1 | 8/2016 | Abe et al. |
| 2016/0233536 A1 | 8/2016 | Oh et al. |
| 2016/0233542 A1 | 8/2016 | Jongerden |
| 2016/0233543 A1 | 8/2016 | Homma et al. |
| 2016/0233544 A1 | 8/2016 | Kim et al. |
| 2016/0233545 A1 | 8/2016 | Chen et al. |
| 2016/0233546 A1 | 8/2016 | Feng et al. |
| 2016/0233547 A1 | 8/2016 | Matsui et al. |
| 2016/0233548 A1 | 8/2016 | Yamada et al. |
| 2016/0233549 A1 | 8/2016 | Tiruvannamalai et al. |
| 2016/0233550 A1 | 8/2016 | Takahata |

(56) References Cited

U.S. PATENT DOCUMENTS

| | | |
|---|---|---|
| 2016/0233551 A1 | 8/2016 | Wessells et al. |
| 2016/0233552 A1 | 8/2016 | Matsumoto et al. |
| 2016/0233691 A1 | 8/2016 | Sumi et al. |
| 2016/0237098 A1 | 8/2016 | Haruna et al. |
| 2016/0237578 A1 | 8/2016 | Ichikawa et al. |
| 2016/0239586 A1 | 8/2016 | Ho |
| 2016/0240324 A1 | 8/2016 | Picot et al. |
| 2016/0240325 A1 | 8/2016 | Tajima et al. |
| 2016/0240328 A1 | 8/2016 | Huang et al. |
| 2016/0240823 A1 | 8/2016 | Miyake |
| 2016/0240828 A1 | 8/2016 | Ueda et al. |
| 2016/0240830 A1 | 8/2016 | Mizuno et al. |
| 2016/0240836 A1 | 8/2016 | Aotani et al. |
| 2016/0240839 A1 | 8/2016 | Umeyama et al. |
| 2016/0240840 A1 | 8/2016 | He et al. |
| 2016/0240841 A1 | 8/2016 | He et al. |
| 2016/0240842 A1 | 8/2016 | Fang et al. |
| 2016/0240843 A1 | 8/2016 | Kamo et al. |
| 2016/0240846 A1 | 8/2016 | Endo et al. |
| 2016/0240847 A1 | 8/2016 | Kinoshita et al. |
| 2016/0240848 A1 | 8/2016 | Asano et al. |
| 2016/0240849 A1 | 8/2016 | Kuriyama et al. |
| 2016/0240850 A1 | 8/2016 | Takamori et al. |
| 2016/0240851 A1 | 8/2016 | Zhang |
| 2016/0240852 A1 | 8/2016 | Yamauchi et al. |
| 2016/0240854 A1 | 8/2016 | Sakurai et al. |
| 2016/0240856 A1 | 8/2016 | Paulsen et al. |
| 2016/0240857 A1 | 8/2016 | Inagaki et al. |
| 2016/0240858 A1 | 8/2016 | Yamada et al. |
| 2016/0240859 A1 | 8/2016 | Uezono |
| 2016/0240863 A1 | 8/2016 | Keene et al. |
| 2016/0240878 A1 | 8/2016 | Hammad et al. |
| 2016/0240882 A1 | 8/2016 | Lethien et al. |
| 2016/0240883 A1 | 8/2016 | Kim et al. |
| 2016/0240885 A1 | 8/2016 | Nishimura |
| 2016/0240886 A1 | 8/2016 | Yamasaki et al. |
| 2016/0240887 A1 | 8/2016 | Hatta et al. |
| 2016/0240888 A1 | 8/2016 | Hamasaki et al. |
| 2016/0240889 A1 | 8/2016 | Cheng et al. |
| 2016/0240896 A1 | 8/2016 | Zhang et al. |
| 2016/0240897 A1 | 8/2016 | Saunders et al. |
| 2016/0243028 A1 | 8/2016 | Lichter et al. |
| 2016/0244336 A1 | 8/2016 | Toya et al. |
| 2016/0245871 A1 | 8/2016 | Joe |
| 2016/0245894 A1 | 8/2016 | Deng et al. |
| 2016/0246153 A1 | 8/2016 | Garcia et al. |
| 2016/0248014 A1 | 8/2016 | Zhang et al. |
| 2016/0248052 A1 | 8/2016 | Minamitani |
| 2016/0248054 A1 | 8/2016 | Muroi |
| 2016/0248058 A1 | 8/2016 | Miki et al. |
| 2016/0248060 A1 | 8/2016 | Brambrink et al. |
| 2016/0248061 A1 | 8/2016 | Brambrink et al. |
| 2016/0248063 A1 | 8/2016 | Jang et al. |
| 2016/0248064 A1 | 8/2016 | Elabd et al. |
| 2016/0248065 A1 | 8/2016 | Miyazaki et al. |
| 2016/0248066 A1 | 8/2016 | Shi et al. |
| 2016/0248074 A1 | 8/2016 | Suguro et al. |
| 2016/0248076 A1 | 8/2016 | Sugihara et al. |
| 2016/0248077 A1 | 8/2016 | Momo et al. |
| 2016/0248078 A1 | 8/2016 | Choi et al. |
| 2016/0248079 A1 | 8/2016 | Myung et al. |
| 2016/0248081 A1 | 8/2016 | Bohnke et al. |
| 2016/0248085 A1 | 8/2016 | Umeyama et al. |
| 2016/0248086 A1 | 8/2016 | Ohsawa et al. |
| 2016/0248087 A1 | 8/2016 | Kim et al. |
| 2016/0248089 A1 | 8/2016 | Koga et al. |
| 2016/0248090 A1 | 8/2016 | Maeda et al. |
| 2016/0248091 A1 | 8/2016 | Toya et al. |
| 2016/0248095 A1 | 8/2016 | Kurata et al. |
| 2016/0248099 A1 | 8/2016 | Kucernak et al. |
| 2016/0248100 A1 | 8/2016 | Joo et al. |
| 2016/0248115 A1 | 8/2016 | Hatta et al. |
| 2016/0248116 A1 | 8/2016 | Suga et al. |
| 2016/0248118 A1 | 8/2016 | Chan et al. |
| 2016/0248119 A1 | 8/2016 | Kato |
| 2016/0248120 A1 | 8/2016 | Yamada et al. |
| 2016/0248121 A1 | 8/2016 | Uematsu et al. |
| 2016/0248122 A1 | 8/2016 | Hwang et al. |
| 2016/0250385 A1 | 9/2016 | Cullen et al. |
| 2016/0250596 A1 | 9/2016 | Dai et al. |
| 2016/0251534 A1 | 9/2016 | Burlett et al. |
| 2016/0251560 A1 | 9/2016 | Pober |
| 2016/0251740 A1 | 9/2016 | Bi et al. |
| 2016/0251778 A1 | 9/2016 | Zhang et al. |
| 2016/0252583 A1 | 9/2016 | Joe |
| 2016/0254451 A1 | 9/2016 | Suzuki et al. |
| 2016/0254500 A1 | 9/2016 | Kawata et al. |
| 2016/0254501 A1 | 9/2016 | Saimaru et al. |
| 2016/0254511 A1 | 9/2016 | Hatta et al. |
| 2016/0254513 A1 | 9/2016 | Ohashi et al. |
| 2016/0254514 A1 | 9/2016 | Roumi |
| 2016/0254520 A1 | 9/2016 | Okuda et al. |
| 2016/0254525 A1 | 9/2016 | Hirose et al. |
| 2016/0254527 A1 | 9/2016 | Upreti |
| 2016/0254528 A1 | 9/2016 | Yu et al. |
| 2016/0254530 A1 | 9/2016 | Armand et al. |
| 2016/0254531 A1 | 9/2016 | Gutel et al. |
| 2016/0254533 A1 | 9/2016 | Gayden |
| 2016/0254535 A1 | 9/2016 | Aksay et al. |
| 2016/0254536 A1 | 9/2016 | Hiratsuka |
| 2016/0254537 A1 | 9/2016 | Kamo et al. |
| 2016/0254538 A1 | 9/2016 | Manthiram et al. |
| 2016/0254539 A1 | 9/2016 | Kagei et al. |
| 2016/0254540 A1 | 9/2016 | Lee et al. |
| 2016/0254541 A1 | 9/2016 | Kim et al. |
| 2016/0254542 A1 | 9/2016 | Konishi et al. |
| 2016/0254543 A1 | 9/2016 | Naskar et al. |
| 2016/0254544 A1 | 9/2016 | Chou et al. |
| 2016/0254545 A1 | 9/2016 | Sugita et al. |
| 2016/0254546 A1 | 9/2016 | Kwak et al. |
| 2016/0254567 A1 | 9/2016 | Cai et al. |
| 2016/0254568 A1 | 9/2016 | Chesneau et al. |
| 2016/0254569 A1 | 9/2016 | Yagi et al. |
| 2016/0254572 A1 | 9/2016 | Yu et al. |
| 2016/0254575 A1 | 9/2016 | Yang |
| 2016/0254578 A1 | 9/2016 | Liu et al. |
| 2016/0254687 A1 | 9/2016 | Tanaka et al. |
| 2016/0259011 A1 | 9/2016 | Joe |
| 2016/0260939 A1 | 9/2016 | Horikoshi |
| 2016/0260943 A1 | 9/2016 | Tamburrino |
| 2016/0260948 A1 | 9/2016 | Nishimoto |
| 2016/0260951 A1 | 9/2016 | Umeyama et al. |
| 2016/0260962 A1 | 9/2016 | Mane et al. |
| 2016/0260964 A1 | 9/2016 | Yang et al. |
| 2016/0260965 A1 | 9/2016 | Wu et al. |
| 2016/0260966 A1 | 9/2016 | Ohsawa et al. |
| 2016/0260967 A1 | 9/2016 | Matus et al. |
| 2016/0260968 A1 | 9/2016 | Atwater et al. |
| 2016/0260969 A1 | 9/2016 | Han et al. |
| 2016/0260972 A1 | 9/2016 | Hibino et al. |
| 2016/0260973 A1 | 9/2016 | Sonobe et al. |
| 2016/0260974 A1 | 9/2016 | Umeyama et al. |
| 2016/0260975 A1 | 9/2016 | Ishigaki et al. |
| 2016/0260976 A1 | 9/2016 | Matsuo et al. |
| 2016/0260978 A1 | 9/2016 | Fujii |
| 2016/0260979 A1 | 9/2016 | Park et al. |
| 2016/0260981 A1 | 9/2016 | Lee et al. |
| 2016/0260983 A1 | 9/2016 | Ramasubramanian et al. |
| 2016/0260986 A1 | 9/2016 | Devoe et al. |
| 2016/0260988 A1 | 9/2016 | Miyazawa et al. |
| 2016/0260994 A1 | 9/2016 | Kong |
| 2016/0261000 A1 | 9/2016 | Zhang et al. |
| 2016/0261001 A1 | 9/2016 | Liang et al. |
| 2016/0261003 A1 | 9/2016 | Nakamoto et al. |
| 2016/0261004 A1 | 9/2016 | Yamamoto et al. |
| 2016/0261005 A1 | 9/2016 | Rustomji et al. |
| 2016/0261006 A1 | 9/2016 | Ueno et al. |
| 2016/0261012 A1 | 9/2016 | Goldstein |
| 2016/0261013 A1 | 9/2016 | Hase et al. |
| 2016/0263577 A1 | 9/2016 | Ismagilov et al. |
| 2016/0264764 A1 | 9/2016 | Narumi et al. |
| 2016/0265085 A1 | 9/2016 | Bourassa et al. |
| 2016/0265110 A1 | 9/2016 | Hamalainen et al. |
| 2016/0265164 A1 | 9/2016 | Medoff |

(56) References Cited

U.S. PATENT DOCUMENTS

| | | |
|---|---|---|
| 2016/0268063 A1 | 9/2016 | Tsuzuki et al. |
| 2016/0268064 A1 | 9/2016 | Ishikawa et al. |
| 2016/0268077 A1 | 9/2016 | Hirose et al. |
| 2016/0268558 A1 | 9/2016 | Sawayama |
| 2016/0268559 A1 | 9/2016 | Sawayama |
| 2016/0268565 A1 | 9/2016 | Sasaki et al. |
| 2016/0268569 A1 | 9/2016 | Yashiki |
| 2016/0268570 A1 | 9/2016 | Wang et al. |
| 2016/0268572 A1 | 9/2016 | Sato |
| 2016/0268573 A1 | 9/2016 | Ishihara et al. |
| 2016/0268587 A1 | 9/2016 | Nam et al. |
| 2016/0268589 A1 | 9/2016 | Do et al. |
| 2016/0268590 A1 | 9/2016 | Koshima et al. |
| 2016/0268591 A1 | 9/2016 | Choi et al. |
| 2016/0268592 A1 | 9/2016 | Inagaki et al. |
| 2016/0268593 A1 | 9/2016 | Vogler et al. |
| 2016/0268594 A1 | 9/2016 | Kim et al. |
| 2016/0268597 A1 | 9/2016 | De Vries et al. |
| 2016/0268598 A1 | 9/2016 | Kuriki et al. |
| 2016/0268599 A1 | 9/2016 | Damen et al. |
| 2016/0268601 A1 | 9/2016 | Paulsen et al. |
| 2016/0268602 A1 | 9/2016 | Inagaki et al. |
| 2016/0268603 A1 | 9/2016 | Harada et al. |
| 2016/0268604 A1 | 9/2016 | Saruwatari et al. |
| 2016/0268605 A1 | 9/2016 | Yamauchi et al. |
| 2016/0268606 A1 | 9/2016 | Takeuchi et al. |
| 2016/0268607 A1 | 9/2016 | Nomura |
| 2016/0268608 A1 | 9/2016 | Nishimura et al. |
| 2016/0268619 A1 | 9/2016 | Sawa et al. |
| 2016/0268621 A1 | 9/2016 | Chiang et al. |
| 2016/0268622 A1 | 9/2016 | Lu et al. |
| 2016/0268624 A1 | 9/2016 | Stauffer |
| 2016/0268626 A1 | 9/2016 | Ishida |
| 2016/0268627 A1 | 9/2016 | Lee et al. |
| 2016/0268628 A1 | 9/2016 | Masuko et al. |
| 2016/0268629 A1 | 9/2016 | Tanaka et al. |
| 2016/0268630 A1 | 9/2016 | Tsukada et al. |
| 2016/0268633 A1 | 9/2016 | Schofield et al. |
| 2016/0268634 A1 | 9/2016 | Woo |
| 2016/0268635 A1 | 9/2016 | Cha |
| 2016/0268636 A1 | 9/2016 | Cha et al. |
| 2016/0268637 A1 | 9/2016 | Tsubouchi et al. |
| 2016/0268639 A1 | 9/2016 | Mizuno et al. |
| 2016/0268646 A1 | 9/2016 | Wang et al. |
| 2016/0268648 A1 | 9/2016 | Ueno et al. |
| 2016/0268661 A1 | 9/2016 | Kim et al. |
| 2016/0270622 A1 | 9/2016 | Ouellette et al. |
| 2016/0271161 A1 | 9/2016 | Dobson |
| 2016/0271254 A1 | 9/2016 | Musa et al. |
| 2016/0271728 A1 | 9/2016 | Dai et al. |
| 2016/0272659 A1 | 9/2016 | King et al. |
| 2016/0272753 A1 | 9/2016 | Nanson et al. |
| 2016/0273133 A1 | 9/2016 | Zhang et al. |
| 2016/0276109 A1 | 9/2016 | Krishnan et al. |
| 2016/0276110 A1 | 9/2016 | Suzuka |
| 2016/0276112 A1 | 9/2016 | Okuno et al. |
| 2016/0276591 A1 | 9/2016 | Mitchell et al. |
| 2016/0276635 A1 | 9/2016 | Ju et al. |
| 2016/0276641 A1 | 9/2016 | Umeyama et al. |
| 2016/0276642 A1 | 9/2016 | Mizuno et al. |
| 2016/0276643 A1 | 9/2016 | Iwase |
| 2016/0276650 A1 | 9/2016 | Hoshina et al. |
| 2016/0276652 A1 | 9/2016 | Iwasaki et al. |
| 2016/0276654 A1 | 9/2016 | Woo et al. |
| 2016/0276656 A1 | 9/2016 | Oshima et al. |
| 2016/0276657 A1 | 9/2016 | Song et al. |
| 2016/0276658 A1 | 9/2016 | Choi et al. |
| 2016/0276659 A1 | 9/2016 | Choi et al. |
| 2016/0276660 A1 | 9/2016 | Choi et al. |
| 2016/0276662 A1 | 9/2016 | Ise et al. |
| 2016/0276663 A1 | 9/2016 | Yoshida et al. |
| 2016/0276664 A1 | 9/2016 | Gunji et al. |
| 2016/0276665 A1 | 9/2016 | Ide et al. |
| 2016/0276666 A1 | 9/2016 | Christensen et al. |
| 2016/0276667 A1 | 9/2016 | Nakai et al. |
| 2016/0276668 A1 | 9/2016 | Nagayama et al. |
| 2016/0276669 A1 | 9/2016 | Chen et al. |
| 2016/0276671 A1 | 9/2016 | Yuge et al. |
| 2016/0276672 A1 | 9/2016 | Song et al. |
| 2016/0276673 A1 | 9/2016 | Kato et al. |
| 2016/0276693 A1 | 9/2016 | Goeltz et al. |
| 2016/0276694 A1 | 9/2016 | Goeltz et al. |
| 2016/0276699 A9 | 9/2016 | Tode et al. |
| 2016/0276702 A1 | 9/2016 | Nakai et al. |
| 2016/0276705 A1 | 9/2016 | Hambitzer |
| 2016/0276707 A1 | 9/2016 | Holub et al. |
| 2016/0276708 A1 | 9/2016 | Kawasoe et al. |
| 2016/0276709 A1 | 9/2016 | Oh et al. |
| 2016/0276710 A1 | 9/2016 | Itakura et al. |
| 2016/0276712 A1 | 9/2016 | Sale et al. |
| 2016/0276714 A1 | 9/2016 | Hayashi et al. |
| 2016/0276717 A1 | 9/2016 | Goldsmith |
| 2016/0285125 A1 | 9/2016 | Harrup |
| 2016/0285131 A1 | 9/2016 | Yamauchi et al. |
| 2016/0285132 A1 | 9/2016 | Burba et al. |
| 2016/0293997 A1 | 10/2016 | Yamauchi et al. |
| 2016/0294013 A1 | 10/2016 | Burba et al. |
| 2016/0300667 A1 | 10/2016 | Okada et al. |
| 2016/0301105 A1 | 10/2016 | Li et al. |
| 2016/0304712 A1 | 10/2016 | Yamamoto et al. |
| 2016/0308218 A1 | 10/2016 | Ota et al. |
| 2016/0312089 A1 | 10/2016 | Kouno et al. |
| 2016/0315351 A1 | 10/2016 | Kotou et al. |
| 2016/0336615 A1 | 11/2016 | Thillaiyan et al. |
| 2016/0336618 A1 | 11/2016 | Lee et al. |
| 2016/0351876 A1 | 12/2016 | Jo et al. |
| 2016/0351957 A1 | 12/2016 | Taeda et al. |
| 2016/0365580 A1 | 12/2016 | Ghanavi |
| 2016/0365605 A1 | 12/2016 | Garsuch et al. |
| 2016/0372790 A1 | 12/2016 | Cheng et al. |
| 2016/0372791 A1 | 12/2016 | Cheng et al. |
| 2016/0372853 A1 | 12/2016 | Kono et al. |
| 2017/0007553 A1 | 1/2017 | Miller et al. |
| 2017/0018806 A1 | 1/2017 | Shin et al. |
| 2017/0018809 A1 | 1/2017 | Yamazaki et al. |
| 2017/0020941 A1 | 1/2017 | Naheed |
| 2017/0020942 A1 | 1/2017 | Naheed |
| 2017/0021025 A1 | 1/2017 | Naheed |
| 2017/0021026 A1 | 1/2017 | Naheed |
| 2017/0023509 A1 | 1/2017 | Kim et al. |
| 2017/0025676 A1 | 1/2017 | Yu |
| 2017/0025708 A1 | 1/2017 | Yamazaki et al. |
| 2017/0033400 A1 | 2/2017 | Eitouni et al. |
| 2017/0035753 A1 | 2/2017 | Cipolla et al. |
| 2017/0037191 A1 | 2/2017 | Burckhardt et al. |
| 2017/0040638 A1 | 2/2017 | Klaehn et al. |
| 2017/0040649 A1 | 2/2017 | Schmitz et al. |
| 2017/0042608 A1 | 2/2017 | Clark et al. |
| 2017/0044314 A1 | 2/2017 | Harumashi et al. |
| 2017/0051108 A1 | 2/2017 | Harumashi et al. |
| 2017/0062869 A1 | 3/2017 | Zhamu et al. |
| 2017/0069913 A1 | 3/2017 | Yano et al. |
| 2017/0077552 A1 | 3/2017 | Taeda et al. |
| 2017/0077557 A1 | 3/2017 | Zheng et al. |
| 2017/0081348 A1 | 3/2017 | Burckhardt et al. |
| 2017/0087545 A1 | 3/2017 | Yokota et al. |
| 2017/0092915 A1 | 3/2017 | Ku et al. |
| 2017/0098819 A9 | 4/2017 | Loveness et al. |
| 2017/0098856 A1 | 4/2017 | Zhamu et al. |
| 2017/0104204 A1 | 4/2017 | Zhamu et al. |
| 2017/0104240 A1 | 4/2017 | Arima et al. |
| 2017/0108753 A1 | 4/2017 | Lam et al. |
| 2017/0110758 A1 | 4/2017 | Kanazawa |
| 2017/0110761 A1 | 4/2017 | Burba et al. |
| 2017/0110762 A1 | 4/2017 | Kanazawa |
| 2017/0117547 A1 | 4/2017 | Fanous et al. |
| 2017/0125759 A1 | 5/2017 | Silkowski et al. |
| 2017/0129987 A1 | 5/2017 | Burckhardt et al. |
| 2017/0133716 A1 | 5/2017 | Masuda et al. |
| 2017/0141364 A1 | 5/2017 | Miyajama et al. |
| 2017/0149087 A1 | 5/2017 | Maruo et al. |
| 2017/0158806 A1 | 6/2017 | Peters et al. |
| 2017/0162862 A1 | 6/2017 | Thielen et al. |
| 2017/0162907 A1 | 6/2017 | Cheng et al. |

(56) References Cited

U.S. PATENT DOCUMENTS

| | | |
|---|---|---|
| 2017/0162911 A1 | 6/2017 | Gaben |
| 2017/0166528 A1 | 6/2017 | Peters et al. |
| 2017/0166691 A1 | 6/2017 | Lellouche et al. |
| 2017/0170517 A1 | 6/2017 | Lim et al. |
| 2017/0170522 A1 | 6/2017 | Moganty et al. |
| 2017/0179468 A1 | 6/2017 | Fanous et al. |
| 2017/0179530 A1 | 6/2017 | Gering et al. |
| 2017/0179545 A1 | 6/2017 | Kodama et al. |
| 2017/0182191 A1 | 6/2017 | Towne et al. |
| 2017/0192257 A1 | 7/2017 | Branda et al. |
| 2017/0194633 A1 | 7/2017 | Schumann et al. |
| 2017/0194663 A1 | 7/2017 | Zhamu et al. |
| 2017/0194664 A1 | 7/2017 | Abe et al. |
| 2017/0200974 A1 | 7/2017 | Maruo et al. |
| 2017/0207448 A1 | 7/2017 | Fanous et al. |
| 2017/0207459 A1 | 7/2017 | Okada et al. |
| 2017/0207486 A1 | 7/2017 | Wu et al. |
| 2017/0214091 A1 | 7/2017 | Abe et al. |
| 2017/0222268 A1 | 8/2017 | Abe et al. |
| 2017/0225008 A1 | 8/2017 | Stahler et al. |
| 2017/0225009 A1 | 8/2017 | Delp et al. |
| 2017/0225013 A1 | 8/2017 | Delp et al. |
| 2017/0239488 A1 | 8/2017 | Stahler et al. |
| 2017/0256818 A1 | 9/2017 | Eitouni et al. |
| 2017/0256819 A1 | 9/2017 | Kondo et al. |
| 2017/0263972 A1 | 9/2017 | Rho et al. |
| 2017/0266609 A1 | 9/2017 | Rebouillat et al. |
| 2017/0267823 A1 | 9/2017 | Shimada et al. |
| 2017/0271091 A1 | 9/2017 | Abe et al. |
| 2017/0275310 A1 | 9/2017 | Okada et al. |
| 2017/0275311 A1 | 9/2017 | Kotou et al. |
| 2017/0288211 A1 | 10/2017 | Zhamu et al. |
| 2017/0288258 A1 | 10/2017 | Rho et al. |
| 2017/0288288 A1 | 10/2017 | Chesneau et al. |
| 2017/0291397 A1 | 10/2017 | Momoi et al. |
| 2017/0303405 A1 | 10/2017 | Fukuchi |
| 2017/0305869 A1 | 10/2017 | Moganty et al. |
| 2017/0309889 A1 | 10/2017 | Masuda et al. |
| 2017/0309918 A1 | 10/2017 | Roumi et al. |
| 2017/0309948 A1 | 10/2017 | Azami |
| 2017/0309957 A1 | 10/2017 | Pratt et al. |
| 2017/0309960 A1 | 10/2017 | Lim et al. |
| 2017/0317377 A1 | 11/2017 | Inoue et al. |
| 2017/0317387 A1 | 11/2017 | Inoue et al. |
| 2017/0331151 A1 | 11/2017 | Pratt et al. |
| 2017/0338464 A1 | 11/2017 | Fasching et al. |
| 2017/0338472 A1 | 11/2017 | Zhamu et al. |
| 2017/0346141 A1 | 11/2017 | Fan |
| 2017/0352868 A1 | 12/2017 | Zhamu et al. |
| 2017/0352869 A1 | 12/2017 | Zhamu et al. |
| 2017/0355901 A1 | 12/2017 | Branda et al. |
| 2017/0358819 A1 | 12/2017 | Pratt et al. |
| 2017/0358820 A1 | 12/2017 | Pratt et al. |
| 2017/0358821 A1 | 12/2017 | Pratt et al. |
| 2017/0358822 A1 | 12/2017 | Pratt et al. |
| 2017/0358823 A1 | 12/2017 | Pratt et al. |
| 2017/0358829 A1 | 12/2017 | Inoue et al. |
| 2017/0360706 A1 | 12/2017 | Ghoroghchian |
| 2017/0361126 A1 | 12/2017 | Ghoroghchian |
| 2017/0373310 A1 | 12/2017 | Whittingham et al. |
| 2017/0373348 A1 | 12/2017 | Abe et al. |
| 2018/0006329 A1 | 1/2018 | Xiao et al. |
| 2018/0019499 A1 | 1/2018 | Yoshida et al. |
| 2018/0021438 A1 | 1/2018 | Naheed |
| 2018/0028832 A1 | 2/2018 | Lundmark et al. |
| 2018/0040867 A1 | 2/2018 | Shimura et al. |
| 2018/0047991 A1 | 2/2018 | Shiozaki et al. |
| 2018/0056085 A1 | 3/2018 | Lundmark et al. |
| 2018/0059690 A1 | 3/2018 | Coleman |
| 2018/0064772 A1 | 3/2018 | Naheed |
| 2018/0069267 A1 | 3/2018 | Suzuki et al. |
| 2018/0078593 A1 | 3/2018 | Naheed |
| 2018/0085223 A1 | 3/2018 | Donner |
| 2018/0090755 A1 | 3/2018 | Liu et al. |
| 2018/0090790 A1 | 3/2018 | Nakatsutsumi et al. |
| 2018/0102568 A1 | 4/2018 | Otohata |
| 2018/0108906 A1 | 4/2018 | Ando et al. |
| 2018/0118768 A1 | 5/2018 | Zhou et al. |
| 2018/0133501 A1 | 5/2018 | Stahler et al. |
| 2018/0137991 A1 | 5/2018 | Roumi et al. |
| 2018/0140862 A1 | 5/2018 | Stahler et al. |
| 2018/0148545 A1 | 5/2018 | Cannas et al. |
| 2018/0155376 A1 | 6/2018 | Hayashi et al. |
| 2018/0159173 A1 | 6/2018 | Chika |
| 2018/0166658 A1 | 6/2018 | Seino et al. |
| 2018/0166700 A1 | 6/2018 | Tamirisa et al. |
| 2018/0166746 A1 | 6/2018 | Shimamoto et al. |
| 2018/0166759 A1 | 6/2018 | Zhamu et al. |
| 2018/0171082 A1 | 6/2018 | Cannas et al. |
| 2018/0175433 A1 | 6/2018 | Zhamu et al. |
| 2018/0175434 A1 | 6/2018 | Zhamu et al. |
| 2018/0175451 A1 | 6/2018 | Inoue et al. |
| 2018/0179165 A1 | 6/2018 | Cannas et al. |
| 2018/0183062 A1 | 6/2018 | Zhamu et al. |
| 2018/0183066 A1 | 6/2018 | Zhamu et al. |
| 2018/0183097 A1 | 6/2018 | Yamazaki et al. |
| 2018/0183101 A1 | 6/2018 | Mizutani et al. |
| 2018/0183107 A1 | 6/2018 | Zhamu et al. |
| 2018/0191026 A1 | 7/2018 | Thielen et al. |
| 2018/0193540 A1 | 7/2018 | Pulapura et al. |
| 2018/0208763 A1 | 7/2018 | Kurokawa et al. |
| 2018/0210240 A1 | 7/2018 | Branda et al. |
| 2018/0212271 A1 | 7/2018 | Lu et al. |
| 2018/0214711 A1 | 8/2018 | Stahler et al. |
| 2018/0215901 A1 | 8/2018 | Kurokawa et al. |
| 2018/0219265 A1 | 8/2018 | Osio et al. |
| 2018/0224677 A1 | 8/2018 | Branda et al. |
| 2018/0233736 A1 | 8/2018 | Zhamu et al. |
| 2018/0236385 A1 | 8/2018 | Jinka et al. |
| 2018/0241031 A1 | 8/2018 | Pan et al. |
| 2018/0241032 A1 | 8/2018 | Pan et al. |
| 2018/0241078 A1 | 8/2018 | Zhang et al. |
| 2018/0243674 A1 | 8/2018 | Gulrez et al. |
| 2018/0244917 A1 | 8/2018 | Kim et al. |
| 2018/0248173 A1 | 8/2018 | Pan et al. |
| 2018/0248189 A1 | 8/2018 | Pan et al. |
| 2018/0248190 A1 | 8/2018 | Pan et al. |
| 2018/0251681 A1 | 9/2018 | Zhang et al. |
| 2018/0254475 A1 | 9/2018 | Takahashi et al. |
| 2018/0254515 A1 | 9/2018 | Takahashi et al. |

* cited by examiner

ALL-INORGANIC SOLVENTS FOR ELECTROLYTES

CROSS REFERENCE TO RELATED APPLICATIONS

The present application is a non-provisional of, and claims benefit of priority under 35 U.S.C. § 119(e) from, U.S. Provisional Patent Application No. 62/400,589, filed Sep. 27, 2016, the entirety of which is expressly incorporated herein by reference in its entirety.

FIELD OF THE INVENTION

The present invention relates to a solvent system comprising a mixture of phosphoranimine (PA) derivatives, and co-solvents comprised of phosphazene (Pz) derivatives optionally with monomeric phosphorus (MP) compound additives. A preferred application is in lithium ion batteries.

BACKGROUND OF THE INVENTION

Batteries with high activity metals, i.e., cell potentials above about 1.5 V, are subject to hydrolysis of aqueous electrolytes. Therefore, rechargeable high energy batteries typically employ non-aqueous electrolytes which lack free hydroxyl substituents. Other criteria for suitable electrolytes are solubility for a supporting salt which yields a charge carrier ion in sufficient concentration to permit high current density, while avoiding strongly bound complexes of the charge carrier ion with the solvent, and a sufficiently low viscosity to permit efficient charge carrier transport through the electrolyte. Further, the battery typically has a storage temperature range of 0° C. or below to 60° C. or above, and the electrolyte should be reasonably stable as a liquid within that range. Finally, the electrolyte should be chemically inert with respect to the battery chemistry, with the exception of the formation of a stable solid electrolyte interphase (SEI) layer near the reactive surface of the electrode, which permits flow of the charge carrier ions between the bulk electrolyte solution and the electrode surfaces, while protecting the bulk electrolyte solution from large-scale decomposition by the electrochemical reactions that during cycling. The SEI should be dynamic, and reform as required under normal battery cycling conditions from the bulk electrolyte solution.

Lithium ion batteries have been in widespread use for decades. These energy storage systems have been investigated for a wide variety of applications, from small single cell platforms, such as watches, phones and the like; to larger format platforms such as those applicable for transportation systems and potentially grid-scale energy storage. A considerable limitation of lithium ion batteries containing lithium salts in organic solvents, such as ethylene carbonate and ethyl methyl carbonate, is the potential for the ignition of the flammable electrolyte solution under certain operating conditions. Also notable is the degradation of the solvent and the formation of the SEI under current draw that can raise the temperature and hence the internal pressure generated causing the battery cell to rupture. Multiple approaches to effect the replacement of organic solvents from battery electrolytes have been investigated over the past 20+ years. Some have limiting requirements that make them impractical for wide-scale adoption for common multi-cell applications, such as thermal requirements (molten salts) and complex engineering designs (flow batteries). There is a pressing need for a complete replacement of current organic electrolyte systems without these constraints. One area that has shown promise of fulfilling these stringent requirements is through the use of phosphorus-based inorganic compounds. The present invention leverages compounds of this nature to achieve the goal of eliminating all organic components from the electrolyte system for a wide variety of lithium ion-based energy storage platforms.

Most of the commercial electrolytes for lithium-ion batteries are $LiPF_6$ dissolved in a mixture of organic carbonate and/or ester solvents. These electrolyte blends are highly volatile and highly flammable, with typical flash points as low as 30° C. or less. This presents serious safety concerns especially when utilized in large format cells or when the cells come under undo stress or physical damage. One approach to improve the safety performance of the electrolyte is to use additives and co-solvents to reduce the flammability of the organic carbonate and ester electrolytes. A variety of additives and co-solvents have been proposed, including sulfones, ionic liquids, phosphates, phospholanes, Pzs, siloxanes, fluorinated carbonates, and fluorinated ethers and mixtures thereof. In addition to flammability suppression, additives have also been used to improve SEI formation, overcharge protection, and thermal stability.

Electrolyte solutions used in lithium-ion batteries are known to be unstable at high temperatures and high voltages. Over time, the organic electrolyte solution turns into a tar-like material at high temperatures. The electrolyte solutions may include carbonate-based solvents, such as dimethyl carbonate (DMC), ethylene carbonate (EC), ethylmethyl carbonate (EMC), etc. However, the carbonate-based solvents are problematic due to their high volatility, flammability, and decomposition at even modestly elevated temperatures, such as low as 60° C.

The lithium metal anode provides a very high capacity and the lowest potential of all metallic anode materials. Therefore, it is not only used in commercial primary lithium metal batteries, but is also proposed as an anode material in rechargeable lithium/air and lithium/sulfur batteries, which are considered as super-high specific energy accumulators of tomorrow. These high energy batteries are urgently demanded to meet a longer driving range in electric vehicles (electro-mobility). However, the rechargeable lithium metal anode suffers from poor rechargeability and low safety. Due to the low potential, the electrolytes traditionally used are thermodynamically not stable against lithium. Their reductive decomposition and the parallel corrosion of the Li electrode lead to the formation of the SEI. This passivating film is supposed to slow down or in the ideal case even prevent electrolyte decomposition. In addition, heterogeneous lithium deposition and dissolution during charge and discharge of the lithium metal anode eventually leads to high surface area lithium, commonly called lithium dendrites in most of the organic solvent-based electrolytes. This may cause a loss of active material due to enhanced lithium corrosion at the high surface area Li, as well as due to the disconnection of dendrites from electronic contact. In addition, short-circuit of the cell may happen when the dendrites grow across the electrolyte to the cathode. In any case, the continuous creation of new lithium surfaces by dendrite formation leads to continuous electrolyte decomposition during cycling.

Overpotentials are generated by kinetic hindrances in the system. In lithium plating and stripping processes, these may include the lithium ion transport in the electrolyte and in the electrode/electrolyte interphase, such as the SEI, and always the kinetic hindrance of the lithium ion reduction and oxidation processes at the electrode itself, influencing the charge transfer resistance.

To reduce the flammability of the electrolyte solution, organophosphorus compounds, such as phosphates and cyclic Pzs, have been investigated as an additive or co-solvent to the electrolyte solution. PA compounds, which include a phosphorus-nitrogen double bond, and additional substituents on the phosphorus and nitrogen, are known in the art as synthetic intermediates in the formation of poly-phosphazene compounds or cyclic Pz compounds. PA compounds have been disclosed for use in positive electrodes of lithium primary cells and for use in electrolyte solutions in combination with an aprotic organic solvent. See Wu et al., "An Electrochemically Compatible and Flame-Retardant Electrolyte Additive for Safe Lithium Ion Batteries", J. Power Sources 227 (2013) 106-110, expressly incorporated herein by reference in its entirety, which discusses a phosphazenic compound as an electrolyte additive. The phosphazenic compound was triethoxyphosphazen-N-phosphoryldiethylester (PNP), which included a phosphine oxide functional group bonded to a nitrogen atom of the phosphazenic compound. The electrochemical characterization of the PNP-containing electrolyte was tested in MCMB/Li half-cells at 0% loading, 10% loading, 20% loading, 50% loading, and pure PNP, showing a 20% decrease in capacity at 20% loading. At 10% loading, there was little observed difference when compared to traditional electrolytes. However, loadings in excess of 20%, for example, at 50% and 100%, were not able to cycle effectively.

US 2015340739 (Klaehn et al.), expressly incorporated herein by reference in its entirety, discloses an electrolyte solution comprising at least one PA compound and a metal salt. The at least one PA compound comprises a compound of the chemical structure X—N=P($R^1$,$R^2$,$R^3$), where X is an organosilyl group (e.g., trimethyl silyl), an alkyl group, or an aryl group (e.g., a tert-butyl group) and each of $R^1$, $R^2$, and $R^3$ is independently selected from the group consisting of an alkyl group, an aryl group, an alkoxy group, or an aryloxy group, or a sulfur or nitrogen analogue thereof. The PA compound is an acyclic (e.g., linear) compound that includes a double bond between a phosphorus atom and a nitrogen atom of the PA compound. Three pendant groups are bonded to the phosphorus atom, and a pendant group is bonded to the nitrogen atom. The PA compound is a monomeric Pz compound. A cationic pendant group may also be used as at least one of $R^1$, $R^2$, and $R^3$. The choice of functional group (X) bonded to the nitrogen atom may be more limited by synthetic chemistry techniques than is the choice of functional group bonded to the phosphorus atom. The pendant groups on each of the phosphorus atom and the nitrogen atom may be the same as, or different from, one another. The PA compound should not include a halogen directly bonded to the phosphorus for stability. However, a halogen may otherwise be a substituent.

U.S. 20160156067 (Suzuki et al.), expressly incorporated herein by reference in its entirety, discloses a non-aqueous electrolytic solution which includes a solvent component including a glyme solvent and a phosphazene solvent; and an alkali metal salt composed of an alkali metal cation and an anion, the alkali metal salt being dissolved in the solvent component. The phosphazene solvent is a cyclic phosphazene compound, with six substituents (two on each phosphorus), $X_1$ to $X_6$, each independently representing a halogen atom or $OR^1$, $R^1$ is a substituted or unsubstituted aromatic group or a substituted or unsubstituted saturated aliphatic group, the aromatic group and the saturated aliphatic group each optionally contain a halogen atom, a nitrogen atom, an oxygen atom, a sulfur atom, or a silicon atom, and the saturated aliphatic group is linear or cyclic. The mixture of Suzuki et al includes an organic solvent, such as a carbonate ester, which is used in an electrolytic solution, which has a low flash point ranging from 10 to 160° C. Suzuki et al discusses the use of a phosphazene flame retardants added to the organic solvents in limited ratios. Suzuki et al. states that cyclic phosphazene compounds are more stable electrochemically than chain phosphazene compounds; therefore, when used as a solvent in a non-aqueous electrolytic solution, a cyclic phosphazene compound can contribute to maintaining the flame retardancy of the non-aqueous electrolytic solution and the high performance of the cell over a long period of time. Additionally, the cyclic phosphazene compound is more stable electrochemically and less decomposable than, for example, other types of cyclic phosphazene compounds containing an amino group in a substituent. The cyclic phosphazene compound can be synthesized by a commonly-known reaction using hexafluorophosphazene and sodium alkoxide. The glyme solvent that can be used in the non-aqueous electrolytic solution refers to a glycol diether, and is specifically an aprotic solvent which is a glycol ether terminally substituted with an alkyl group. The cyclic phosphazenes were hexa-halogen (F, Cl), or penta-halogen (F, Cl), with a single ethyloxy group or a phenyloxy group, but Suzuli et al. suggests that this substituent may more generally also be an alkoxy group, an aryloxy group, an alkyl group, an aryl group, an amino group, an alkylthio group, or an arylthio group. See also JP 2012-059391 A and WO 2013/032004 A1.

US 20160276707, (Holub et al.), expressly incorporated herein by reference in its entirety, discloses phosphonate flame retardant additives for lithium batteries, comprising phosphonate diesters having substituents $R^1$ and $R^2$ which are independent from each other methyl, ethyl, n-propyl or n-butyl. These compounds include dimethyl phosphite, ethyl methyl phosphite, methyl n-propyl phosphite, n-butyl methyl phosphite, diethyl phosphite, ethyl n-proply phosphite, ethyl n-butyl phosphite, di-n-propyl phosphite, n-butyl n-propyl phosphite, or di-n-butyl phosphite. dimethyl phosphite is preferred. Other monophosphorus additives are also known. Holub et al. also discloses oxalate-comprising anode film forming additives, which include lithium oxalate, oxalato phosphate such as lithium tetrafluoro (oxalato) phosphate, oxalato borates, or mixtures thereof. Oxalato borates are preferred. Oxalato borates include dimethyl oxalate, lithium bis(oxalato) borate, ammonium bis(oxalato) borate, lithium difluoro (oxalato) borate, or mixtures thereof. More preferred are bis(oxalato) borate comprising compounds, in particular lithium bis(oxalato) borate.

US 20160020489, (Rhodes et al.), expressly incorporated herein by reference in its entirety, discusses use of cyclic polyphosphazene derivatives which include either fluorinated groups, methoxy groups, ethoxy groups, ethers, linear aliphatics, and chlorinated derivatives are desirable as flame retardant compounds. These must be combined in appropriate amounts within the electrolyte in order to impart reduced flammability while maintaining desirable properties including ionic conductivity and wide operating temperature. Using a concentration of between 10-50% of 2-ethoxy-2,4,4,6,6-pentafluoro-1,3,5,2$\lambda^5$,4$\lambda^5$,6$\lambda^5$ triazatriphosphinine, a cyclic polyphosphazene derivative, imparts reduced flammability while maintaining reasonable electrolyte properties. Substantially higher concentrations of this compound were not miscible in an electrolyte mixture composed of $LiPF_6$, EC, EMC, and methyl butyrate (MB). Specific additives are Tris(2,2,2-trifluoroethyl)phosphate (TTFEP) (FRA-A), Dimethyl methylphosphonate (DMMP) (FRA-B), Trimethyl phosphate (TMP) (FRA-C), 2-Ethoxy-2,4,4,6,6-pentafluoro-1,3,5,2$\lambda^5$,4$\lambda^5$,-6$\lambda^5$ triazatriphosphinine (Phoslyte-Hishicolin E, CP1, FRA-D), 1-ethyl-3-methylimidazolium, bis(trifluoromethylsulfonyl)imide (EMI-TFSI) (FRA-E), and 2,4,6-Tris(trifluoromethyl)-1,3,5-triazine (TTFMT).

US 20160126594 (Kodama et al.), expressly incorporated herein by reference in its entirety, discloses a nonaqueous solvent with a combustion inhibitor pentafluorocyclophosphazene with a substituent having 3 or fewer C—H bonds. Other components include a phosphoric acid ester compound, a phosphoric acid amide compound, and a phosphazene compound. The cyclic phosphazene compound may have an amino group. For example, the cyclic phosphazene may be pentafluoro, methoxy cyclophosphazene. The cyclic phosphazene may be a triaza- or tetraaza-composition.

US 20160141720 (Onazaki et al.), expressly incorporated herein by reference in its entirety, discloses a liquid non-aqueous electrolyte composition which comprises having monofluorophosphate anions and difluorophosphate anions, and a fluorine-containing ether compound.

US 20160200748 (Galiano et al.), expressly incorporated herein by reference in its entirety, discloses use of a fluorinated solvent for lithium electrolytes, having a dialkyl phosphonate ester terminus with a fluorinated olefin tail.

US 20160237098 (Haruna et al.), expressly incorporated herein by reference in its entirety, discloses a non-aqueous electrolyte solution which contains lithium hexafluorophosphate and a boroxine compound.

US 20150295275 (Han et al.), expressly incorporated herein by reference in its entirety, discloses use of a cyclophosphazene additive for a non-aqueous electrolyte, in which five substituents are each independently a halogen or a halogen-containing group, and the remaining substituent is an alkylamine or alkylether.

See, U.S. Pat. Nos. 4,126,483; 4,157,941; 4,159,229; 4,248,868; 4,270,957; 4,483,908; 4,613,676; 4,719,288; 4,722,877; 4,727,060; 4,772,433; 4,810,599; 4,828,945; 4,863,903; 4,931,591; 4,985,317; 5,041,346; 5,061,581; 5,071,532; 5,110,694; 5,114,809; 5,153,080; 5,153,082; 5,176,969; 5,180,645; 5,188,783; 5,190,695; 5,229,227; 5,337,184; 5,420,000; 5,426,005; 5,443,601; 5,455,127; 5,474,860; 5,523,179; 5,532,077; 5,548,055; 5,567,783; 5,576,120; 5,580,681; 5,582,623; 5,591,545; 5,599,435; 5,609,972; 5,633,098; 5,648,011; 5,660,948; 5,672,446; 5,672,465; 5,681,357; 5,686,201; 5,688,293; 5,698,338; 5,700,298; 5,707,760; 5,716,421; 5,725,968; 5,728,489; 5,731,104; 5,731,105; 5,733,681; 5,741,606; 5,744,264; 5,753,388; 5,756,231; 5,780,182; 5,783,333; 5,786,110; 5,789,108; 5,789,110; 5,795,679; 5,814,420; 5,824,434; 5,830,600; 5,834,135; 5,837,015; 5,843,592; 5,846,673; 5,851,504; 5,853,916; 5,869,207; 5,912,093; 5,916,708; 5,919,587; 5,962,169; 5,998,559; 6,007,947; 6,013,393; 6,015,638; 6,030,720; 6,063,899; 6,087,426; 6,096,453; 6,103,419; 6,103,426; 6,110,619; 6,159,640; 6,168,885; 6,183,718; 6,200,707; 6,203,949; 6,207,326; 6,210,831; 6,217,623; 6,223,449; 6,225,009; 6,238,821; 6,287,719; 6,306,546; 6,312,853; 6,316,141; 6,316,149; 6,328,770; 6,337,101; 6,337,156; 6,341,057; 6,365,300; 6,376,123; 6,379,842; 6,379,846; 6,391,492; 6,395,423; 6,406,814; 6,413,675; 6,413,676; 6,416,905; 6,444,370; 6,447,952; 6,472,104; 6,475,679; 6,475,680; 6,482,545; 6,489,064; 6,492,449; 6,495,287; 6,495,289; 6,509,122; 6,511,769; 6,524,737; 6,541,697; 6,544,400; 6,544,690; 6,555,026; 6,558,850; 6,579,643; 6,596,440; 6,599,664; 6,605,237; 6,613,475; 6,617,078; 6,645,675; 6,649,033; 6,664,006; 6,667,106; 6,673,273; 6,677,085; 6,682,849; 6,699,623; 6,709,785; 6,721,168; 6,726,733; 6,730,435; 6,743,549; 6,746,794; 6,759,164; 6,759,460; 6,790,243; 6,794,086; 6,797,019; 6,803,151; 6,815,119; 6,828,065; 6,833,218; 6,841,301; 6,869,547; 6,878,488; 6,893,774; 6,908,186; 6,924,061; 6,936,761; 6,939,647; 6,955,867; 6,991,876; 7,005,206; 7,008,564; 7,052,805; 7,060,744; 7,067,219; 7,077,516; 7,081,320; 7,084,290; 7,091,266; 7,094,501; 7,099,142; 7,105,254; 7,118,694; 7,129,005; 7,192,564; 7,195,840; 7,198,865; 7,198,870; 7,211,351; 7,226,702; 7,229,719; 7,238,450; 7,238,451; 7,241,530; 7,247,740; 7,253,017; 7,255,965; 7,265,379; 7,267,908; 7,270,912; 7,273,597; 7,282,295; 7,282,297; 7,285,362; 7,291,782; 7,295,423; 7,316,855; 7,342,770; 7,344,804; 7,352,558; 7,377,690; 7,378,193; 7,390,591; 7,410,731; 7,429,433; 7,442,471; 7,452,632; 7,473,491; 7,476,468; 7,494,745; 7,498,102; 7,507,687; 7,508,651; 7,514,180; 7,524,439; 7,544,445; 7,553,584; 7,557,637; 7,560,595; 7,572,554; 7,579,112; 7,579,117; 7,579,118; 7,582,380; 7,585,587; 7,585,994; 7,588,859; 7,594,982; 7,598,002; 7,604,895; 7,635,530; 7,656,125; 7,678,505; 7,695,860; 7,695,862; 7,709,158; 7,713,449; 7,718,321; 7,718,826; 7,731,765; 7,736,806; 7,745,047; 7,759,418; 7,771,496; 7,771,880; 7,781,098; 7,781,105; 7,790,312; 7,790,315; 7,791,861; 7,811,700; 7,811,707; 7,811,708; 7,816,032; 7,820,328; 7,824,800; 7,828,728; 7,829,212; 7,829,242; 7,838,143; 7,838,144; 7,851,090; 7,858,216; 7,858,222; 7,871,721; 7,875,204; 7,875,393; 7,883,794; 7,887,970; 7,901,830; 7,919,629; 7,923,801; 7,939,198; 7,939,199; 7,939,206; 7,951,495; 7,960,061; 7,965,062; 7,976,983; 7,977,393; 7,988,746; 7,989,109; 7,993,780; 7,993,782; 8,000,084; 8,003,241; 8,003,256; 8,004,057; 8,007,940; 8,012,615; 8,013,412; 8,021,775; 8,026,008; 8,030,500; 8,034,491; 8,048,569; 8,057,937; 8,062,796; 8,067,107; 8,071,233; 8,072,734; 8,076,031; 8,076,032; 8,084,998; 8,092,940; 8,092,942; 8,105,733; 8,114,171; 8,119,038; 8,119,288; 8,124,269; 8,124,274; 8,129,052; 8,133,614; 8,137,844; 8,138,380; 8,148,009; 8,153,307; 8,158,282; 8,163,204; 8,163,441; 8,168,326; 8,168,330; 8,168,331; 8,168,831; 8,178,009; 8,178,215; 8,182,943; 8,187,749; 8,192,863; 8,206,468; 8,206,469; 8,211,336; 8,216,722; 8,221,915; 8,227,103; 8,227,105; 8,227,114; 8,236,446; 8,236,449; 8,241,789; 8,241,793; 8,257,866; 8,257,870; 8,263,248; 8,263,697; 8,268,197; 8,269,260; 8,269,302; 8,274,126; 8,277,975; 8,283,071; 8,283,325; 8,284,539; 8,287,483; 8,293,398; 8,301,322; 8,308,971; 8,309,240; 8,318,342; 8,323,815; 8,334,075; 8,357,450; 8,357,464; 8,357,468; 8,361,658; 8,367,755; 8,377,586; 8,377,596; 8,384,058; 8,389,173; 8,415,045; 8,420,266; 8,426,060; 8,435,679; 8,441,090; 8,445,136; 8,450,012; 8,455,141; 8,465,871; 8,466,533; 8,470,472; 8,476,727; 8,481,195; 8,482,093; 8,486,560; 8,486,565; 8,492,023; 8,492,033; 8,501,339; 8,512,896; 8,512,899; 8,513,758; 8,518,525; 8,524,399; 8,525,287; 8,530,099; 8,530,940; 8,530,991; 8,530,992; 8,530,993; 8,540,899; 8,541,136; 8,546,023; 8,546,853; 8,556,996; 8,557,444; 8,558,286; 8,562,873; 8,574,773; 8,579,994; 8,580,430; 8,580,432; 8,580,438; 8,586,238; 8,592,075; 8,592,081; 8,597,815; 8,597,827; 8,599,534; 8,617,736; 8,623,543; 8,623,556; 8,623,964; 8,628,873; 8,632,898; 8,643,064; 8,647,773; 8,652,686; 8,652,688; 8,658,062; 8,663,841; 8,669,114; 8,673,499; 8,673,503; 8,679,670; 8,679,684; 8,679,686; 8,685,569; 8,686,074; 8,691,444; 8,703,310; 8,703,344; 8,703,345; 8,709,531; 8,715,863; 8,715,865; 8,728,170; 8,734,668; 8,734,674; 8,734,983; 8,734,988; 8,735,005; 8,741,486; 8,741,500; 8,748,046; 8,754,138; 8,758,946; 8,764,853; 8,765,295;

8,765,303; 8,765,306; 8,778,522; 8,778,533; 8,778,540; 8,778,546; 8,784,694; 8,785,022; 8,785,034; 8,786,932; 8,790,814; 8,795,886; 8,795,903; 8,801,810; 8,802,285; 8,808,924; 8,814,956; 8,815,432; 8,815,443; 8,815,453; 8,822,084; 8,822,088; 8,828,580; 8,828,605; 8,841,014; 8,841,035; 8,845,764; 8,846,249; 8,846,251; 8,846,922; 8,852,801; 8,852,808; 8,852,813; 8,858,837; 8,859,149; 8,865,355; 8,870,810; 8,871,385; 8,871,390; 8,889,285; 8,889,301; 8,895,189; 8,900,754; 8,906,447; 8,906,515; 8,906,548; 8,906,549; 8,907,133; 8,911,639; 8,922,959; 8,927,127; 8,927,775; 8,929,054; 8,936,882; 8,940,444; 8,940,446; 8,945,774; 8,951,670; 8,951,673; 8,951,676; 8,962,173; 8,968,820; 8,968,921; 8,974,947; 8,980,474; 8,981,723; 8,986,881; 8,999,008; 8,999,009; 9,011,731; 9,012,093; 9,012,094; 9,017,879; 9,029,019; 9,029,022; 9,034,519; 9,039,788; 9,059,477; 9,059,481; 9,065,080; 9,070,948; 9,076,589; 9,076,591; 9,077,037; 9,077,046; 9,093,693; 9,093,716; 9,093,722; 9,099,252; 9,099,738; 9,099,756; 9,105,908; 9,105,942; 9,111,684; 9,112,210; 9,112,212; 9,112,236; 9,112,239; 9,118,088; 9,120,121; 9,123,941; 9,123,969; 9,123,973; 9,129,754; 9,129,756; 9,130,214; 9,130,243; 9,130,245; 9,130,246; 9,134,547; 9,142,357; 9,147,874; 9,147,906; 9,166,206; 9,166,222; 9,166,249; 9,172,076; 9,172,088; 9,172,094; 9,183,994; 9,183,995; 9,184,467; 9,184,468; 9,187,834; 9,187,835; 9,190,616; 9,190,667; 9,190,695; 9,190,696; 9,190,698; 9,196,781; 9,196,926; 9,200,375; 9,203,084; 9,203,107; 9,203,113; 9,206,210; 9,207,513; 9,209,446; 9,209,456; 9,214,659; 9,214,696; 9,219,274; 9,225,003; 9,225,038; 9,227,850; 9,230,746; 9,231,243; 9,236,599; 9,236,633; 9,236,634; 9,236,635; 9,240,614; 9,245,691; 9,246,150; 9,252,399; 9,252,419; 9,252,422; 9,252,455; 9,252,456; 9,257,720; 9,259,690; 9,263,731; 9,263,764; 9,269,961; 9,273,399; 9,276,268; 9,281,541; 9,281,543; 9,284,264; 9,284,324; 9,287,560; 9,293,236; 9,293,749; 9,293,773; 9,293,787; 9,293,790; 9,293,796; 9,324,992; 9,325,004; 9,331,353; 9,343,741; 9,350,044; 9,350,055; RE37076; 20010004506; 20010004507; 20010010881; 20010012590; 20010033974; 20010045364; 20020014616; 20020018929; 20020028387; 20020031701; 20020034692; 20020034757; 20020039275; 20020042003; 20020048706; 20020055040; 20020055047; 20020070374; 20020074972; 20020076611; 20020085968; 20020086206; 20020090331; 20020090547; 20020094311; 20020098135; 20020100725; 20020102196; 20020110739; 20020122979; 20020122980; 20020127162; 20020127169; 20020127454; 20020128364; 20020136681; 20020136683; 20020150524; 20020155353; 20020159943; 20020160253; 20020160257; 20020160258; 20020160270; 20020160271; 20020182488; 20020185627; 20020193533; 20020197522; 20020197531; 20030003358; 20030003360; 20030003369; 20030013007; 20030014859; 20030031933; 20030038024; 20030059683; 20030068555; 20030082446; 20030082458; 20030091904; 20030094599; 20030099884; 20030108801; 20030113635; 20030125437; 20030129500; 20030148191; 20030170548; 20030175597; 20030175598; 20030180625; 20030186110; 20030190531; 20030198868; 20030207178; 20030211389; 20040009404; 20040013927; 20040016455; 20040028585; 20040036444; 20040038122; 20040038124; 20040038127; 20040039134; 20040050414; 20040053138; 20040072683; 20040084080; 20040085710; 20040091774; 20040126305; 20040126658; 20040126659; 20040139587; 20040142246; 20040146778; 20040146786; 20040151985; 20040157122; 20040158091; 20040170901; 20040175622; 20040189762; 20040189763; 20040191617; 20040191635; 20040192853; 20040201878; 20040214090; 20040218347; 20040220348; 20040229127; 20040234859; 20040248014; 20040253520; 20050008938; 20050042503; 20050042515; 20050085655; 20050089890; 20050095197; 20050095504; 20050095506; 20050106458; 20050106460; 20050106470; 20050118503; 20050123836; 20050136329; 20050153207; 20050158626; 20050164093; 20050170253; 20050170254; 20050174092; 20050175529; 20050175894; 20050175895; 20050175904; 20050181280; 20050186481; 20050196672; 20050214700; 20050215764; 20050221168; 20050221192; 20050221193; 20050228087; 20050233207; 20050233212; 20050233214; 20050244704; 20050249656; 20050249667; 20050250011; 20050250015; 20050255385; 20050260120; 20050266292; 20050272214; 20050277023; 20050287439; 20060019131; 20060019167; 20060032046; 20060034943; 20060035137; 20060035154; 20060046151; 20060073381; 20060078790; 20060088763; 20060105244; 20060109608; 20060112539; 20060115579; 20060121346; 20060121355; 20060137158; 20060147371; 20060147795; 20060147807; 20060154144; 20060154147; 20060159999; 20060166098; 20060172200; 20060174934; 20060177740; 20060180796; 20060194119; 20060204834; 20060204856; 20060204857; 20060210867; 20060210873; 20060210883; 20060216612; 20060217568; 20060228468; 20060240327; 20060246343; 20060269834; 20060281010; 20060281011; 20060292451; 20070015053; 20070020529; 20070026315; 20070027129; 20070029972; 20070037046; 20070037063; 20070040154; 20070042266; 20070043158; 20070048209; 20070048596; 20070048622; 20070048623; 20070051620; 20070054180; 20070054186; 20070065727; 20070077496; 20070085059; 20070092549; 20070092798; 20070099072; 20070099084; 20070099090; 20070100012; 20070117007; 20070117026; 20070122698; 20070141470; 20070146965; 20070149496; 20070160901; 20070166617; 20070172739; 20070172740; 20070180688; 20070181177; 20070182418; 20070183954; 20070190424; 20070207384; 20070212583; 20070212615; 20070216469; 20070218371; 20070243454; 20070243470; 20070254213; 20070292746; 20070292750; 20070298314; 20080008928; 20080008933; 20080020276; 20080020284; 20080020285; 20080026297; 20080032197; 20080038641; 20080044729; 20080044736; 20080051495; 20080057386; 20080063585; 20080063588; 20080066297; 20080070076; 20080075999; 20080076023; 20080089830; 20080096056; 20080099734; 20080107586; 20080113266; 20080118428; 20080118843; 20080119421; 20080131772; 20080138700; 20080152996; 20080153005; 20080160417; 20080164444; 20080171263; 20080171268; 20080176141; 20080193840; 20080193848; 20080193855; 20080209876; 20080213588; 20080213661; 20080213662; 20080224100; 20080231237; 20080233477; 20080241693; 20080241699; 20080254361; 20080261116; 20080269492; 20080286649; 20080305401; 20080311025; 20080318135; 20090004094; 20090005824; 20090011340; 20090017364; 20090017386; 20090023070; 20090023071; 20090027827; 20090029138; 20090029193; 20090029237; 20090035656; 20090047579; 20090075176; 20090081547; 20090081548; 20090090640; 20090104523; 20090117466; 20090117467; 20090123813; 20090130567; 20090136830; 20090136834; 20090136854; 20090148771; 20090148777; 20090155696; 20090155697; 20090169463; 20090169725; 20090169996; 20090178969; 20090181296; 20090186258; 20090186267; 20090186276; 20090186277; 20090191464; 20090208832; 20090208835; 20090236973; 20090242830; 20090246625; 20090246628; 20090253035; 20090253046; 20090256528; 20090259420; 20090269511; 20090269654; 20090269673; 20090280400; 20090280414; 20090286163; 20090291330; 20090292105; 20090297935; 20090297937; 20090305016; 20090311587; 20090325017; 20100000079; 20100003401; 20100003603; 20100009260; 20100014215; 20100015514; 20100015521; 20100018034; 20100021800; 20100021815; 20100021819;

20100028784; 20100047695; 20100062345; 20100068461; 20100068605; 20100068628; 20100075195; 20100075222; 20100075225; 20100078599; 20100086823; 20100090650; 20100092869; 20100104950; 20100112443; 20100119881; 20100119883; 20100119956; 20100120179; 20100124691; 20100125082; 20100125087; 20100136410; 20100143770; 20100143798; 20100151303; 20100159346; 20100164436; 20100166961; 20100167121; 20100167129; 20100173139; 20100173198; 20100176337; 20100178531; 20100178555; 20100178562; 20100178567; 20100178568; 20100180889; 20100183907; 20100183917; 20100190059; 20100193370; 20100196766; 20100200403; 20100203370; 20100209782; 20100210745; 20100216016; 20100216023; 20100216027; 20100216033; 20100224824; 20100233523; 20100239902; 20100239917; 20100240813; 20100248078; 20100255356; 20100255383; 20100263201; 20100263910; 20100279155; 20100285352; 20100285354; 20100285358; 20100285373; 20100291293; 20100291429; 20100291443; 20100291444; 20100293779; 20100297502; 20100297510; 20100299008; 20100304205; 20100304223; 20100310941; 20100320089; 20100323238; 20100330410; 20100330419; 20100330421; 20100330423; 20100330425; 20100330433; 20110003213; 20110005065; 20110012067; 20110014279; 20110014522; 20110014523; 20110014527; 20110020704; 20110020706; 20110024396; 20110027656; 20110033734; 20110033756; 20110039144; 20110039157; 20110045346; 20110049745; 20110052966; 20110059349; 20110064988; 20110064999; 20110067230; 20110070489; 20110070495; 20110070504; 20110076542; 20110076572; 20110077880; 20110081563; 20110081575; 20110081581; 20110086781; 20110097624; 20110097628; 20110097630; 20110098463; 20110104553; 20110104565; 20110111294; 20110111304; 20110114896; 20110117407; 20110117445; 20110117446; 20110123869; 20110136006; 20110136019; 20110139331; 20110139730; 20110143201; 20110143202; 20110143207; 20110143217; 20110143219; 20110151324; 20110159329; 20110159365; 20110159366; 20110159377; 20110159379; 20110171502; 20110171539; 20110177393; 20110178306; 20110181249; 20110183216; 20110189512; 20110189520; 20110189548; 20110189579; 20110195318; 20110200874; 20110206979; 20110206994; 20110207000; 20110212359; 20110229761; 20110236751; 20110236765; 20110236772; 20110236798; 20110236799; 20110240064; 20110244313; 20110250503; 20110250626; 20110256457; 20110264381; 20110269010; 20110274976; 20110274977; 20110278170; 20110281159; 20110287316; 20110287318; 20110293997; 20110300444; 20110300450; 20110301931; 20110305949; 20110305958; 20110311865; 20110311881; 20110319426; 20120003508; 20120003514; 20120003518; 20120007560; 20120009481; 20120009483; 20120015249; 20120021266; 20120021286; 20120021294; 20120021303; 20120028105; 20120034500; 20120034512; 20120034523; 20120038967; 20120045670; 20120045697; 20120052401; 20120058377; 20120058398; 20120060360; 20120064396; 20120064398; 20120064399; 20120064409; 20120070741; 20120077076; 20120077082; 20120077091; 20120082873; 20120082890; 20120082901; 20120082902; 20120082903; 20120088155; 20120088162; 20120094178; 20120094188; 20120094194; 20120097194; 20120100438; 20120105007; 20120107680; 20120107697; 20120107726; 20120110835; 20120115018; 20120115041; 20120121974; 20120121989; 20120121991; 20120129019; 20120129045; 20120129046; 20120133341; 20120135312; 20120135313; 20120141864; 20120141866; 20120141867; 20120141869; 20120141870; 20120141878; 20120141883; 20120141884; 20120148896; 20120148897; 20120148922; 20120149852; 20120155507; 20120164519; 20120164541; 20120169297; 20120171535; 20120171536; 20120171542; 20120175552; 20120177995; 20120178145; 20120183842; 20120183843; 20120183856; 20120183865; 20120183866; 20120188086; 20120189910; 20120189920; 20120202112; 20120208087; 20120218683; 20120219865; 20120225331; 20120225358; 20120225359; 20120231308; 20120231325; 20120231336; 20120231352; 20120232285; 20120244391; 20120244417; 20120249080; 20120251886; 20120251892; 20120251896; 20120270076; 20120270112; 20120273737; 20120276445; 20120282530; 20120288750; 20120288751; 20120288769; 20120289887; 20120292196; 20120292197; 20120293916; 20120295155; 20120295165; 20120295166; 20120297611; 20120301789; 20120301797; 20120308894; 20120315535; 20120315546; 20120315549; 20120321959; 20120323036; 20120326073; 20120328942; 20120328952; 20130001092; 20130004839; 20130004852; 20130004859; 20130004862; 20130011728; 20130011736; 20130017443; 20130017453; 20130020557; 20130022861; 20130022863; 20130022880; 20130026409; 20130034762; 20130040203; 20130043057; 20130043125; 20130043843; 20130045427; 20130048923; 20130052508; 20130052528; 20130052542; 20130055559; 20130059172; 20130059195; 20130065122; 20130065130; 20130067726; 20130069601; 20130069658; 20130069661; 20130070391; 20130071733; 20130071739; 20130071762; 20130072154; 20130078525; 20130084495; 20130084496; 20130084501; 20130084505; 20130088204; 20130089793; 20130090900; 20130092866; 20130095351; 20130095392; 20130100563; 20130108539; 20130108802; 20130108899; 20130108920; 20130108930; 20130115520; 20130115529; 20130115531; 20130122361; 20130128488; 20130130069; 20130130108; 20130130121; 20130130125; 20130130126; 20130130128; 20130135110; 20130136981; 20130141693; 20130143090; 20130143129; 20130149567; 20130149596; 20130149602; 20130149605; 20130157141; 20130157147; 20130157149; 20130157152; 20130163148; 20130164571; 20130164611; 20130164612; 20130164628; 20130167363; 20130169238; 20130171340; 20130171500; 20130171502; 20130171512; 20130177814; 20130177818; 20130178011; 20130183579; 20130183580; 20130189575; 20130189579; 20130194723; 20130195805; 20130196223; 20130196235; 20130199936; 20130202920; 20130202945; 20130202955; 20130202956; 20130202959; 20130202967; 20130202973; 20130206606; 20130209348; 20130209860; 20130209869; 20130209870; 20130209887; 20130209897; 20130216894; 20130216899; 20130216907; 20130216908; 20130216918; 20130216920; 20130224576; 20130224583; 20130224603; 20130224604; 20130224605; 20130230772; 20130230773; 20130230779; 20130232772; 20130234074; 20130236750; 20130236766; 20130244095; 20130244102; 20130244107; 20130244133; 20130252090; 20130252101; 20130252112; 20130252114; 20130260222; 20130260229; 20130260232; 20130260246; 20130260254; 20130260255; 20130264999; 20130266827; 20130266846; 20130266858; 20130266866; 20130271085; 20130271089; 20130277599; 20130280579; 20130280592; 20130280601; 20130280621; 20130288083; 20130288084; 20130288113; 20130288120; 20130288136; 20130288138; 20130295439; 20130295461; 20130295465; 20130295492; 20130302650; 20130302679; 20130302697; 20130302702; 20130302704; 20130309527; 20130309549; 20130309561; 20130309564; 20130309571; 20130309580; 20130316233; 20130316248; 20130319870; 20130320582; 20130320928; 20130323571; 20130323585; 20130323595; 20130323605; 20130327648; 20130330609; 20130330611; 20130330637; 20130337189; 20130337304; 20130337335; 20130337338; 20130337339; 20130337340; 20130337341; 20130337343; 20130337346; 20130344360; 20130344383; 20130344390; 20130344391; 20130344392; 20130344396; 20130344397; 20140011081; 20140011088;

20140015160; 20140017547; 20140017549; 20140017557; 20140017558; 20140017559; 20140017568; 20140017571; 20140017573; 20140023884; 20140023932; 20140023934; 20140027677; 20140030559; 20140030609; 20140030610; 20140030623; 20140038006; 20140038043; 20140038059; 20140038060; 20140045015; 20140045016; 20140045017; 20140045019; 20140045020; 20140045021; 20140045022; 20140045065; 20140045096; 20140050910; 20140050972; 20140057153; 20140057168; 20140057169; 20140057172; 20140057173; 20140057179; 20140059820; 20140060859; 20140065461; 20140065479; 20140072837; 20140072843; 20140072871; 20140072877; 20140072879; 20140075745; 20140080012; 20140087214; 20140087250; 20140087251; 20140087257; 20140093780; 20140093783; 20140093787; 20140099528; 20140099539; 20140099557; 20140099560; 20140102884; 20140104754; 20140106219; 20140107326; 20140113202; 20140113203; 20140117940; 20140125292; 20140127567; 20140127575; 20140131217; 20140132220; 20140134499; 20140134501; 20140134521; 20140138591; 20140141336; 20140141337; 20140141340; 20140146440; 20140147710; 20140147741; 20140147752; 20140154546; 20140154557; 20140154559; 20140154587; 20140154590; 20140162108; 20140162130; 20140162131; 20140162135; 20140166929; 20140166939; 20140170303; 20140170465; 20140170475; 20140170480; 20140170482; 20140170498; 20140170500; 20140170503; 20140170524; 20140173300; 20140176074; 20140176076; 20140178759; 20140178770; 20140178772; 20140184162; 20140184172; 20140193712; 20140196631; 20140197797; 20140197801; 20140197802; 20140197805; 20140199585; 20140199599; 20140199600; 20140199613; 20140205905; 20140205908; 20140212716; 20140212752; 20140212761; 20140212763; 20140212770; 20140220417; 20140220422; 20140220450; 20140225569; 20140227432; 20140227548; 20140227584; 20140230887; 20140234693; 20140234705; 20140234711; 20140234712; 20140234713; 20140234726; 20140234727; 20140234732; 20140239905; 20140242445; 20140242453; 20140242469; 20140242474; 20140245599; 20140246905; 20140248521; 20140248526; 20140248537; 20140255792; 20140255802; 20140256534; 20140264198; 20140266075; 20140272132; 20140272489; 20140272524; 20140272531; 20140272553; 20140272558; 20140272567; 20140272568; 20140272574; 20140272576; 20140272577; 20140272578; 20140272579; 20140272580; 20140272583; 20140272591; 20140287301; 20140287305; 20140287323; 20140287325; 20140287330; 20140293507; 20140295268; 20140295270; 20140295275; 20140295290; 20140302354; 20140302373; 20140302400; 20140302401; 20140302402; 20140302403; 20140306162; 20140308562; 20140308583; 20140308585; 20140308588; 20140310951; 20140312269; 20140314948; 20140315072; 20140315091; 20140315097; 20140315104; 20140319649; 20140322579; 20140322602; 20140322608; 20140329120; 20140329131; 20140329150; 20140332715; 20140335406; 20140335410; 20140335411; 20140342200; 20140342209; 20140342223; 20140342228; 20140342240; 20140342244; 20140342249; 20140346618; 20140349182; 20140349186; 20140353146; 20140356703; 20140356708; 20140356735; 20140363735; 20140363746; 20140370379; 20140370380; 20140370387; 20140370396; 20140376160; 20140377635; 20140377648; 20140377667; 20140377668; 20150002162; 20150004444; 20150004480; 20150004482; 20150004488; 20150004495; 20150010460; 20150010784; 20150014184; 20150014581; 20150014605; 20150017541; 20150017543; 20150017544; 20150017549; 20150017550; 20150022957; 20150024121; 20150024248; 20150024249; 20150024251; 20150024279; 20150030856; 20150030906; 20150030939; 20150037675; 20150037686; 20150037689; 20150037690; 20150044517; 20150044533; 20150044556; 20150044564; 20150044565; 20150044571; 20150044573; 20150044581; 20150050535; 20150050564; 20150050565; 20150056488; 20150056499; 20150056507; 20150056509; 20150056514; 20150056516; 20150056521; 20150062687; 20150064514; 20150064538; 20150064568; 20150064574; 20150064575; 20150064578; 20150064580; 20150069307; 20150072225; 20150072232; 20150072234; 20150072247; 20150073632; 20150079477; 20150079483; 20150079484; 20150086859; 20150086865; 20150086868; 20150086876; 20150086877; 20150089797; 20150093459; 20150093631; 20150093647; 20150093653; 20150093654; 20150093655; 20150093659; 20150099165; 20150099171; 20150099178; 20150099179; 20150099184; 20150099185; 20150099187; 20150099188; 20150099190; 20150099191; 20150099192; 20150102257; 20150104701; 20150104712; 20150104716; 20150110971; 20150111078; 20150111086; 20150111088; 20150111099; 20150111101; 20150111107; 20150118558; 20150118565; 20150118572; 20150118588; 20150125595; 20150125752; 20150125759; 20150125761; 20150131047; 20150132648; 20150132649; 20150137030; 20150140206; 20150140397; 20150140398; 20150140427; 20150140434; 20150140446; 20150140449; 20150143806; 20150147602; 20150147624; 20150147642; 20150147645; 20150147662; 20150152566; 20150155546; 20150155556; 20150155557; 20150155559; 20150155598; 20150162131; 20150162139; 20150162588; 20150162602; 20150162603; 20150162772; 20150171414; 20150171426; 20150171467; 20150179976; 20150180001; 20150180023; 20150180087; 20150180249; 20150188125; 20150188187; 20150188189; 20150188191; 20150191423; 20150191607; 20150191841; 20150194702; 20150200390; 20150200420; 20150200422; 20150203516; 20150207147; 20150207174; 20150207176; 20150207184; 20150210044; 20150214529; 20150214573; 20150214577; 20150221936; 20150221983; 20150221987; 20150228980; 20150236343; 20150236372; 20150236378; 20150236379; 20150236380; 20150243936; 20150243962; 20150243972; 20150243973; 20150243987; 20150243988; 20150244041; 20150248149; 20150249247; 20150249262; 20150255771; 20150261254; 20150262761; 20150263342; 20150263379; 20150263543; 20150270552; 20150270573; 20150280218; 20150280219; 20150280229; 20150280239; 20150280267; 20150280281; 20150288028; 20150288031; 20150288034; 20150295224; 20150295241; 20150295275; 20150295276; 20150299852; 20150303463; 20150303481; 20150303511; 20150311503; 20150311509; 20150311525; 20150311534; 20150311564; 20150318530; 20150318543; 20150318555; 20150318570; 20150318572; 20150318574; 20150318578; 20150318580; 20150321920; 20150325831; 20150325843; 20150325852; 20150325855; 20150325856; 20150325880; 20150325882; 20150325884; 20150333310; 20150333315; 20150333332; 20150333359; 20150333360; 20150333367; 20150333368; 20150333370; 20150333371; 20150333374; 20150337443; 20150340664; 20150340679; 20150340738; 20150340739; 20150344512; 20150349338; 20150349345; 20150349375; 20150349376; 20150357125; 20150357126; 20150357646; 20150357673; 20150357677; 20150361564; 20150364734; 20150364735; 20150364739; 20150364747; 20150364748; 20150364755; 20150364760; 20150364791; 20150364794; 20150364795; 20150364796; 20150372296; 20150372305; 20150372345; 20150372346; 20150372349; 20150373831; 20150377977; 20150380355; 20150380727; 20150380728; 20150380731; 20150380771; 20150380772; 20150380777; 20160006017; 20160006077; 20160012979; 20160013465; 20160013469; 20160013512; 20160020458; 20160020485; 20160020486; 20160020488; 20160020489; 20160021932; 20160024250; 20160028063; 20160028079; 20160028086;

20160028087; 20160028106; 20160028111; 20160028114; 20160028116; 20160028121; 20160028133; 20160031924; 20160036055; 20160036059; 20160039970; 20160040304; 20160043070; 20160043359; 20160043363; 20160043384; 20160043385; 20160043387; 20160043391; 20160043404; 20160043409; 20160043430; 20160043431; 20160043432; 20160043435; 20160045841; 20160047060; 20160048037; 20160049662; 20160049699; 20160056436; 20160056500; 20160056503; 20160056506; 20160060125; 20160060774; 20160064154; 20160064712; 20160064726; 20160064771; 20160070119; 20160071552; 20160071658; 20160072150; 20160072152; 20160073519; 20160079601; 20160079627; 20160079628; 20160079634; 20160087263; 20160087272; 20160087295; 20160087305; 20160087306; 20160087307; 20160087309; 20160087315; 20160093874; 20160093895; 20160093917; 20160093923; 20160094079; 20160102287; 20160104882; 20160104892; 20160108529; 20160109852; 20160111700; 20160111710; 20160111729; 20160116941; 20160118637; 20160118640; 20160118644; 20160118646; 20160118658; 20160118664; 20160118666; 20160118671; 20160118685; 20160118689; 20160126535; 20160126581; 20160126589; 20160126590; 20160126591; 20160126594; 20160126595; 20160133992; 20160133995; 20160141598; 20160141719; 20160141720; 20160145190; 20160149258; 20160149264; 20160149265; 20160156071; 20160157372; 20160164060; 20160164089; 20160164137; 20160164144; 20160164145; 20160168726; 20160181656; 20160181657; 20160181658; 20160185600; 20160190545; 20160190576; 20160190578; 20160190592; 20160197351; 20160197375; 20160197377; 20160197378; 20160198750; 20160200748; 20160204466; 20160211545; 20160218327; 20160218356; 20160218391; 20160221926; 20160226042; 20160226063; 20160226065; 20160226066; 20160226067; 20160226068; 20160226069; 20160226070; 20160226071; 20160226094; 20160226099; 20160226100; 20160226101; 20160226102; 20160226103; 20160226104; 20160226106; 20160226109; 20160226114; 20160226281; 20160227839; 20160228357; 20160228863; 20160230291; 20160233031; 20160233437; 20160233461; 20160233465; 20160233469; 20160233473; 20160233474; 20160233475; 20160233484; 20160233486; 20160233487; 20160233488; 20160233489; 20160233490; 20160233491; 20160233501; 20160233502; 20160233503; 20160233504; 20160233508; 20160233509; 20160233510; 20160233511; 20160233512; 20160233513; 20160233536; 20160233542; 20160233543; 20160233544; 20160233545; 20160233546; 20160233547; 20160233548; 20160233549; 20160233550; 20160233551; 20160233552; 20160233691; 20160237098; 20160237578; 20160239586; 20160240324; 20160240325; 20160240328; 20160240823; 20160240828; 20160240830; 20160240836; 20160240839; 20160240840; 20160240841; 20160240842; 20160240843; 20160240846; 20160240847; 20160240848; 20160240849; 20160240850; 20160240851; 20160240852; 20160240854; 20160240856; 20160240857; 20160240858; 20160240859; 20160240863; 20160240878; 20160240882; 20160240883; 20160240885; 20160240886; 20160240887; 20160240888; 20160240889; 20160240896; 20160240897; 20160243028; 20160244336; 20160245871; 20160245894; 20160246153; 20160248014; 20160248052; 20160248054; 20160248058; 20160248063; 20160248064; 20160248065; 20160248066; 20160248074; 20160248076; 20160248077; 20160248078; 20160248079; 20160248081; 20160248085; 20160248086; 20160248087; 20160248089; 20160248090; 20160248091; 20160248095; 20160248099; 20160248100; 20160248115; 20160248116; 20160248118; 20160248119; 20160248120; 20160248121; 20160248122; 20160250596; 20160251534; 20160251740; 20160251778; 20160252583; 20160254451; 20160254500; 20160254501; 20160254511; 20160254513; 20160254514; 20160254520; 20160254525; 20160254527; 20160254528; 20160254530; 20160254531; 20160254533; 20160254535; 20160254536; 20160254537; 20160254538; 20160254539; 20160254540; 20160254541; 20160254542; 20160254543; 20160254544; 20160254545; 20160254546; 20160254567; 20160254568; 20160254569; 20160254572; 20160254575; 20160254578; 20160254687; 20160259011; 20160260939; 20160260943; 20160260948; 20160260951; 20160260962; 20160260964; 20160260965; 20160260966; 20160260967; 20160260968; 20160260969; 20160260972; 20160260973; 20160260974; 20160260975; 20160260976; 20160260978; 20160260979; 20160260981; 20160260983; 20160260986; 20160260988; 20160260994; 20160261000; 20160261001; 20160261003; 20160261004; 20160261005; 20160261006; 20160261012; 20160261013; 20160263577; 20160264764; 20160265085; 20160265110; 20160265164; 20160268063; 20160268064; 20160268077; 20160268558; 20160268559; 20160268565; 20160268569; 20160268570; 20160268572; 20160268573; 20160268587; 20160268589; 20160268590; 20160268591; 20160268592; 20160268593; 20160268594; 20160268597; 20160268598; 20160268599; 20160268601; 20160268602; 20160268603; 20160268604; 20160268605; 20160268606; 20160268607; 20160268608; 20160268619; 20160268621; 20160268622; 20160268624; 20160268626; 20160268627; 20160268628; 20160268629; 20160268630; 20160268633; 20160268634; 20160268635; 20160268636; 20160268637; 20160268639; 20160268646; 20160268648; 20160268661; 20160270622; 20160271161; 20160271254; 20160271728; 20160272659; 20160272753; 20160273133; 20160276109; 20160276110; 20160276112; 20160276591; 20160276635; 20160276641; 20160276642; 20160276643; 20160276650; 20160276652; 20160276654; 20160276656; 20160276657; 20160276658; 20160276659; 20160276660; 20160276662; 20160276663; 20160276664; 20160276665; 20160276666; 20160276667; 20160276668; 20160276669; 20160276671; 20160276672; 20160276673; 20160276693; 20160276694; 20160276699; 20160276702; 20160276705; 20160276707; 20160276708; 20160276709; 20160276710; 20160276712; 20160276714; and 20160276717; each of which is expressly incorporated herein by reference in its entirety.

SUMMARY OF THE INVENTION

The present technology includes the use of an all-inorganic base electrolyte system suitable for a wide variety of energy storage systems, especially lithium ion chemistry. The key composition of the solvent system provides a combination of two distinct classes of phosphorus compounds; PA and Pz, in an electrolyte system which reduces or substantially excludes (e.g., <2% by weight) organic carbonates or other organic-base components. Each class of phosphorus-based compounds has both benefits and limitations alone. Yet, each of the sets of limitations can be designed in such a fashion as to retain the beneficial properties of each distinct class, while simultaneously significantly reducing or altogether eliminating the limitations of either class alone. Preferably, a MP compound, e.g., a phosphate, phosphonate, phosphinate, phosphine or phosphine oxide, with substituents that are generally non-reactive with the battery chemistry and stable under battery operational conditions, is provided in the electrolyte system as well.

The inorganic solvent system can greatly improve lithium ion batteries by better controlling the issues of volatility, flammability, and thermal and electrochemical instability inherent to organic solvents that lead to significant cell degradation and catastrophic failure. Additionally, the PA/Pz solvent system has improved performance pertaining to the aforementioned issues as they relate to the bulk electrolyte solution and the SEI. The SEI formed in the PA/Pz system in a lithium ion battery is believed to be breakdown products of the PA and Pz (and also the MP, if present), i.e., rich in phosphorus-nitrogen compounds, which may be largely inorganic, even if the substituents of the PA, Pz, or MP include organic ligands. This SEI is believed to be distinct from the SEI formed using other electrolyte chemistries. Note that the SEI at the anode and cathode will differ, due to the relative preponderance of oxidative and reductive processes at each. Therefore, it is preferred that a stable SEI form from the electrolyte components at all electrochemically active regions of the battery, or other energy storage device. When the electrolyte is used in other types of devices, the formation and criticality of an SEI is dependent on the characteristics of the respective electrochemical system.

The SEI acts to prevent direct contact of the electrolyte molecules with the surface of the electrode, while allowing charge carrier transport. Because the surface of the electrodes is dynamic, a small portion of the SEI redevelops during each charge/discharge cycle from the electrolyte components in contact with the electrode interface with the bulk electrolyte. The cathode also has an SEI, though the cathode surface is less dynamic than the anode. Therefore, the electrolyte medium itself is involved in electrochemical reactions with the electrodes, and should be selected to provide stability under such conditions. It is noted that the difficult-to-characterize chemical makeup of the SEI formed from the PA and Pz is an efficient free radical quencher, and thus once formed, provides an effective barrier that protects the bulk electrolyte from continuous degradation.

See, Sazhin, Sergiy V., Mason K. Harrup, and Kevin L. Gering. "Characterization of low-flammability electrolytes for lithium-ion batteries." *Journal of Power Sources* 196.7 (2011): 3433-3438; Harrup, Mason K., et al. "Unsaturated phosphazenes as co-solvents for lithium-ion battery electrolytes." Journal of Power Sources 278 (2015): 794-801; Xu, Kang, et al. "An attempt to formulate nonflammable lithium ion electrolytes with alkyl phosphates and phosphazenes." Journal of The Electrochemical Society 149.5 (2002): A622-A626; Gering, Kevin L., et al. Section IV. D. 3 for DOE 2013 Annual Report: Novel Phosphazene-Based Compounds to Enhance Safety and Stability of Cell Chemistries for High Voltage Applications (INL). No. INL/EXT-13-30529. Idaho National Laboratory (INL), 2013; Rollins, Harry W., et al. "Fluorinated phosphazene co-solvents for improved thermal and safety performance in lithium-ion battery electrolytes." Journal of Power Sources 263 (2014): 66-74; Choi, Ji-Ae, Yongku Kang, and Dong-Won Kim. "Lithium polymer cell assembled by in situ chemical cross-linking of ionic liquid electrolyte with phosphazene-based cross-linking agent." Electrochimica Acta 89 (2013): 359-364; Gering, Kevin, M. Harrup, and E. Dufek. "Integrated Carbon-Reduced Battery Chemistries for Safer Alternative Li-Ion Cells." 224*th ECS Meeting* (Oct. 27-Nov. 1, 2013). Ecs, 2013; Harrup, Mason, Eric J. Dufek, and Kevin L. Gering. "Integrated Carbon-Reduced Battery Chemistries for Safer Alternative Li-Ion Cells." *Meeting Abstracts*. No. 14. The Electrochemical Society, 2013; Bieker, Georg, Martin Winter, and Peter Bieker. "Electrochemical in situ investigations of SEI and dendrite formation on the lithium metal anode." *Physical Chemistry Chemical Physics* 17.14 (2015): 8670-8679; Harrup, Mason K., et al. "Unsaturated phosphazenes as co-solvents for lithium-ion battery electrolytes." Journal of Power Sources 278 (2015): 794-801; Wu, Bingbin, et al. "An electrochemically compatible and flame-retardant electrolyte additive for safe lithium ion batteries." Journal of Power Sources 227 (2013): 106-110; Harrup, Mason K., et al. "Phosphazene Based Additives for Improvement of Safety and Battery Lifetimes in Lithium-Ion Batteries." ECS Transactions 41.39 (2012): 13-25; Zhang, Qing, et al. "Improved thermal stability of LiCoO2 by cyclotriphosphazene additives in lithium-ion batteries." Chemistry Letters 34.7 (2005): 1012-1013; Benson, Michael T., Mason K. Harrup, and Kevin L. Gering. "Lithium binding in fluorinated phosphazene trimers." Computational and Theoretical Chemistry 1005 (2013): 25-34; Zhang, Sheng Shui. "A review on electrolyte additives for lithium-ion batteries." Journal of Power Sources 162.2 (2006): 1379-1394; Cao, Xia, et al. "Novel phosphamide additive to improve thermal stability of solid electrolyte interphase on graphite anode in lithium-ion batteries." ACS applied materials & interfaces 5.22 (2013): 11494-11497., each of which is expressly incorporated herein by reference in its entirety. See also US patent and patent Appl. Nos. U.S. Pat. Nos. 4,223,080; 4,840,856; 4,917,976; 5,041,346; 5,061,581; 5,102,751; 5,108,855; 5,110,694; 5,114,809; 5,153,080; 5,153,082; 5,166,009; 5,176,969; 5,180,645; 5,219,679; 5,243,004; 5,252,413; 5,273,840; 5,273,848; 5,294,502; 5,350,646; 5,354,631; 5,366,829; 5,393,621; 5,399,447; 5,411,820; 5,418,089; 5,419,977; 5,426,005; 5,443,601; 5,455,127; 5,455,999; 5,491,039; 5,520,850; 5,521,025; 5,548,055; 5,561,007; 5,565,284; 5,573,872; 5,576,120; 5,580,682; 5,584,893; 5,589,297; 5,591,545; 5,597,662; 5,609,974; 5,616,152; 5,616,437; 5,633,098; 5,643,665; 5,646,815; 5,660,948; 5,670,273; 5,672,446; 5,682,043; 5,690,703; 5,698,338; 5,700,298; 5,707,760; 5,725,968; 5,728,489; 5,731,104; 5,733,683; 5,744,264; 5,746,781; 5,753,388; 5,756,231; 5,759,215; 5,772,702; 5,780,182; 5,780,185; 5,789,106; 5,789,110; 5,798,190; 5,824,120; 5,824,434; 5,830,600; 5,843,592; 5,849,025; 5,851,504; 5,895,717; 5,962,170; 5,985,487; 5,998,559; 6,013,393; 6,015,638; 6,096,453; 6,103,419; 6,120,940; 6,146,787; 6,168,885; 6,174,623; 6,207,326; 6,288,187; 6,391,492; 6,395,423; 6,413,675; 6,413,676; 6,416,905; 6,426,397; 6,426,863; 6,467,156; 6,475,679; 6,475,680; 6,544,690; 6,593,019; 6,599,664; 6,605,237; 6,620,553; 6,645,675; 6,664,006; 6,699,621; 6,723,349; 6,758,868; 6,794,083; 6,815,119; 6,828,065; 6,858,691; 6,893,774; 6,955,867; 7,005,206; 7,008,564; 7,067,219; 7,081,320; 7,084,290; 7,118,694; 7,226,702; 7,229,719; 7,271,228; 7,282,295; 7,282,296; 7,282,302; 7,285,362; 7,316,855; 7,390,591; 7,429,433; 7,473,491; 7,476,468; 7,491,458; 7,498,102; 7,524,439; 7,560,595; 7,585,994; 7,588,859; 7,608,178; 7,645,543; 7,666,233; 7,691,289; 7,695,860; 7,695,862; 7,704,468; 7,718,321; 7,718,826; 7,763,702; 7,776,478; 7,781,108; 7,829,212; 7,838,144; 7,838,148; 7,858,223; 7,864,397; 7,875,204; 7,931,989; 7,939,205; 7,951,495; 7,976,983; 7,977,393; 7,998,626; 8,000,084; 8,003,256; 8,048,569; 8,048,571; 8,076,031; 8,076,032; 8,092,940; 8,114,171; 8,124,269; 8,137,844; 8,153,307; 8,168,330; 8,168,831; 8,178,009; 8,182,943; 8,187,749; 8,202,649; 8,223,473; 8,236,449; 8,257,866; 8,257,870; 8,268,197; 8,293,398; 8,309,240; 8,323,820; 8,334,075; 8,361,664; 8,377,596; 8,389,147; 8,415,045; 8,420,266; 8,450,012; 8,455,131; 8,459,213; 8,470,472; 8,486,565; 8,501,339; 8,529,867; 8,556,996; 8,563,168; 8,563,761; 8,574,773; 8,592,081; 8,597,815; 8,652,686; 8,652,692; 8,658,304; 8,671,684; 8,673,477; 8,673,499; 8,703,310; 8,709,679; 8,715,863; 8,728,170; 8,734,988; 8,765,295; 8,778,522;

8,778,533; 8,785,022; 8,801,810; 8,815,432; 8,815,453; 8,822,084; 8,828,573; 8,828,574; 8,828,575; 8,841,035; 8,846,249; 8,846,251; 8,852,801; 8,852,813; 8,871,385; 8,883,344; 8,889,301; 8,900,754; 8,916,291; 8,932,771; 8,974,947; 8,980,602; 8,986,638; 9,012,093; 9,012,094; 9,051,629; 9,061,261; 9,077,046; 9,093,716; 9,099,756; 9,105,942; 9,112,212; 9,118,088; 9,123,941; 9,123,973; 9,130,245; 9,136,568; 9,142,357; 9,147,906; 9,166,249; 9,172,088; 9,172,094; 9,184,467; 9,184,468; 9,187,834; 9,187,835; 9,190,695; 9,196,926; 9,200,375; 9,203,084; 9,203,113; 9,206,210; 9,209,456; 9,219,274; 9,227,850; 9,230,746; 9,231,243; 9,236,634; 9,246,150; 9,257,720; 9,263,764; 9,269,998; 9,281,541; 9,287,560; 9,287,573; 9,293,749; 9,293,787; 9,312,567; 9,318,776; 9,331,360; 9,362,595; 9,368,831; 9,391,346; 9,406,976; 9,419,304; 9,450,269; RE37076; 20010006749; 20010012590; 20020014616; 20020018926; 20020026021; 20020031701; 20020090547; 20020100725; 20020114996; 20020122979; 20020127454; 20020155353; 20020160270; 20020193540; 20020197522; 20020197531; 20030026063; 20030068555; 20030091904; 20030108801; 20030143461; 20030175597; 20040009404; 20040013927; 20040023092; 20040053138; 20040126658; 20040151985; 20040158091; 20040191635; 20040192853; 20040209124; 20040225153; 20050008938; 20050106460; 20050153207; 20050255385; 20050266289; 20060046151; 20060124973; 20060166098; 20060172201; 20060217568; 20070012244; 20070015060; 20070015061; 20070037046; 20070048596; 20070054180; 20070072084; 20070141470; 20070149916; 20070180688; 20070183954; 20070207384; 20070265426; 20080020276; 20080020285; 20080044736; 20080096056; 20080118428; 20080153005; 20080160417; 20080164444; 20080176141; 20080193840; 20080193848; 20080233477; 20080241693; 20080254361; 20080269492; 20090023071; 20090027827; 20090075176; 20090081547; 20090081548; 20090104523; 20090130567; 20090136854; 20090208835; 20090226811; 20090253035; 20090263725; 20090269673; 20100062345; 20100075222; 20100086823; 20100094042; 20100119956; 20100159346; 20100206613; 20100209782; 20100210745; 20100216016; 20100216027; 20100220430; 20100233146; 20100233523; 20100234478; 20100238608; 20100255356; 20100285373; 20100304205; 20100304223; 20100311879; 20100316913; 20100323238; 20100330410; 20100330419; 20100330421; 20100330423; 20110020704; 20110033756; 20110039157; 20110049745; 20110067230; 20110104565; 20110111304; 20110123869; 20110143201; 20110143219; 20110159329; 20110159365; 20110171112; 20110171502; 20110195318; 20110200868; 20110200874; 20110206994; 20110229761; 20110230736; 20110236765; 20110240064; 20110250503; 20110250626; 20110256457; 20110274977; 20110287318; 20120003514; 20120009485; 20120015249; 20120021286; 20120045670; 20120060360; 20120064396; 20120070741; 20120088162; 20120097194; 20120100438; 20120107697; 20120129046; 20120135312; 20120141867; 20120141878; 20120148922; 20120164519; 20120164541; 20120175552; 20120189920; 20120219865; 20120225358; 20120225359; 20120273737; 20120288769; 20120301789; 20120301797; 20120315535; 20120315549; 20120319034; 20130004839; 20130004862; 20130011728; 20130011736; 20130022863; 20130022880; 20130026409; 20130029230; 20130071729; 20130089793; 20130108930; 20130115529; 20130130069; 20130130128; 20130143129; 20130196223; 20130196235; 20130202955; 20130209860; 20130209870; 20130216899; 20130216908; 20130216918; 20130216920; 20130230773; 20130230779; 20130236750; 20130236766; 20130252090; 20130259776; 20130260229; 20130266846; 20130280592; 20130280621; 20130295465; 20130295492; 20130302679; 20130302702; 20130309564; 20130316248; 20130320582; 20130330609; 20130330637; 20130337338; 20130337339; 20130337340; 20130337341; 20130337343; 20130337346; 20130344360; 20130344383; 20140017573; 20140023934; 20140030609; 20140038059; 20140038060; 20140045015; 20140045016; 20140045017; 20140045019; 20140045020; 20140045021; 20140045022; 20140093780; 20140093787; 20140128991; 20140134521; 20140140912; 20140166929; 20140178772; 20140196631; 20140199599; 20140199600; 20140212752; 20140212770; 20140234693; 20140234727; 20140272553; 20140272574; 20140287325; 20140329131; 20140335406; 20140342240; 20140363735; 20140363746; 20140370380; 20140377635; 20140377668; 20150004495; 20150010460; 20150044533; 20150044556; 20150072225; 20150086876; 20150086877; 20150093631; 20150099192; 20150125752; 20150125761; 20150137030; 20150162588; 20150188143; 20150188191; 20150191607; 20150214529; 20150221987; 20150236378; 20150295275; 20150295276; 20150318570; 20150318572; 20150318578; 20150318580; 20150325852; 20150325884; 20150333310; 20150333370; 20150340679; 20150340739; 20150364773; 20150372305; 20150372349; 20150380772; 20160013483; 20160013518; 20160020489; 20160027592; 20160028075; 20160036052; 20160049690; 20160049692; 20160056463; 20160056506; 20160064725; 20160087306; 20160093916; 20160093918; 20160111723; 20160118686; 20160126519; 20160126591; 20160126593; 20160126594; 20160141718; 20160164143; 20160172708; 20160172709; 20160181665; 20160190600; 20160248121; 20160260976; 20160276699; each of which is expressly incorporated herein by reference in its entirety.

In one embodiment, the PA/Pz solvent mixture includes the addition of an inorganic MP compound to further improve (reduce) the viscosity and ionic conductivity (increase) of the solvent mixture without adversely impacting the mixture's volatility, flammability, and thermal stability. At operating temperatures of 0° C.-50° C., the MP is typically provided, whereas in case of high temperature operation, the viscosity of the PA and Pz may be sufficiently low to permit efficient operation without the MP. This addition makes the solvent an ideal electrolyte for high discharge rate battery applications. Further, due to the greatly increased electrochemical window of stability versus organic systems, the use of high energy electrode couples is provided. Numerous examples of these couples exist, but are not in current use due to the limitations of the traditionally used organic electrolyte systems.

In general, it is preferred that the molecular weight of the PA and Pz, and optionally the MP, are about equal, as a heuristic for determining solution compatibility. Likewise, the substituents of the phosphorus and nitrogen (in PA) are preferably chemically similar for the two or three components, to assist in ensuring chemical compatibility. In order to achieve stability when subjected to high electrochemical potentials, e.g., above 4 V, and optionally above 4.1, or 4.2, or 4.3, or 4.4, or 4.5, or 4.6, or 4.7, or 4.8, or 4.9 or 5.0 V, or other higher voltages, the substituents preferably lack bonds which are labile under such conditions. In some cases, a small portion of the electrolyte, or an additive to the electrolyte, may be intentionally reactive under such conditions, for example to scavenge free radicals and suppress free radical propagation, and to form stable SEI layers.

There are well documented inherent limitations in current lithium ion battery technologies. Some of these limitations arise from the organic electrolyte solvents due to their volatility, flammability, and thermal and electrochemical instability as they pertain to bulk electrolyte solution and the SEI. According to the present technology, the organic electrolyte solvents may be replaced with an all-inorganic electrolyte solvent system. "All-inorganic" is not intended to exclude organic substituents on inorganic core molecules. For example, 95% or greater by weight of the solvent may comprise phosphorus-containing compounds, and preferably 98% or greater by weight. Small amounts of other components are acceptable, so long as they do not greatly increase the vapor pressure or flammability of the composite.

In a preferred embodiment, the electrolyte solvent system is composed solely of phosphorus-compounds as a mixture of primary solvent PA derivatives and co-solvent Pz derivatives with a suitable supporting salt, i.e., a supporting lithium salt, in the case of a lithium battery. In addition, an inorganic MP compound can be added to this mixture, for example to further improve the solvent's capacity to work for high discharge applications without impacting the other benefits of the PA/Pz mixtures. In battery usage, the solvent system should solvate the charge carrier ion, i.e., a metal ion, to permit charge carrier densities of at least 0.1 M, more preferably 0.5 M, and most preferably greater than 1.0 M. Further, in battery usage, the solvated charge carrier ions should not be tightly complexed to the solvent, and therefore the effective charge carrier ion should be the metal ion itself and not a solvent-molecule bound metal ion. In some cases, a minor portion of the electrolyte may bind charge carriers, especially if a source of charge carriers is provided in excess with respect to the complex-forming component. Further, while the solvent system is preferably non-reactive with the static battery chemistry, is preferably has a sufficient level of reactivity with the electrodes during battery cycling to form an SEI to effectively isolate the bulk electrolyte from the electrode surface, while permitting ion mobility through the SEI to the electrodes. Useful characteristics of the electrolyte are lack of flammability in air at standard temperature and pressure, low vapor pressure at 30° C. (e.g., less than 50 mBar, preferably less than 10 mBar, more preferably less than 5 mBar, and most preferably less than 1 mBar, all at 25° C.), low viscosity at 30° C. (≤30 cp), low toxicity (or reasonable method for detoxification), and an efficient biodegradation pathway at the end of the useful life.

Other types of batteries than lithium may be provided, such as sodium, potassium, aluminum, magnesium, manganese, vanadium, and the like. In such cases, the supporting salt and appropriate electrodes will of course correspond to the battery chemistry. In some cases, the solvent is not an electrolyte, or is provided as a potential electrolyte solvent prior to addition of a charge carrier. The solvent finds particular application in energy storage devices.

As used herein, the term "energy storage device" means and includes a device configured and comprising materials formulated to convert stored chemical energy into electrical energy or electrical energy into chemical energy. The energy storage device may include, but is not limited to, a battery or a capacitor. By way of example only, the energy storage device may be a metal-ion battery, a metal battery (e.g., Li, Na, K, Mg, Mn, V, etc.), an ultracapacitor, or a supercapacitor. In the case of capacitive energy storage systems, the formation of an SEI is not critical.

The pendant groups on the PA compound may be selected based on desired properties of the PA compound, such as to achieve sufficient stability, viscosity, flammability, salt solubility, ion transport, and cell cyclability properties of the PA compound to be used as the electrolyte or in the electrolyte solution. A desired balance of these properties may be achieved by appropriately selecting the pendant groups. The PA compound may be tailored to exhibit a low viscosity at room temperature, stability with respect to the electrochemical system chemistry (e.g., toward lithium or other metal, e.g., a high lithium or sodium salt, or other alkali metal, alkaline earth metal, transitional metal, or post transition metal salt) solubility, stability at high voltage, low flammability, and low volatility by appropriately selecting the pendant groups. The viscosity of the PA compound may be directly proportional to the molecular weight of the PA compound, which is, in turn, affected by the molecular weight of the pendant groups. By minimizing the molecular weight of the pendant groups, the PA compound may exhibit a viscosity within the desired range. To achieve the desired viscosity, the pendant groups may be selected to produce an asymmetric PA compound, i.e., a PA compound having different substituents on the phosphorus atom, which is believed to minimize molecular scale ordering and discourage a high extent of solvent self-association, aggressive multi-dentate bridging with an ionic species, and the generation of ordered or crystalline structures. Note that the viscosity of the mixed-component solvent is not directly related to the viscosity of the respective components, but as a first approximation, a lower viscosity of a significant solution component will yield a lower viscosity aggregate solution. Note also that addition of the supporting salt to the aggregate solution may also alter the viscosity.

The phosphorus substituents may also be selected such that the PA compound does not easily conform to solvate cations past mono-dentate coordination, including electron withdrawing moieties. The PA compound may also be formulated in the electrolyte solution with dissimilar compounds to avoid solvent-to-solvent molecular association. These properties may directly impact the charge transfer process in the energy storage device where ions need to be able to readily associate and de-associate with solvent members through ion solvation, which has thermodynamic and kinetic costs in terms of energy and time requirements. Thus, selecting the pendant groups to achieve lower viscosity of the PA compound may additionally make the energy storage device more efficient by economizing charge transfer at each electrode interface. If, however, the PA compound is to be used as an additive in the electrolyte solution, the viscosity may be greater than the range described below to account for mixture effects with the electrolyte solution. The pendant groups may also be selected to provide the PA compound with sufficient electrochemical stability for use in the electrochemical environment of the energy storage device.

The pendant groups may also be selected such that the PA compound has a supporting salt solubility of at least about 1.0 M concentration at room temperature. If, however, the PA compound is to be used as an additive in the electrolyte solution, the salt solubility may be less than the above-mentioned concentration to account for mixture effects with the electrolyte solution. The salt solubility of the PA compound may also be improved by interactions with other components of the electrolyte solution. However, the PA compound may still have the ability to desolvate from the supporting salt cations to enable adequate cycling efficiencies and allow acceptable rate capabilities.

The pendant groups on the PA compound may be selected such that the PA compound is a liquid at room temperature (from about 20° C. to about 25° C.) and at the temperature of use, e.g., 0° C. or below to 60° C. or above, is stable at a temperature greater than about 150° C., and is substantially non-flammable at operating temperatures to which the electrolyte solution is exposed, e.g., <65° C. The PA compound of the electrolyte solution may also be stable at high voltages, such as greater than about 4.5 V, during cycling of the energy storage device including the electrolyte solution. The pendant groups on the PA compound may be selected such that the PA compound has an increased flash point and a decreased flame duration as compared to organic electrolytes, resulting in reduced flammability of the electrolyte solution.

The components preferably lack any direct halogen-phosphorus bonds. However, per Suzuki et al., US 20160156067, expressly incorporated herein by reference in its entirety, a sequestered halogen phosphazene may be used, and according to the present technology, a sequestered halogen phosphoranimine and/or monomeric phosphorus compound may be employed, wherein the halogen is preferably fluorine.

The mixture preferably has an electrical conductivity of at least 0.9 mS/cm, preferably greater than 1.0 mS/cm, and more preferably greater than 2.0 mS/cm. The mixture preferably suffers no phase separation over a temperature range of at least 10C to 65C.

The melting point of the PA compound may be in a range of from about −30° C. to about 10° C. so that the PA compound is a liquid at room temperature and at the temperature of use. Note that the PA compound is a component of the electrolyte solution, and therefore the melting point of the PA compound alone is not dispositive. Since the PA compound is to be used in the energy storage device, such as a battery, the temperature of use may be within a range of from about −25° C. to about 150° C. To maintain the PA compound as a liquid, the pendant groups may include at least one of a fluorinated alkyl group, an aryl group, the organosilyl group, an oxygen-containing organic group, and a branched organic group on the nitrogen atom, and different R groups ($R^1$, $R^2$, $R^3$) may be used on the phosphorus atom. By selecting appropriately from these functional groups, crystal packing may be disrupted so that the PA compound may remain a liquid at room temperature.

A phosphine oxide functional group bonded to the nitrogen atom of the PA compound, i.e., X is [—P(=O)$R_2$], may be avoided because the P=O bond is strongly attracted to lithium ions.

The term "alkyl" means and includes a saturated, unsaturated, straight, branched, or cyclic hydrocarbon containing from one carbon atom to ten carbon atoms. Examples include, but are not limited to, methyl, ethyl, propyl(n-propyl, isopropyl, cyclopropyl), butyl(n-butyl, isobutyl, sec-butyl, tert-butyl, cyclobutyl), pentyl(n-pentyl, tert-pentyl, neopentyl, isopentyl, sec-pentyl, 3-pentyl, cyclopentyl), hexyl(isohexyl, cyclohexyl, 3-methylpentyl, 2,2-dimethylbutyl, 2,3-dimethylbutyl), heptyl, octyl, nonyl, or decyl. The term "alkoxy" means and includes an alkyl group linked to an oxygen atom. The alkoxy group may include, but is not limited to, a methoxy group, an ethoxy group, a propoxy group, a butoxy group, a pentoxy group, a hexoxy group, a heptoxy group, an octoxy group, a nonoxy group, or a decoxy group, or an alkoxy-substituted alkoxy group (i.e., a polyether group), such as a methoxy methoxy group, a methoxy ethoxy group, an ethoxy methoxy, an ethoxy ethoxy group, a methoxy ethoxy ethoxy group, etc. The term "aryl" means and includes a hydrocarbon with alternating single and double bonds between carbon atoms forming a ring. Examples include, but are not limited to, a phenyl group, a tolyl group, or a naphthyl group. The aryl group may also contain a heteroatom, such as sulfur (thiophene, benzothiophene, etc.), oxygen (furan, benzofuran, etc.), or nitrogen (pyrrole, indole, pyridine, pyrimidine, imidazole, pyrazole, etc.). The term "aryloxy" means and includes an aryl group linked to an oxygen atom. In addition to the oxygen-containing groups (i.e., alkoxy, aryloxy) mentioned above, functional groups including other heteroatoms, such as sulfur or nitrogen, may be present in the pendant group. The heteroatom may link, for example, the alkyl group or the aryl group to the phosphorus atom of the PA compound. By way of example only, the sulfur or nitrogen analogue may include, but is not limited to, an alkylsulfide, an alkylamine, an arylsulfide, or an arylamine. The term "organosilyl" means and includes a compound having at least one carbon-silicon bond. At least one of an alkyl group, an alkoxy group, an aryl group, an aryloxy group, or a halogen group may be bonded to the silicon atom. The groups bonded to the silicon atom may be the same as, or different from, one another. The alkyl group may be further substituted, such as with a halogen. The aryl group may be further substituted, such as with a halogen, an alkyl group, or a haloalkyl group. By way of example only, the organosilyl may be a trialkylsilyl group. The term "halo" or "halogen" means and includes fluoro, chloro, bromo, or iodo. Any of the above-mentioned functional groups may be further substituted with at least one substituent, a carboxyl, a carbonyl, a C(O)(alkyl), a carbonate, another keto functional group, an amine, an alkyl, an alkoxy, an alkylthio, an amide, an alkylamino, a dialkylamino, a haloalkyl, a hydroxyalkyl, an alkoxyalkyl, a cyano, a sulfonyl group, or a phosphate group. The cationic pendant group may include, but is not limited to, an ionic form of an aromatic amine, an aryl amine, or an aliphatic amine, such as a nitrogen-containing aryl group, a primary amine, a secondary amine, or a tertiary amine. The aromatic amine may be an aniline group. The nitrogen-containing aryl group may include, but is not limited to, a pyrrole group, an imidazole, a pyrazole, a pyridine group, a pyrazine group, a pyrimidine group, or a pyridazine group. By way of example, the amine group may be a methyl amino group or a dimethyl amino group.

The viscosity of the PA compound alone, or the solvent solution as a whole, may be within a range of from about 1 centipoise (cP) (about 0.001 Pas) to about 30 cP (about 0.03 Pas) at 20° C. or 30° C. or 35° C., such as from about 1 cP (about 0.001 Pas) to less than or equal to about 10 cP (about 0.01 Pas) at 20° C. or 30° C. or 35° C. or from about 1 cP (about 0.001 Pas) to less than or equal to about 7 cP (about 0.007 Pas) at 20° C. or 30° C. or 35° C.

The MP compound, if provided may be a simple organophosphates, organophosphonates, organophosphinates, and/or organic phosphine oxide alkyl and/or aryl derivative. Organophosphates are fully esterified derivatives of phosphoric acid and are conveniently synthesized employing light aliphatic or aryl alcohols. Organophosphates are widely employed both in natural and synthetic applications because of the ease with which organic groups can be linked together. Organic phosphine oxides are similar in structure to the organophosphates, except they contain direct phosphorus-carbon linkages, instead of being bound through a heteroatom, like oxygen. Organophosphonates and organophosphinates have both ester and phosphorus-carbon linkages. These compounds are also readily synthesized, for example as a by-product of the Wittig reaction. Another common route to phosphine oxides is the thermolysis of phosphonium hydroxides. As in the case with the organophosphates, the R-groups may be any light aliphatic or aryl group, and most preferred is for each molecule to have a plurality of differing groups attached to the same central phosphorus.

The metal salt may be a salt of lithium, sodium, potassium, magnesium, manganese, or other alkali metal or alkaline earth metal, or vanadium, or other metals. The solvent solution as a whole, may have a high salt solubility, such as from about 0.1 to 5 M, and for example, may be 0.5 M to about 1.2 M, or 0.8 to 1.1 M, in a solution of a metal salt, such as in a lithium salt solution, a sodium salt solution, other alkali metal solution, alkaline earth metal solution, transitional metal solution, or post transition metal solution. By way of example only, the lithium salt may be lithium hexafluorophosphate ($LiPF_6$), lithium tetrafluoroborate ($LiBF_4$), lithium perchlorate ($LiClO_4$), or combinations thereof. The solvent solution with a 1.0 M supporting salt at room temperature may have a conductivity of at least about 5 mS/cm.

The solvent system may provide a good ion cyclability in the energy storage device, such as at least a C/1 equivalent cycling rate. However, when used in consumer electronics, the battery including the solvent may exhibit a lower cycling rate.

The various compounds according to the present technology are produced according to standard techniques, and may be available as commodity products.

The electrolyte solution including the PA compound may be used in an energy storage device (e.g., a battery or capacitor) that includes a positive electrode (e.g., a cathode), a negative electrode (e.g., an anode) separated from the positive electrode, and an optional separator between the electrodes, with an SEI layer forming at a surface of the electrodes. The electrolyte solution is in contact with the positive electrode and the negative electrode, but may be positioned in the separator. By way of example, the energy storage device may be a lithium battery containing the electrolyte solution.

It is therefore an object to provide an electrolyte solvent formulation comprising: a phosphoranimine; a phosphazene; and optionally a monomeric phosphorus compound. The formulation preferably has a melting point below 0° C. The formulation preferably has a vapor pressure of combustible components at 60.6° C. sufficiently low to not produce a combustible mixture in air, e.g., a vapor pressure of less than 40 mmHg at 30° C. According to one embodiment, the phosphoranimine, phosphazene, and monomeric phosphorus compounds have no direct halogen-phosphorus bonds. According to other embodiments, phosphorus-halogen bonds are permitted, as disclosed in known for use non-aqueous electrolytes as discussed above.

It is a still further object to provide an electrolyte solvent formulation comprising: a phosphoranimine; and a phosphazene; having a melting point below 0° C., and a vapor pressure of combustible components at 60.6° C. sufficiently low to not produce a combustible mixture in air.

The formulation preferably comprises a supporting salt having a concentration of at least 0.1M charge carrier ions. The supporting salt, may comprise a supporting lithium salt effective to render the electrolyte solvent formulation suitable for use as an electrolyte in a lithium ion battery, e.g., $LiPF_6$.

The composition may also comprise boron compounds, such as boron-oxygen, boron-nitrogen, boron-phosphorus, boron-nitrogen-phosphorus, boron-nitrogen-oxygen, and boron-nitrogen-phosphorus-oxygen compounds, as disclosed in known for use non-aqueous electrolytes as discussed above.

The monomeric phosphorus compound may comprise a phosphate, phosphonate, phosphinate, or phosphine. The MP preferably has at least two different types of pendent groups. The monomeric phosphorus compound may comprise an organophosphate compound in an amount sufficient to achieve a viscosity of the formulation of less than about 30 cp at 35° C.

The monomeric phosphorus compound may be present in an amount of between 10% and 50% by volume.

The phosphoranimine typically has the structure: $X-N=P(R^1, R^2, R^3)$, wherein X, $R^1$, $R^2$, and $R^3$ are independently selected from the group consisting of inorganic and organic functional groups, wherein $R^1$, $R^2$, and $R^3$ are represented by at least two different substituents. X may be selected from the group consisting of an organosilyl group or a tert-butyl group. $R^1$, $R^2$, and $R^3$ may be independently selected from the group consisting of an alkoxy group, and an aryloxy group. As discussed above, in some embodiments, $R^1$, $R^2$, and/or $R^3$ may be alkoxy group or aryloxy group may be halogenated, fluorinated or perfluorinated.

In the phosphoranimine, $R^1$, $R^2$, $R^3$ may each independently representing a halogen atom or $OR^4$, in which $R^4$ is a substituted or unsubstituted aromatic group or a substituted or unsubstituted saturated aliphatic group, the aromatic group and the saturated aliphatic group each optionally contain a halogen atom, a nitrogen atom, an oxygen atom, a sulfur atom, or a silicon atom, and the saturated aliphatic group is linear or cyclic.

The phosphazene may comprise a plurality of phosphazenes having respectively different pendent group substitution. The phosphazene may comprise a substituted phosphazene having substituents selected from the group consisting of alkoxy and fluorinated alkoxy groups. The substituted phosphazene may comprise at least one of an ethoxy substituent and a 2,2,2-trifluoroethoxy substituent. The phosphazene may be present in an amount of between 0.1% and 50% by volume, and preferably in an amount of between 10% and 20% by volume.

The phosphazene solvent may be a cyclic phosphazene compound, with six substituents (two on each phosphorus), $X_1$ to $X_6$, each independently representing $OR^4$, $R^4$ is a substituted or unsubstituted aromatic group or a substituted or unsubstituted saturated aliphatic group, the aromatic group and the saturated aliphatic group each optionally contain a halogen atom, a nitrogen atom, an oxygen atom, a sulfur atom, or a silicon atom, and the saturated aliphatic group is linear or cyclic.

The formulation preferably comprises less than about 2% by weight of organic compounds consisting essentially of at least one of carbon, hydrogen, and oxygen.

The phosphoranimine is preferably present in an amount of between 20-50% by volume, the phosphazene is preferably present in an amount of between 3-15% by volume, and the monomeric phosphorus compound is preferably present in an amount of 20-50% by volume.

The formulation may be provided with a battery or other energy storage device, having an anode, a cathode, a separator, and a supporting salt.

In a battery, a solid electrode interphase layer consisting essentially of breakdown products of at least one of the phosphoranimine, the phosphazene, and the monomeric phosphorus compound forms near the electrodes.

It is another object to provide an electrolyte for use in a lithium battery, which is liquid at 0° C., comprising a supporting lithium salt, and a solvent comprising less than about 2% purely organic compounds consisting essentially of carbon, hydrogen and oxygen. The electrolyte preferably has a vapor pressure of less than 40 mmHg at 30° C. The electrolyte may be provided in combination with: an anode, a cathode, and a separator configured to separate the anode and the cathode and permit lithium ion permeability therethrough. A solid electrolyte interphase layer selectively forms near a surface of the anode and cathode from degradation products of the electrolyte. The formed solid electrolyte interphase layer is preferably stable for at least 245 days at 60° C. The electrolyte preferably comprises a phosphoranimine, a phosphazene, optionally a monomeric phosphorus compound, and the supporting lithium salt. The solid electrolyte interface layer formed by the electrolyte with the electrodes is more preferably thermally stable ≥80° C. At least one of the phosphoranimine and the phosphazene may comprise a plurality of different phosphoranimine or different phosphazenes having a plurality of respectfully different substituents.

The electrolyte preferably comprises between 0.1% and 50% of the phosphazene by volume and between 10% and 20% of the phosphazene by volume. The electrolyte optionally comprises the up to 50% by volume of the monomeric phosphorus compound.

A further object provides a rechargeable lithium ion battery, comprising an anode, a cathode, a separator, an electrolyte, a supporting lithium salt, and a solid electrolyte interphase layer, the electrolyte comprising at least one phosphoranimine, at least one cyclic phosphazene, and at least one organophosphate, wherein the electrolyte has a viscosity of ≤30 cp at 35° C., a concentration of lithium ions of at least 0.2 M, and a vapor pressure of ≤40 mmHg at 30° C., wherein the solid electrolyte interphase layer is formed by degradation of the electrolyte in proximity to the cathode and the anode and is stable against degradation at 65° C.

It is further object to provide a lithium ion battery having an operating temperature range which extends beyond 0° C. to 50° C., and has an electrolyte viscosity of less than 30 cp within the operating temperature range.

It is another object to provide a method of forming a battery, comprising: providing an anode, a cathode, a separator, and a electrolyte solvent formulation comprising: a phosphoranimine, a phosphazene; and a supporting salt, the solvent formulation having a melting point below 0° C., and a vapor pressure of combustible components at 60.6° C. sufficiently low to not produce a combustible mixture in air; and cycling the battery at to form a solid electrolyte interface formed from products of the phosphoranimine and phosphazene. The electrolyte solvent may further comprise a monomeric phosphorus compound, e.g., a, organophosphate. The electrolyte solvent formulation preferably has a viscosity of less than about 30 cp at 35° C.

The phosphoranimine may have the structure:

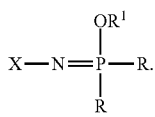

the phosphazene may have the structure:

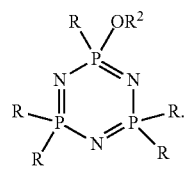

the monomeric phosphorus compound may have the structure:

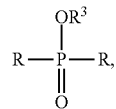

wherein $R^1$, $R^2$, and $R^3$, are selected from the group consisting of alkyl, aryl, heteroalkyl, and heteroaryl, and halogen substituted alkyl, aryl, heteroalkyl, and heteroaryl functional groups, and R is independently selected from hydrogen, an acyl group, an acylamino group, an acyloxy group, an alkyl group, an alkenyl group, an alkynyl group, an alkoxy group, an amino group, an alkylamino group, an alkylarylamino group, a dialkylamino group, an alkylthio group, an alkarylthio group, an aryl group, an arylamino group, a diarylamino group, an aryloxy group, an aralkyl group, an alkaryl group, an aralkoxy group, an alkaryloxy group, an arylthio group, an arylthio acyl group, an amino acid group, a carbamoyl group, a carbonamido group, a carboxyl group, a cyano group, a formyl group, a glycol group, a heteroalkyl group, a heteroaralkyl group, a heteroaryl group, a hydroxyl group, a nitro group, an oxy (aliphatic) group, an oxy(aliphatic)hydroxyl group, an oxy (alkyl)hydroxyl group, an oxycarbonyl group, an oxysulfonyl group, a perfluoroalkyl group, a phosphate group, a saccharide group, a sulfamoyl group, a sulfonamido group, a sulfonylamino group, a sulfonyl group, a sulfoxide group, a thio group, a thioalkaryl group, a thioaralkyl group, a trifluoroalkyl group, or an ureido group. Any of the above-mentioned groups may be further substituted with at least one substituent, such as with a halogen, sulfonyl, or phosphate moiety. However, to improve the stability of the phosphazene ionic liquid at high temperature and high cell voltage, the phosphazene ionic liquid may not include a halogen atom directly bonded to a phosphorus atom of the phosphorus-nitrogen unit. Thus, the phosphazene ionic liquid may not include direct phosphorus-halogen bonds.

the phosphoranimine may have the structure:

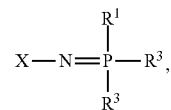

the phosphazene has the structure:

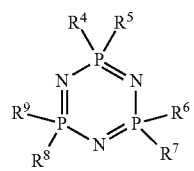

the monomeric phosphorus compound has the structure:

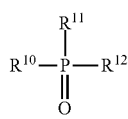

wherein $R^1$, $R^2$, $R^3$, $R^4$, $R^5$, $R^6$, $R^7$, $R^8$, $R^9$, $R^{10}$, $R^{11}$, $R^{12}$, are independently selected from the group consisting of, alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups.

The composition may be provided with the proviso that at least one of $R^1$, $R^2$, $R^3$, and at least one of $R^4$, $R^5$, $R^6$, $R^7$, $R^8$, $R^9$, is not a halogen and renders the resulting compound polar.

Each of the phosphoranimine, phosphazene, and monomeric phosphorus compound are preferably is stable under an applied electrical potential of at least 4 V.

DETAILED DESCRIPTION OF THE INVENTION

Figure 1:
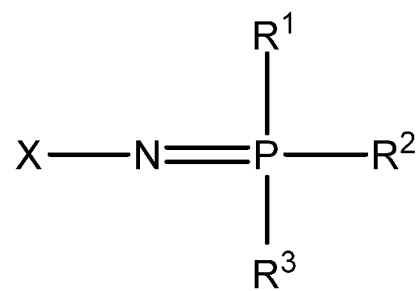
FIG. 1 is the basic chemical structure of the primary phosphoranimine from which other derivatives may be derived by replacement of X, $R^1$, $R^2$, and $R^3$ with various function groups as described within the claims herein.

The PA and Pz compounds are considered inorganic compounds due to their phosphorus-nitrogen (P=N) parent structure. The MP component is considered inorganic due to the core P atom in the parent structure as the primary atom that substituent atoms or molecules are bonded as defined by IUPAC.

The technology involves the preparation of a totally inorganic electrolyte which may have application in lithium ion batteries. It employs an admixture of a lower molecular weight phosphorus-based compounds, from the class of molecules known as the PAs as the principal solvent and a higher molecular weight phosphorus-based compound, from the class of molecules known as the Pzs as a co-solvent, as well as a suitable supporting salt (such as $LiPF_6$, etc.) to formulate the novel electrolyte. This particular combination of substances obviates the well-known safety and longevity problems associated with current organic-based technologies, while offering numerous other benefits to battery reliability and performance. An MP compound may be provided which, e.g., serves as a viscosity reducer for the solution.

Compared to other organophosphorous compounds and other additives, Pzs showed the least degradation in battery performance. A key performance consideration is ionic conductivity of the solvent. The rate of ion transfer is influenced by the ionic conductivity of the electrolyte solvent. The conductivity itself is generally inversely proportional to the viscosity of the solvent—a less viscous fluid will transfer lithium ions more readily. Carbonates and other organic electrolyte solvents are generally well known to be good ionic conductors due to their low viscosity. However, they break down easily at elevated temperatures, as low as 50° C., which can easily be experienced during normal battery operation. This creates residue within the electrolyte that reduces the ionic conductivity, increases the viscosity, and potentially leads to runaway thermal events. The PA/Pz solvent mixture in this invention is designed to be a suitable carrier of lithium ions while improving the battery's safety and longevity.

PA possess the requisite high lithium salt solubility and low viscosity while Pz offer benefits to the electrochemical performance and formulation stability required to realize the next generation of lithium ion batteries. Taken together, this new electrolyte formulation allows for a totally inorganic electrolyte system, superior to current technologies. The Pz co-solvent maintains the high lithium salt solubility and introduces the beneficial properties of significantly improved electrochemical and thermal stability, leading to increased performance. The Pz component has been shown to increase the width of the electrochemical window—the range of voltages where there are no redox reactions occurring in the electrolyte—improving the durability of the battery over a larger range of voltages. As described in Rollins, H. W., Harrup, M. K., Dufek, E. J., Jamison, D. K., Sazhin, S. V., Gering, K. L., & Daubaras, D. L., "Fluorinated Phosphazene Co-solvents for Improved Thermal and Safety Performance in Lithium-ion Battery Electrolytes", Journal of Power Sources, 263, 66-74 (2014), expressly incorporated herein by reference in its entirety, electrolyte solutions of 20% Pz with carbonates extends the electrochemical window up to 1.85V over the baseline 0.85 V window exhibited by carbonate solutions alone. This beneficial trend is should continue for PA/Pz mixtures and PA/Pz/MP mixtures. See also E. J. Dufek, M. L. Stone, D. K. Jamison, F. F. Stewart, K. L. Gering, L. M. Petkovic, A. D. Wilson, M. K. Harrup, H. W. Rollins, "Hybrid Phosphazene Anodes for Energy Storage Applications", J. of Power Sources, 267 (2014) 347-355; and E. J. Dufek, J. R. Klaehn, H. W. Rollins, M. K. Harrup, D. Jamison, "Phosphoranimine-based Battery Electrolytes", J. of Power Sources, pending (2014), each of which is expressly incorporated herein by reference in its entirety.

Both PA and Pz, as well as MP, have very low thermal degradation rates compared to pure carbonate electrolytes. Pz alone can act as a "free-radical sponge" when used in carbonate electrolytes to slow their thermal degradation. In Rollins et al (2015) supra, solutions containing only organic carbonate electrolytes completely degrade after about 55 days of being held at 60° C., leaving a black solid residue. Solutions containing both organic carbonate and quantities of Pz retained much of the carbonate through 245 days held at the same temperature, and only showed slight discoloration. Pz as a co-solvent with PA would be expected to further diminish the effects of degradation of the solvent in this invention.

Both solvents have lower vapor pressures than that of typical organic solvents including but not limited to ethylene carbonate, ethyl methyl carbonate, and diethyl carbonate. PA and Pz are well-known for their flame retardant properties and possess high thermal stability. These features provide lower volatility, lower flammability and greater thermal stability than current organic lithium ion battery solvents.

An MP compound, for example a simple alkyl or aryl derivative of phosphate ((R'O)—(R"O)—(R'"O)—P=O) or phosphine oxide (R'R"R'"P=O), or organophosphonate ((R'O)—(R"O)—(R'")—P=O) or ((R'O)—(R")—(R'")—P=O) is provided. The R groups R', R", R'" may be the same or different, for example an alkyl group, an aryl group, an alkoxy group, or an aryloxy group, or a sulfur or nitrogen analogue thereof. These groups may be substituted with halogens, but the MP compound, like the PA and Pz, should lack direct phosphorus-halogen bonds, and all should lack hydroxyl groups. The substituents preferably are different, to reduce packing and suppress the melting point of the MP compound and the electrolyte as a whole. For example, the MP compound may be methanoyl, ethanoyl, or isopropanoyl phosphate.

The all-inorganic PA/Pz solvent mixture (optionally including MP) will also improve the stability of the SEI layer. The SEI layer forms during battery charging as a result of the irreversible decomposition of the electrolyte at the surface of the electrode, creating a thin solid layer on the electrode. Once formed, the SEI layer isolates the electrode surface from the bulk solvent as the SEI layer does not readily allow diffusion of free solvent to the electrode surface, preventing further decomposition, and possesses low electrical conductivity. The SEI still allows for ease of lithium ion intercalation to the surface of the electrode to allow for continued battery operation.

The SEI layer will primarily be generated over the first few charging cycles averaging between 100 nm and 1 micron once fully formed. In typical carbonate solvents, the layer will grow slowly through additional cycles through further solvent decomposition that competes with the lithium intercalation, contributing to capacity fade over large number of cycles. The SEI stability is temperature-sensitive, and as the battery heats up as through normal use, the SEI will break down into the electrolyte and re-expose the electrode. The electrode will then readily react with fresh solvent to reform this layer, consuming more of the lithium ions and furthering the capacity fade. The SEI decomposition reaction is also exothermic and can lead to thermal runaway if not controlled. The SEI layers formed from carbonate-based solvents will break down at a relatively low temperature, as low as 55° C., which can easily be realized in typical lithium batteries.

The use of an electrolyte solvent mixture of primary PA solvent and the Pz co-solvent, and optionally MP, improves the stability of the SEI layer. Both PA and Pz have been separately evaluated with organic carbonate-based solvents. Battery cells using PA or Pz mixed with organic carbonate solvents show lower capacity fade compared to organic carbonate-only solvents, indicating that the SEI layer where PA or Pz is present is much more stable than in organic carbonate-only solutions. The solvent mixture will improve stability of the SEI layer as compared to an SEI layer in a carbonate-based battery and be much more stable under high charge/discharge rates.

Another benefit that the PA/PZ solvent mixture (optionally with MP) has in regards to the SEI layer is in improving the ionic conductivity of the SEI layer due to Pz. Battery cells using organic carbonate solutions have been evaluated via impedance spectroscopy with and without the addition of Pz. The impedance of the SEI layer is reduced when Pz is present in the electrolyte solvent, as well as retaining the higher stability described above. This would make it easier to transfer charge through the layer, allowing for faster discharge rates.

The syntheses of the individual constituents are herein described in detail as a means of non-limiting example.

MP Compound Synthetic Pathway

The MP compounds are preferably simple alkyl and/or aryl derivatives of organophosphates and/or organic phosphine oxides and/or organic phosphonates. Organophosphates are widely employed both in natural and synthetic applications because of the ease with which organic groups can be linked together. Organophosphates are conveniently synthesized employing light aliphatic or aryl alcohols according to the general reaction scheme given below:

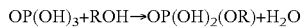

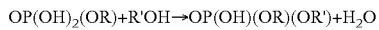

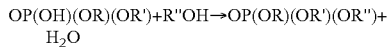

Organophosphinates and phosphonates are phosphate derivatives having one or two phosphorus-carbon bonds, respectively, with the remaining phosphorus bonds being oxygen/ester bonds. They may be prepared, for example, using an Arbuzov sequence or Michaelis-Arbuzov rearrangement, Abramov reaction, Pudovik reaction, Michaelis-Becker reaction, etc., from a corresponding phosphate. See Richardson, Rebekah Marie, New Synthesis and Reactions of Phosphonates, Doctoral Dissertation, U. of Iowa (2012), expressly incorporated herein by reference in its entirety.

Organic phosphine oxides are similar in structure to the organophosphates, except they contain only direct phosphorus-carbon linkages, instead of being bound through a heteroatom, like oxygen. These compounds are also readily synthesized through the two general reaction schemes shown below:

Phosphine oxides are frequently generated as a by-product of the Wittig reaction:

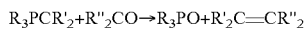

Another common route to phosphine oxides is the thermolysis of phosphonium hydroxides. In the laboratory, phosphine oxides are usually generated by the oxidation, often accidentally, of tertiary phosphines:

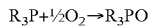

As in the case with the organophosphates, the R-groups may be any light aliphatic or aryl group, and most preferred is for each molecule to have a plurality of differing groups attached to the same central phosphorus.

PA Synthetic Pathway

The synthesis of PAs for this purpose was accomplished using the established Neilson and Wisian-Neilson methods. The synthetic route includes the preparation an initial aminophosphine which is then oxidized to the corresponding PA using elemental bromine. Maximization of $LiPF_6$ solubility was accomplished by substituting the subsequent bromine group(s) on the $P^V$ center with various alkyl and etheric oxygen-containing pendant groups. Pz synthetic pathway:

In an oven dried 500 ml flask, 50 g (0.144 moles) of the hexachlorocyclotriphosphazene trimer was dissolved in ~300 ml anhydrous dioxane which was then added to the a solution of sodium ethoxide (under nitrogen at room temperature) and heated at sub-reflux for 5 hours and the reaction progress was monitored by $^{31}P$ NMR. This solution was then cooled to room temperature and then added to a solution of sodium trifluoroethoxide (at RT under nitrogen). This solution was heated to sub reflux for ~5 hours. This reaction was also followed by $^{31}P$ NMR. When the reaction was complete, the solution was allowed to cool to room temperature and the excess ethoxides were quenched with water. The solution was neutralized with 2 M HCl. The solvent was removed by rotary evaporation leaving the Pz product (a liquid) and undissolved solid sodium chloride. The product separated from the salt by decantation and taken up in dichloromethane and washed with nanopure (18 MΩ cm) water in a separatory funnel six times to remove trace impurities. The dichloromethane was removed from the product on a rotary evaporator and the product was then dried in an argon purged vacuum oven for several days, refreshing the atmosphere with fresh UHP argon daily.

Although both classes of phosphorus compounds have been previously investigated individually, this work has been founded on the use of these compounds individually in combination with traditional organic carbonate-based solvents in an attempt to reduce the shortcomings of use of these solvents. According to the present technology, organic carbonates are generally excluded as a substantial component of the formulation altogether, to form a new all-inorganic electrolyte. For example, <2% of the solvent is organic carbonates. This electrolyte is compatible with most known lithium ion battery components in widespread use today. These include the anode, the cathode, electrode binders, and the mechanical separator, as well as common casing components. As such, the overall processes and key materials for the commercial manufacture of lithium ion batteries are unaltered from current methodologies. The embodiment of this invention is a lithium-ion based battery system that uses an electrolyte mixture of one or more PA components as the primary solvent, and one or more Pz components as the co-solvent. In the preferred embodiment, the mixture is composed primarily of one or more PA components (that is, Pz components comprising less than 50% of the solvent by volume). In a more preferred embodiment, the Pz components are present in the range of 10 to 20% by volume.

Figure 2:
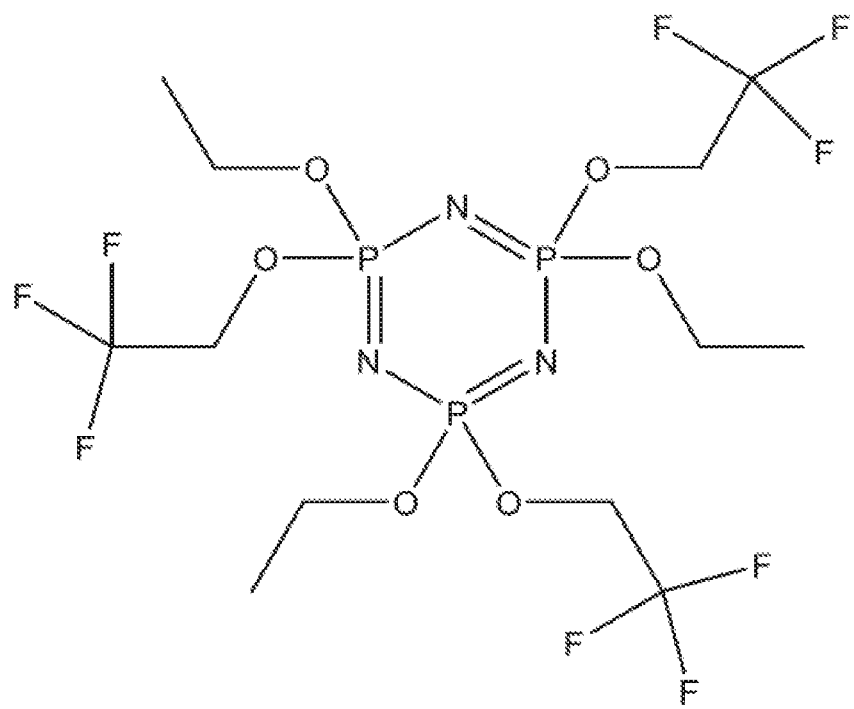
FIG. 2 is the example chemical structure of the co-solvent phosphazene, in this example, an embodiment using ethoxy and 2,2,2-trifluoroethoxy functional groups.

US Patent Application No. 20150340739 describes an embodiment of the PA. In the preferred embodiment, the PA includes at least one PA compound which has the chemical structure as shown in FIG. 1, where X is an organosilyl group or a tert-butyl group and each of $R^1$, $R^2$, and $R^3$ is independently selected from the group consisting of an alkyl group, an aryl group, an alkoxy group, or an aryloxy group. In another embodiment, each of $R^1$, $R^2$, and $R^3$ is independently selected from a cationic pendant group, which includes but is not limited to an ionic form of an aromatic amine, an aryl amine, or an aliphatic amine, such as a nitrogen containing aryl group, a primary amine, a secondary amine, or a tertiary amine. The aromatic amine may be an aniline group. The nitrogen containing aryl group may include, but is not limited to, a pyrrole group, an imidazole, a pyrazole, a pyridine group, a pyrazine group, a pyrimidine group, or a pyridazine group. The PA compound, or mixture thereof, is designed to meet desired properties for lithium ion batteries, including low viscosity, high ionic conductivity, low vapor pressure, and non-flammability In the embodiment, the Pz mixture includes at least one cyclic Pz compound, having a 6-membered alternating P—N ring structure, and with each phosphorus atom having 2 constituent functional groups attached to it. An example is shown in FIG. 2. In a more preferred embodiment, these functional groups include a combination of alkoxy and fluorinated alkoxy groups, as described in Rollins, Harry W., Mason K. Harrup, Eric J. Dufek, David K. Jamison, Sergiy V. Sazhin, Kevin L. Gering, and Dayna L. Daubaras. "Fluorinated phosphazene co-solvents for improved thermal and safety performance in lithium-ion battery electrolytes." Journal of Power Sources 263 (2014): 66-74, expressly incorporated herein by reference in its entirety. One example of this preferred embodiment, is where these groups are, respectively, ethoxy ($CH_3$—$CH_2$—O—) and 2,2,2-trifluoroethoxy ($CF_3$—$CH_2$—O—).

In some embodiments, inorganic MP compounds are added for the purpose of further lowering the viscosity of the PA/Pz electrolyte mixture, while enhancing ionic conductivity. This is done to address some energy storage applications that demand a very fast charge/discharge rate (typically >3C). The purpose for the selection of these inorganic-based compounds is three-fold. First, it maintains the all-inorganic nature of the electrolyte blend as previously asserted in this application. Second, one of the areas where PA and Pz compounds decompose into MP species is during the formation of the SEI layer during battery operation. As such, addition of these compounds will not adversely affect the SEI composition over a pure PA/Pz formulation, while retaining all of the desired beneficial electrical and physical properties inherent in the PA/Pz mixture. Third, these compounds are known to have a lower viscosity than either PA or Pz alone, achieving a total lower viscosity for the electrolyte formulation. In a preferred embodiment, the MP compounds will be present up to 20% by volume in the PA/Pz mixture.

EXAMPLE

A model of a lithium-ion battery using the mixture of PA and Pz were developed based on existing data on the characterization and testing of PA and Pz components, specifically referred to as PA2 and FM2, respectively. Parameters for the model using an equivalent circuit model were determined from data regression of impedance testing of FM2 in electrolyte mixtures, and from physical property values for viscosity and conductivity for PA2 and FM2 determined through experiment. The model used physical property relationships to project the performance of a battery that used only a mixture of PA2 and FM2. This model estimates the hydrodynamic and electrochemical properties of the PA2/FM2 electrolyte solvent and the battery performance using established property correlations for chemical mixtures. These relationships are based on standard trends for normal molecular interactions between compounds. Non-normal behavior can be exhibited in certain circumstances, but does not negate the novelty of this invention. The SEI was modeled from the results of the FM2 experimental data and is shown below for a range of compositions (from 0% to 100% FM2) to gauge the estimated range of performance.

The model was used to calculate the performance of a lithium-ion battery using various mixtures of PA2/FM2 (from 100% to 50% PA) at discharge rates from 1/10 C to 10C. The following table is the voltage of a single battery cell at various state-of-charge (SOC) levels as a function of the battery electrolyte composition, the anticipated SEI layer composition, and the discharge rate.

TABLE 1

Estimated Battery Voltage during Discharge for Various PA2/FM2 Configurations

| Solvent Comp. | FM2 in SEI Layer | 1/10 C Discharge | | | 1 C Discharge | | | 3 C Discharge | | | 10 C Discharge | | |
|---|---|---|---|---|---|---|---|---|---|---|---|---|---|
| | | 90% | 60% | 20% | 90% | 60% | 20% | 90% | 60% | 20% | 90% | 60% | 20% |
| 0% FM2 | 0% | 4.0470 | 3.8459 | 3.7030 | 3.7046 | 3.5027 | 3.3600 | 2.9419 | 2.7400 | 2.5970 | 0.0273 | 0.0707 | 0.0700 |
| 10% FM2 | 0% | 4.0525 | 3.8506 | 3.7080 | 3.7512 | 3.5500 | 3.4079 | 3.0841 | 2.8822 | 2.7392 | 0.7465 | 0.5445 | 0.4015 |
| | 50% | 4.0583 | 3.8564 | 3.7134 | 3.8096 | 3.6077 | 3.4647 | 3.2570 | 3.0551 | 2.9191 | 1.3230 | 1.1210 | 0.9780 |
| | 100% | 4.0602 | 3.8582 | 3.7146 | 3.8281 | 3.6262 | 3.4832 | 3.3126 | 3.1106 | 2.9676 | 1.5080 | 1.3060 | 1.1630 |
| 25% FM2 | 0% | 4.0575 | 3.8555 | 3.7119 | 3.8011 | 3.5992 | 3.4562 | 3.2315 | 3.0296 | 2.8866 | 1.2378 | 1.3059 | 0.8929 |
| | 50% | 4.0632 | 3.8613 | 3.7183 | 3.8588 | 3.6568 | 3.5138 | 3.4045 | 3.2025 | 3.0595 | 1.8143 | 1.6123 | 1.4693 |
| | 100% | 4.0651 | 3.8631 | 3.7202 | 3.8773 | 3.6753 | 3.5324 | 3.4600 | 3.2580 | 3.1150 | 1.9993 | 1.7974 | 1.6544 |
| 35% FM2 | 0% | 4.0603 | 3.8584 | 3.7154 | 3.8294 | 3.6275 | 3.4845 | 3.3164 | 3.1145 | 2.9715 | 1.5029 | 1.3190 | 1.1760 |
| | 50% | 4.0660 | 3.8641 | 3.7211 | 3.8871 | 3.6851 | 3.5422 | 3.4894 | 3.2874 | 3.1444 | 2.0974 | 1.8954 | 1.7524 |
| | 100% | 4.0679 | 3.8660 | 3.7230 | 3.9056 | 3.7037 | 3.5607 | 3.5441 | 3.3429 | 3.1999 | 2.2824 | 2.0805 | 1.9375 |
| 50% FM2 | 0% | 4.0638 | 3.8619 | 3.7189 | 3.8650 | 3.6622 | 3.5200 | 3.4230 | 3.2211 | 3.0785 | 1.8762 | 1.6743 | 1.5313 |
| | 50% | 4.0696 | 3.8677 | 3.7247 | 3.9226 | 3.7207 | 3.5777 | 3.5960 | 3.3940 | 3.2510 | 2.4527 | 2.2507 | 2.1077 |
| | 100% | 4.0715 | 3.8695 | 3.7270 | 3.9411 | 3.7392 | 3.5966 | 3.6515 | 3.4495 | 3.3065 | 2.6377 | 2.4358 | 2.2928 |

Figure 3:
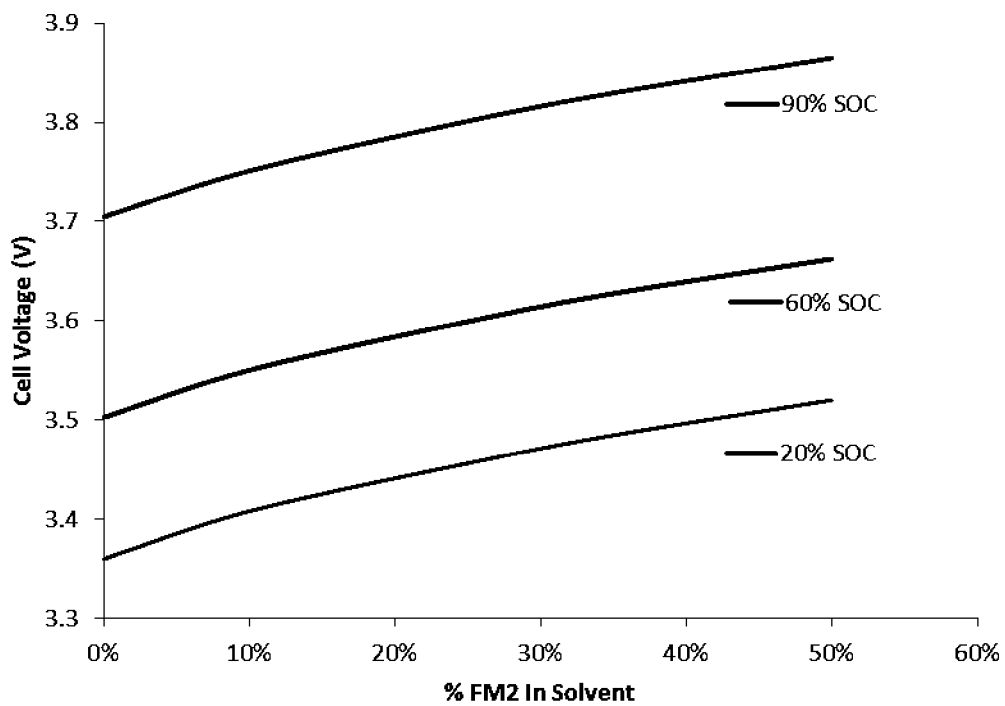
FIG. 3 shows the benefits of low levels of FM2 (~10%) on battery performance.

Actual data shows that the base PA2 solvent will have a sufficiently low viscosity and corresponding high ionic conductivity to make it a suitable electrolyte in lithium battery applications at low discharge rates, when salted to a relevant level with a typical lithium salt, such as $LiPF_6$. Using this data, the model shows that pure PA2 viscosity may not be sufficient as a pure solvent for high discharge rates (greater than 3C). Addition of FM2 will increase the electrolyte thermal and electrochemical stability and can reduce the impedance of the solvent, improving the battery's performance. From this model, the benefit is apparent with low levels of FM2 (~10%) and suggests diminishing returns at higher levels. FIG. 3 shows this influence. The model does not presently include the influence of MP compounds, which are expected to further depress the solution's viscosity without altering the other benefits of the PA2/FM2 (PA/Pz) mixture. The performance of batteries using the PA2/FM2/MP compounds would be expected to be better than what is shown in this model results for PA2/FM2 alone.

Figure 4:
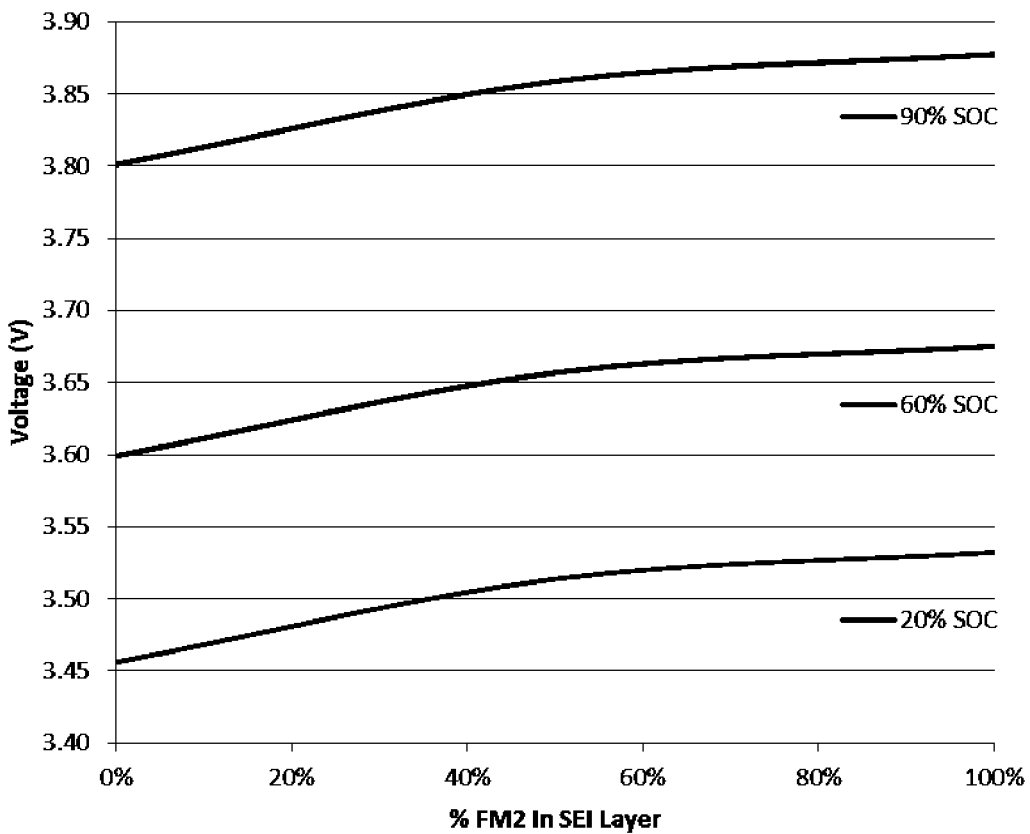
FIG. 4 shows that the presence of FM2 in SEI layer is beneficial to the battery.

Similarly, the presence of FM2 in SEI layer is beneficial to the battery, as it appears the material offers lower resistance to ionic transfer to the electrodes, as shown in FIG. 4. Only a small amount of FM2 is required to achieve this, FM2 was added to carbonate solvents; additional FM2 beyond 50% within the SEI layer appears to have diminishing returns.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. The scope of the disclosure is intended to encompass all combinations, subcombinations, and permutations of the various disclosures herein (regardless of whether in multiple-dependent format), and unless specifically limited by the claims, no particular aspect is considered essential. Likewise, the invention comprises materials and methods that facilitate production of an end product and portions of the end product. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

What is claimed is:

1. An electrolyte solvent formulation comprising:
   a phosphoranimine;
   a phosphazene present in an amount of between 3 and 30% by volume; and
   optionally a monomeric phosphorus compound;
   wherein a portion of the electrolyte solvent formulation is labile at a voltage of 5V and the portion is effective to scavenge free radicals and suppress free radical propagation;
   being a liquid between at least 0° C. and 60.6° C., and having a vapor pressure of combustible components at 60.6° C. sufficiently low to not produce a combustible mixture in air.

2. The electrolyte solvent formulation according to claim 1, wherein the formulation comprises the monomeric phosphorus compound, selected from the group consisting of a phosphate, phosphonate, phosphinate, phosphine, and a phosphine oxide, having at least two different types of pendent groups, sufficient to achieve a viscosity of the electrolyte solvent formulation of from 1 cp to less than about 30 cp at 35° C.

3. The electrolyte solvent formulation according to claim 1, wherein the formulation comprises the monomeric phosphorus compound, in an amount of between 10% and 50% by volume, having the structure:

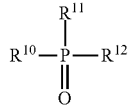

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, and the monomeric phosphorus compound is stable under an applied electrical potential 4 V.

4. The electrolyte solvent formulation according to claim 1, wherein the phosphoranimine has the structure:

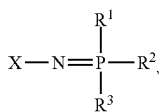

wherein $R^1$, $R^2$, and $R^3$ are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein $R^1$, $R^2$, and $R^3$ are represented by at least two different substituents and wherein X is selected from the group consisting of an organosilyl group or a tert-butyl group.

5. The electrolyte solvent formulation according to claim 4, wherein $R^1$, $R^2$, and $R^3$ are each independently selected from the group consisting of an alkoxy group, and an aryloxy group.

6. The electrolyte solvent formulation according to claim 1, wherein the phosphazene is a substituted phosphazine having at least two different substituents selected from the group consisting of alkoxy and fluorinated alkoxy groups, and lacking phosphorus-halogen bonds.

7. The electrolyte solvent formulation according to claim 1, wherein the formulation comprises the monomeric phosphorus compound, and
the phosphoranimine is present in an amount of between 20-80% by volume,
and
the monomeric phosphorus compound is present in an amount of 10-80% by volume.

8. A battery, comprising the electrolyte solvent formulation according to claim 1, in combination with an anode, a cathode, a separator, and a supporting salt.

9. The electrolyte solvent formulation according to claim 1, wherein the formulation is substantially free of compounds having any direct halogen-phosphorus bonds.

10. The electrolyte solvent formulation according to claim 1, wherein
the phosphoranimine, the phosphazene, and the monomeric phosphorus compound each lacks phosphorus-halogen bonds, having a stability against degradation under an applied electrical potential of 4 V.

* * * * *